US009633456B2

(12) United States Patent
Wolfe et al.

(10) Patent No.: US 9,633,456 B2
(45) Date of Patent: Apr. 25, 2017

(54) SYSTEM AND METHOD FOR PROVIDING FLAVOR ADVISEMENT AND ENHANCEMENT

(71) Applicant: McCormick & Company, Incorporated, Sparks, MD (US)

(72) Inventors: Jerry Wolfe, Mount Airy, MD (US); Andrew Foust, Baltimore, MD (US); Colleen McClellan, Baltimore, MD (US); Stephen DeAngelis, Washington Crossing, PA (US); Jason Glazier, Newtown, PA (US); Samir Rohatgi, Owings Mill, MD (US)

(73) Assignee: MCCORMICK & COMPANY, INCORPORATED, Sparks, MD (US)

( * ) Notice: Subject to any disclaimer, the term of this patent is extended or adjusted under 35 U.S.C. 154(b) by 519 days.

(21) Appl. No.: 13/856,282

(22) Filed: Apr. 3, 2013

(65) Prior Publication Data
US 2013/0235042 A1 Sep. 12, 2013

Related U.S. Application Data

(63) Continuation of application No. 13/775,791, filed on Feb. 25, 2013, now abandoned.
(Continued)

(51) Int. Cl.
*G06T 11/20* (2006.01)
*G06Q 30/02* (2012.01)
(Continued)

(52) U.S. Cl.
CPC ........ *G06T 11/206* (2013.01); *G06F 3/04817* (2013.01); *G06Q 30/0201* (2013.01);
(Continued)

(58) Field of Classification Search
CPC .............. G06T 11/206; G06F 3/04817; G09B 19/0092; G06Q 30/0241; G06Q 30/0251; G06Q 30/0201; H04L 67/02
(Continued)

(56) References Cited

U.S. PATENT DOCUMENTS 4,953,106 A * 8/1990 Gansner et al. .............. 345/440
5,491,779 A * 2/1996 Bezjian ........................ 345/440
(Continued)

FOREIGN PATENT DOCUMENTS

CN 1370051 9/2002
WO WO 98/03930 A2 1/1998

OTHER PUBLICATIONS

Ahn, Yong-Yeol et al., "Flavor network and the principles of food pairing", www.nature.com, Dec. 15, 2011.*
(Continued)

*Primary Examiner* — Chante Harrison
(74) *Attorney, Agent, or Firm* — Greenblum & Bernstein, P.L.C.

(57) ABSTRACT

A method and apparatus for generating a visual representation of a flavor or texture profile based on flavor or texture preferences of a user with respect to each of a plurality of flavor or texture categories or based on flavor or texture characteristic information representing flavor or texture characteristics of a product or recipe for each of a plurality of flavor or texture categories. The flavor or texture preferences of a user and the flavor or texture characteristics of a product or recipe with respect to each of a plurality of flavor or texture categories is determined by way of a method and apparatus for determining a flavor or texture profile for a user and a method and apparatus for determining a flavor or texture profile for a food element, respectively. Also
(Continued)

described is a method and apparatus for providing food element recommendations based on flavor or texture.

26 Claims, 42 Drawing Sheets

Related U.S. Application Data

(60) Provisional application No. 61/603,058, filed on Feb. 24, 2012.

(51) Int. Cl.
| | | |
|---|---|---|
| G09B 19/00 | (2006.01) | |
| H04L 29/08 | (2006.01) | |
| G06F 3/0481 | (2013.01) | |

(52) U.S. Cl.
CPC ..... *G06Q 30/0241* (2013.01); *G06Q 30/0251* (2013.01); *G09B 19/0092* (2013.01); *H04L 67/02* (2013.01)

(58) Field of Classification Search
USPC .......................... 345/440; 715/243; 382/113
See application file for complete search history.

(56) References Cited

U.S. PATENT DOCUMENTS

| | | | |
|---|---|---|---|
| 5,513,271 A * | 4/1996 | Rao et al. ............... | 382/113 |
| 5,749,081 A | 5/1998 | Whiteis | |
| 5,832,446 A | 11/1998 | Neuhaus | |
| 5,835,085 A * | 11/1998 | Eick et al. ............ | 345/440 |
| 5,899,502 A | 5/1999 | Del Giorno | |
| 6,175,844 B1 * | 1/2001 | Stolin ................... | 715/243 |
| 6,236,974 B1 | 5/2001 | Kolawa et al. | |
| 6,320,586 B1 * | 11/2001 | Plattner et al. ........ | 345/440 |
| 6,349,820 B1 | 2/2002 | Kelley et al. | |
| 6,872,077 B2 | 3/2005 | Yeager | |
| 6,975,910 B1 | 12/2005 | Brown et al. | |
| 6,978,243 B2 | 12/2005 | Godinot et al. | |
| 7,090,638 B2 | 8/2006 | Vidgen | |
| 7,413,438 B2 | 8/2008 | Bisogno | |
| 7,593,863 B1 | 9/2009 | Sunshine et al. | |
| 7,680,690 B1 | 3/2010 | Catalano | |
| 7,692,653 B1 * | 4/2010 | Petro et al. ............ | 345/440 |
| 7,729,952 B1 | 6/2010 | Kulesza et al. | |
| 7,856,368 B2 | 12/2010 | Avallone et al. | |
| 8,429,027 B2 | 4/2013 | Zheng | |
| D708,636 S | 7/2014 | Wolfe | |
| 2001/0025279 A1 | 9/2001 | Krulak et al. | |
| 2002/0004749 A1 | 1/2002 | Froseth et al. | |
| 2002/0046060 A1 | 4/2002 | Hoskyns et al. | |
| 2002/0079240 A1 | 6/2002 | Beard Kelley et al. | |
| 2002/0177756 A1 | 11/2002 | Godinot et al. | |
| 2003/0046188 A1 | 3/2003 | Orozco | |
| 2003/0120534 A1 | 6/2003 | Giacchetti et al. | |
| 2003/0149635 A1 | 8/2003 | Burklow et al. | |
| 2003/0171944 A1 | 9/2003 | Fine et al. | |
| 2003/0216970 A1 | 11/2003 | Vadjinia | |
| 2004/0091843 A1 | 5/2004 | Albro et al. | |
| 2004/0171925 A1 | 9/2004 | Kirchhoff et al. | |
| 2004/0204950 A1 | 10/2004 | Vlahos | |
| 2004/0260617 A1 | 12/2004 | Davidson et al. | |
| 2005/0075934 A1 | 4/2005 | Knight et al. | |
| 2005/0192869 A1 | 9/2005 | Maeda et al. | |
| 2006/0020483 A1 | 1/2006 | Hsu | |
| 2006/0074716 A1 | 4/2006 | Tilles et al. | |
| 2006/0074763 A1 | 4/2006 | Schmid | |
| 2006/0271394 A1 | 11/2006 | Kelly | |
| 2008/0228753 A1 | 9/2008 | Kenedy et al. | |
| 2009/0150241 A1 | 6/2009 | Laboise | |
| 2009/0164341 A1 | 6/2009 | Sunvold et al. | |
| 2009/0254541 A1 | 10/2009 | Kolawa | |
| 2009/0287644 A1 | 11/2009 | Crosby | |
| 2009/0307007 A1 | 12/2009 | Hermann et al. | |
| 2010/0003647 A1 | 1/2010 | Brown et al. | |
| 2010/0138024 A1 | 6/2010 | Bouvier | |
| 2010/0185564 A1 | 7/2010 | King | |
| 2010/0291515 A1 | 11/2010 | Pinnisi et al. | |
| 2010/0292998 A1 | 11/2010 | Bodlaender et al. | |
| 2011/0055044 A1 | 3/2011 | Wiedl | |
| 2011/0123964 A1 | 5/2011 | Aronis et al. | |
| 2011/0184833 A1 | 7/2011 | Catlett | |
| 2012/0136731 A1 | 5/2012 | Kidron | |
| 2012/0226698 A1 | 9/2012 | Silvestre | |
| 2013/0222406 A1 | 8/2013 | Wolfe | |
| 2013/0235042 A1 | 9/2013 | Wolfe et al. | |

OTHER PUBLICATIONS http://www.developer.yummly.com/documentation, Yummly API Documentation, 2009-2013.
https://www.tastingroom.com/about, About-Tasting Room by LOT18, 2013.
International Search Report issued in International Application No. PCT/US2013/027640 filed Feb. 25, 2013.
Written Opinion issued Apr. 30, 2013 in PCT/US2013/027640 filed Feb. 25, 2013.
U.S. Appl. No. 29/446,521, filed Feb. 25, 2013, Wolfe, et al.
U.S. Appl. No. 13/856,296, filed Apr. 3, 2013, Wolfe, et al.
U.S. Appl. No. 13/856,307, filed Apr. 3, 2013, Wolfe, et al.
U.S. Appl. No. 14/162,597, filed Jan. 23, 2014, Wolfe, et al.
Office Action issued Apr. 29, 2014, in Canadian Patent Application No. 2,838,084.
Office Action issued Mar. 21, 2014, in Canadian Patent Application No. 2,838,068, filed Feb. 25, 2013.
Office Action issued Feb. 11, 2014, in Canadian Patent Application No. 2,838,068.
Extended European Search Report, including European Search Opinion, Supplementary European Search Report, and Information on Search Strategy, from European Patent Office (EPO) in European Pat. Appl. No. 13752152, dated May 23, 2016.
Office Action from State Intellectual Property Office (SIPO) of the People's Republic of China in Chinese Patent Application No. 201380019022.6, dated Jun. 3, 2016, together with an English language translation.
Dou Junlin et al., "Beer Consumption Preference: Flavor • Brand • Price • Convenience—Guilin Market Consumption Factor Investigation and Analysis", Journal of Guilin College of Aerospace Technology, vol. 3, 2008, pp. 51-55, together with a statement of relevancy.
Raudenbush et al., "Assessing Food Neophobia: The Role of Stimulus Familiarity, Appetite" 1999, vol. 32, Issue 2, Apr. 1999, pp. 261-271.
King et al., Development of a method to measure consumer emotions associated with foods, Food Quality and Preference, vol. 21, issue 2, Mar. 2010, pp. 168-177.

* cited by examiner

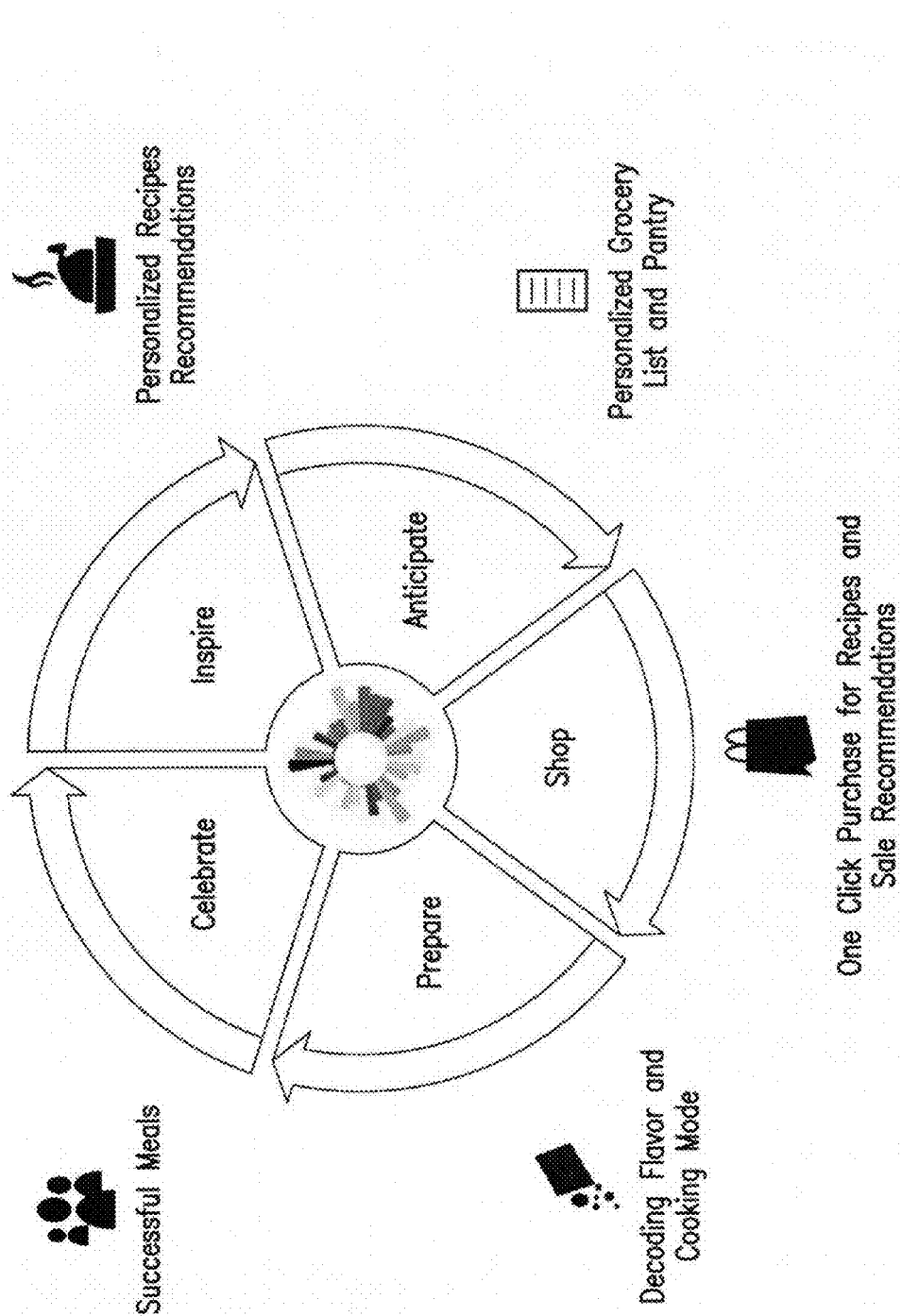

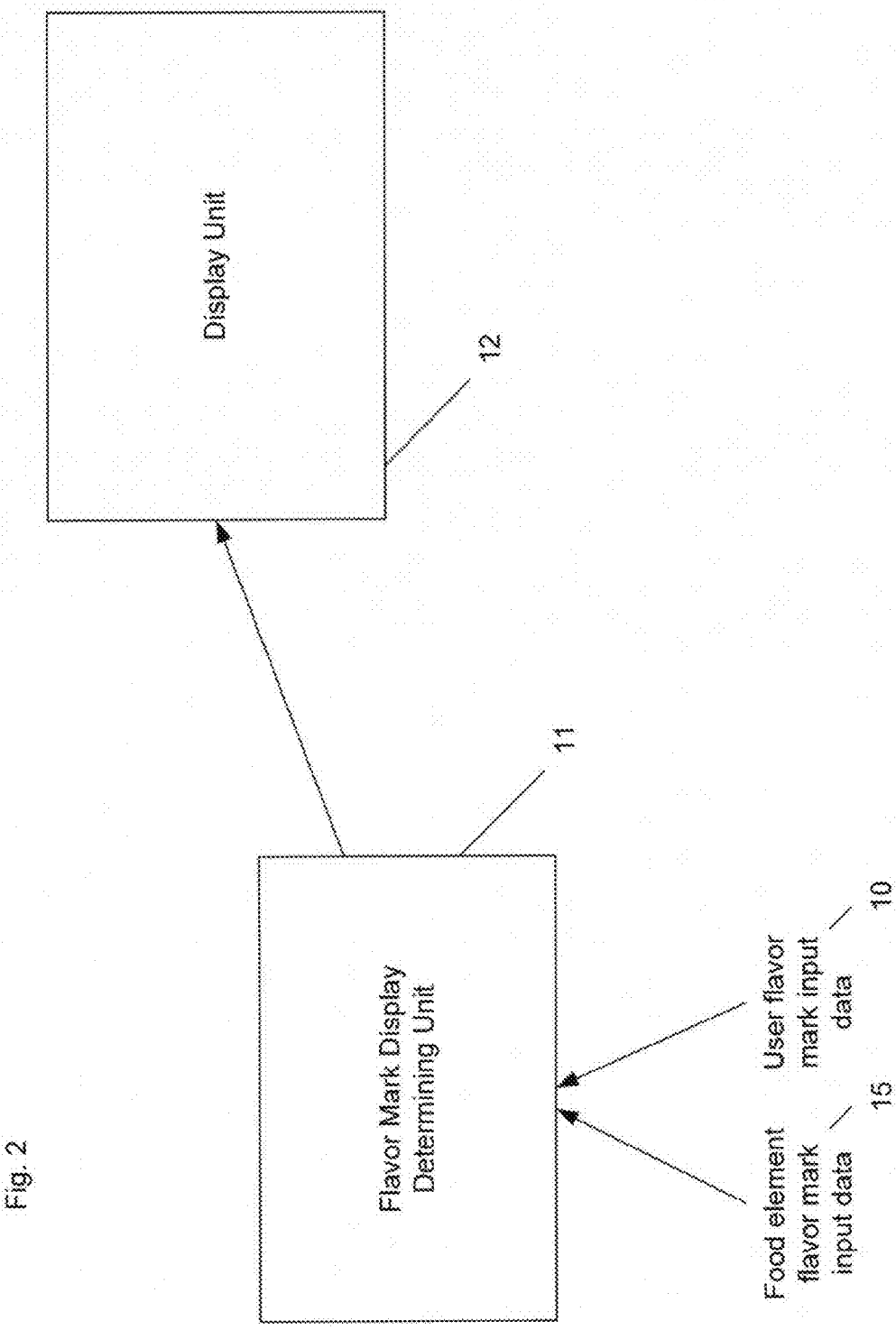

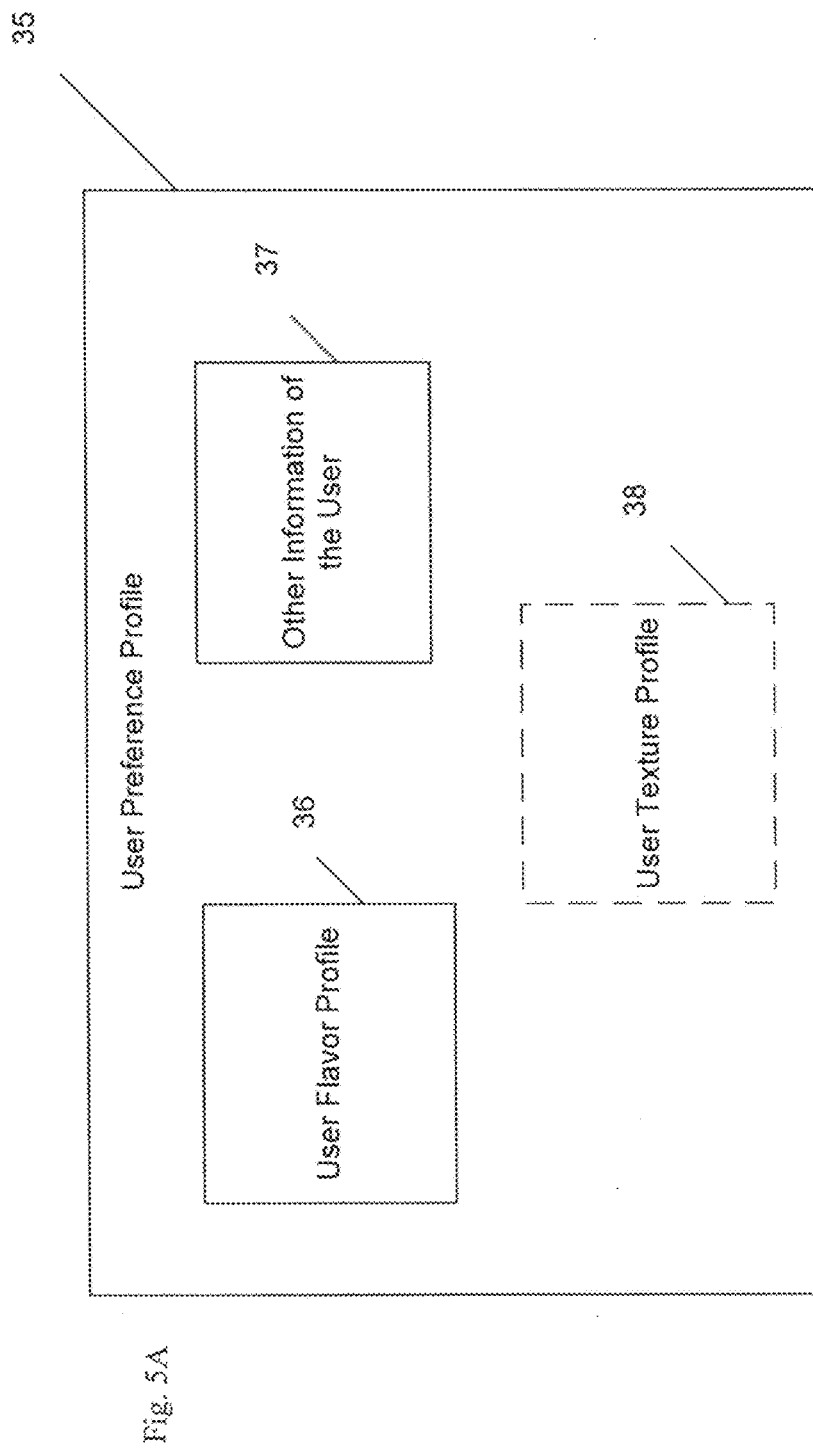

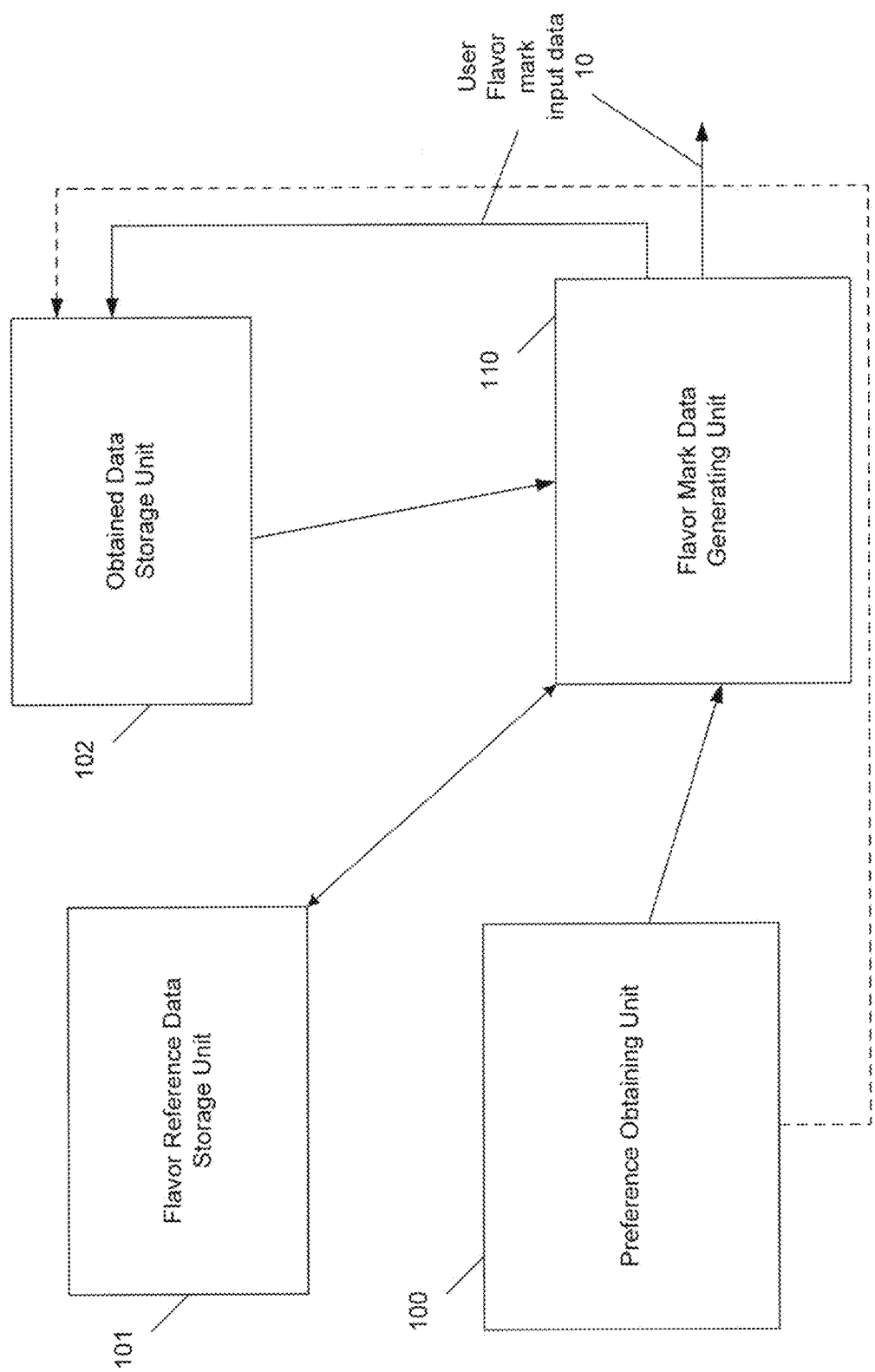

223
STEP 3/3
Allergies/Intolerances
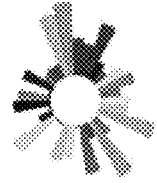
Are you allergic or intolerant to any of the items below?
- ☑ Milk
- ☐ Caffeine
- ☐ Soy
- ☐ Alcohol
- ☑ Strawberry
- ☑ Eggs
- ☐ Lactose
- ☐ Wheat
- ☐ Gluten
- ☐ Peanuts
- ☐ Other nuts
- ☑ Shellfish
- ☐ Fish
[ Anything else not listed above? + ]   [ Create my FlavorPrint ]
*Fig. 11D*

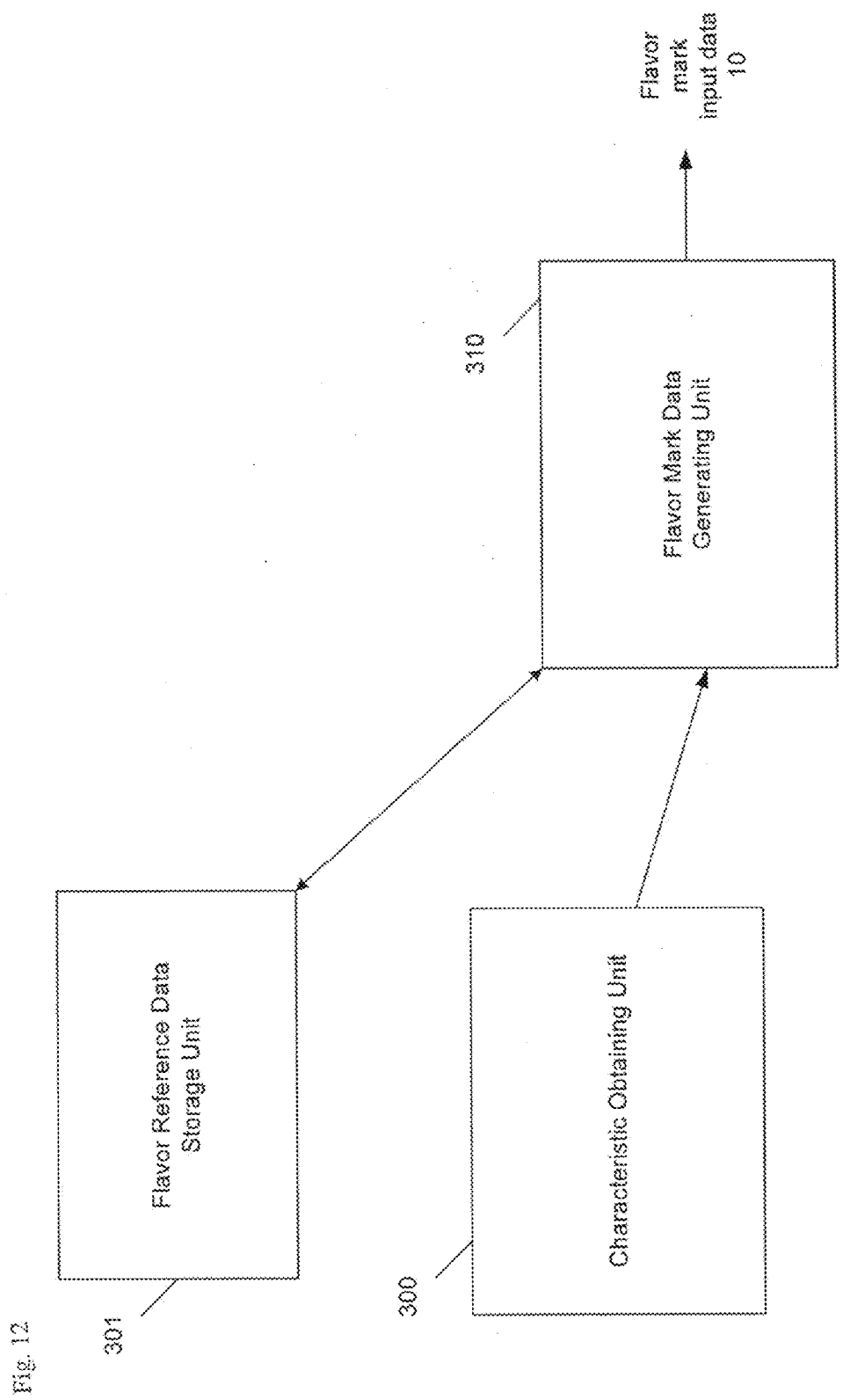

| Recommendations | All | Main Course | Desserts | Sides | | Settings |
|---|---|---|---|---|---|---|
| Recipe Name | | | | Score ▼ | Links | |
| Chocolate Chip Cookies | | | | 96.0 | 〇 🗐 | |
| Cookie Dough Ice Cream | | | | 93.6 | 〇 | |
| Hot Cocoa Chile | | | | 93.1 | 〇 | |
| Chocolate Fudge Brownie Mix | | | | 92.7 | 〇 | |
| Fudge Brownie Mix | | | | 90.5 | 〇 | |
| Aloha Cake (With Frozen Whipped Topping) | | | | 90.2 | 〇 🗐 | |
| Chocolate Hazelnut Crackled Cookies | | | | 89.9 | 〇 🗐 | |
| Mocha Cappuccino Brownies | | | | 89.5 | 〇 🗐 | |
| Raspberry Brownies (With Raspberry Chocolate Frosting) | | | | 89.4 | 〇 🗐 | |
| Couscous & Chick Pea Salad | | | | 88.6 | 〇 | |
| Double Banana Bread | | | | 88.4 | 〇 | |
| Mesquite Lime Chicken | | | | 88.2 | 〇 🗐 | |
| Mediterranean Lemon Chicken | | | | 87.7 | 〇 🗐 | |

*Fig. 18A* searches for "Chicken Dinner"

| Recipe Name | Score ▼ | Links |
|---|---|---|
| White Chicken Chili | 93.2 | 🔍 📄 |
| Sour Cream Chicken Enchiladas | 92.2 | 🔍 📄 |
| Mesquite Lime Chicken | 91.0 | 🔍 📄 |
| Slow Cookers Southern BBQ Pulled Chicken | 90.0 | 🔍 |
| Mediterranean Lemon Chicken | 90.8 | 🔍 📄 |
| Smoky Santa Fe BBQ Sauce Baked on Chicken Breast | 89.4 | 🔍 |
| Sesame Chicken Nuggets | 88.9 | 🔍 |
| Spicy Fried Chicken | 88.5 | 🔍 |
| Tuscan Chicken | 87.7 | 🔍 |
| Chicken Chili | 84.6 | 📄 |

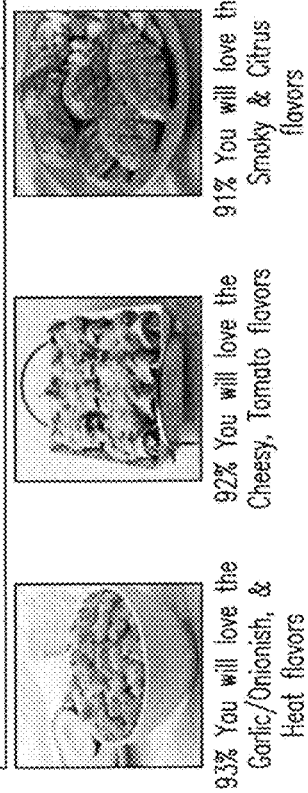

93% You will love the Garlic/Onionish, & Heat flavors

92% You will love the Cheesy, Tomato flavors

91% You will love the Smoky & Citrus flavors

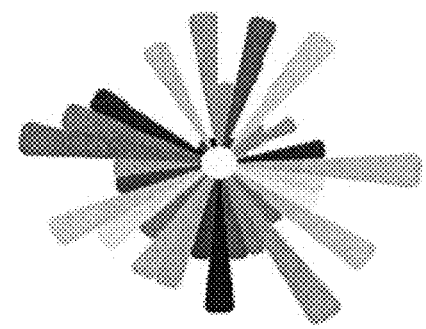

Fig. 18B

Fig. 32

SYSTEM AND METHOD FOR PROVIDING FLAVOR ADVISEMENT AND ENHANCEMENT

CROSS-REFERENCE TO RELATED APPLICATIONS

This application is a continuation application of, and claims the benefit of priority under 35 U.S.C. §120 from, U.S. application Ser. No. 13/775,791, filed Feb. 25, 2013, which claims the benefit of priority under 35 U.S.C. §119(e) from U.S. Ser. No. 61/603,058, filed Feb. 24, 2012, the entire contents of which are incorporated herein by reference.

FIELD

The embodiments described herein relate generally to a system and a method of providing flavor advisement and enhancement.

BACKGROUND

Many cooks are in need of flavor advisement. Whether the cook is an excited newbie who is just starting out and excited to learn or an established culinarian who consistently prepares food from scratch, flavor advisement is needed to help everyone discover flavorful foods they'll love. In the past, there was no efficient way to implement flavor advisement which would meet the diverse needs of different kinds of cooks and different kinds of shoppers. In addition, there was no way to target diverse needs, different shoppers, and different taste profiles both at an individual and at a family aggregate level.

The foregoing description has been provided by way of general introduction, and is not intended to limit the scope of the following claims.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein like reference numerals designate identical or corresponding parts throughout the several views.

FIG. 1 illustrates an example of the food and flavor lifecycle.

FIG. 2 illustrates a flavor mark generating system according to one embodiment of the invention;

FIG. 5A illustrates an organization of a user preference profile;

FIG. 9 illustrates a device used for determining user flavor mark input data which is used to generate a flavor mark for a user;

FIGS. 11A-D illustrate an example of a web survey according to one embodiment of the invention;

FIG. 12 illustrates a device used for determining food element flavor mark input data which is used to generate a flavor mark for a recipe or a product;

FIGS. 18A-B illustrate an example of a recommendation list generated by the flavor engine used to populate other consumer facing presentations;

FIG. 32 illustrates another example of the website implementation of the flavor system corresponding to an ingredient search;

DETAILED DESCRIPTION

Figure 3A:
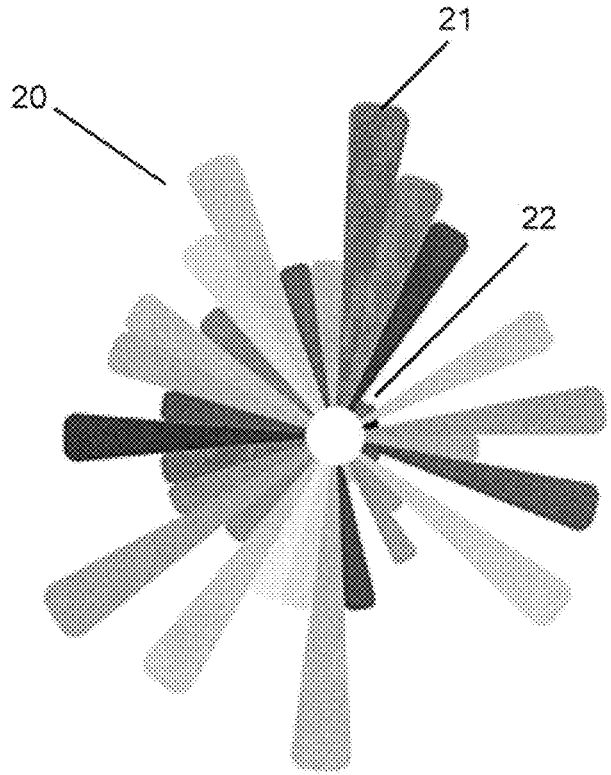
FIGS. 3A and 3B illustrate an example of a user flavor mark according to one embodiment of the invention.

In a first embodiment, there is described a method of generating a visual representation of a profile. The method includes the steps of obtaining preference information representing preferences of a user with respect to each of a plurality of categories, determining, using a microprocessor, a length of a plurality of graphical elements, each graphical element being assigned to one of the categories, based on the preference information corresponding to the respective category, wherein the length of each graphical element indicates the relative preference for a category with respect to the other categories, and disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to another embodiment of the method, the preferences of the user include flavor preferences and the categories include flavor categories.

According to another embodiment of the method, the preferences of the user include texture preferences and the categories include texture categories.

According to another embodiment of the method, where the preferences of the user include flavor and texture preferences.

In the first embodiment, there is also described a method of generating a visual representation of a profile. The method includes the steps of obtaining characteristic information representing characteristics of an element for each of a plurality of categories, determining, using a microprocessor, a length of a plurality of graphical elements, each graphical element being assigned to one of the categories, based on the characteristic information corresponding to the respective category, wherein the length of each graphical element indicates the value for a category with respect to the other categories, and disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to another embodiment of the method, the characteristic information includes flavor characteristic information, the categories include flavor categories, the element is a food product or recipe, and the obtaining step further includes the step of obtaining flavor characteristic information representing flavor characteristics of a product or recipe for each of a plurality of flavor categories.

According to another embodiment of the method, the characteristic information includes texture characteristic information, the categories includes texture categories, the element is a food product or recipe, and the obtaining step further includes the step of obtaining texture characteristic information representing texture characteristics of a product or recipe for each of a plurality of texture categories.

According to another embodiment of the method, the characteristic information includes flavor and texture characteristic information, the categories include flavor and texture categories, the element is a food product or recipe, and the obtaining step further includes the step of obtaining texture and flavor characteristic information representing texture and flavor characteristics of a product or recipe for each of a plurality of texture categories.

According to another embodiment of the method, the length of each graphical element indicates the relative value for a category with respect to the other categories.

According to another embodiment of the method, the length of each graphical element indicates an absolute value for a category with respect to the other categories on a predetermined scale.

In a second embodiment, there is described a method of determining a profile for a user. The method includes the steps of obtaining food preference information provided by a user regarding a plurality of food elements, obtaining correlation information regarding the plurality of food elements and a plurality of categories, the correlation information providing a correlation between preference for each food element and preference for each category, determining, by a microprocessor and based on the food preference information and the correlation information, a relative user preference for each of the plurality of categories, and generating output data for the user based on the result of the determining.

According to another embodiment of the method, the method further includes the steps of obtaining demographic data regarding the user and obtaining second correlation information regarding the demographic data and the plurality of categories, the second correlation information providing a correlation between the demographic data and preference for each category, and the step of determining further includes the step of determining, by the microprocessor and based on the demographic data, food preference information, second correlation information and the correlation information, the relative user preference for each of the plurality of categories.

According to another embodiment of the method, the method further includes the steps of obtaining additional food preference information provided by a user regarding food consumption context, and obtaining third correlation information regarding the additional food preference and the plurality of flavor categories, the third correlation information providing a correlation between the additional food preference information and preference for each category, and the step of determining further includes the step of determining, by the microprocessor and based on the demographic data, the preference information, the additional preference information, the second correlation information, the third correlation information and the correlation information, the relative user preference for each of the plurality of categories.

According to another embodiment of the method, the categories include flavor categories.

According to another embodiment of the method, wherein the categories include texture categories.

According to another embodiment of the method, the categories include flavor and texture categories.

In the second embodiment, there is also described a method of determining a profile for a food element. The method includes the steps of obtaining characteristic information including ingredient information for the food element, obtaining correlation information regarding the ingredient information and a plurality of categories, the correlation information providing a correlation between ingredients included in the ingredient information and expected perception for each category, determining, by a microprocessor and based on the characteristic information and the correlation information, a perception value for each of the plurality of categories for the food element, and generating output data for the user based on the result of the determining.

According to another embodiment of the method, the method further includes the step of obtaining alteration information regarding the ingredient information based on the characteristic information and the determining step further includes the step of determining, by the microprocessor and based on the characteristic information, the alteration information and the correlation information, the perception value for each of the plurality of categories for the food element.

According to another embodiment of the method, the perception value is the relative or an absolute perception value on a predetermined scale.

According to another embodiment of the method, the categories include flavor categories.

According to another embodiment of the method, the categories include texture categories.

According to another embodiment of the method, the categories include flavor and texture categories.

In a third embodiment, there is described a method of providing food element recommendations based on flavor. The method includes the steps of obtaining profile information of a user indicating a relative user preference for each of a plurality of categories, performing a query of food elements based on constraint inputs, each food element having associated therewith profile information indicating the perception value for each of the plurality of categories for the food element, comparing profile information of each of the food elements, returned by the query, against the profile information of the user to determine food elements having a greatest positive correlation, generating a list of recommended food elements based on the result of the comparing, and presenting the list of recommended food elements to the user.

According to another embodiment of the method, the categories include flavor categories, the profile information of the user includes flavor profile information, and the profile information of each of the food elements includes flavor profile information.

According to another embodiment of the method, the categories include texture categories, the profile information of the user includes texture profile information, and the profile information of each of the food elements includes texture profile information.

According to another embodiment of the method, the perception value is a relative perception value or an absolute perception value on a predetermined scale.

In the third embodiment, there is also described a method of providing food element recommendations based on flavor. The method includes the steps of obtaining profile information of a user indicating a relative user preference for each of a plurality of categories, performing a query of food elements based on constraint inputs, each food element having associated therewith profile information indicating the perception value for each of the plurality categories for the food element, wherein the performance of the query further includes comparing profile information of each of the food elements against the profile information of the user provided as the constraint inputs, generating a list of recommended food elements based on the result of the query, and presenting the list of recommended food elements to the user.

According to another embodiment of the method, the categories include flavor categories, the profile information of the user includes flavor profile information, and the profile information of each of the food elements includes flavor profile information.

According to another embodiment of the method, the categories include texture categories, the profile information of the user includes texture profile information, and the profile information of each of the food elements includes texture profile information.

According to another embodiment of the method, the perception value is a relative perception value or an absolute perception value on a predetermined scale.

In the first embodiment, there is also described a method of generating a visual representation of a flavor profile that includes the steps of obtaining preference information representing flavor preferences of a user with respect to each of a plurality of flavor categories, determining, using a microprocessor, a length of a plurality of graphical elements, each graphical element being assigned to one of the flavor categories, based on the preference information corresponding to the respective flavor category, wherein the length of each graphical element indicates the relative preference for a flavor category with respect to the other flavor categories, and disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to one further embodiment of the method, each flavor category represents a different sensory flavor which is perceived by the user.

According to another embodiment of the method, the length of each graphical element indicates the relative preference for a flavor category with respect to the other flavor categories such that a greater length indicates a greater relative preference for the category and a shorter length indicates a lower relative preference for the category.

According to further embodiment of the method, the disposing further comprises disposing on the computer generated display screen the plurality of graphical elements such that each of the graphical elements is in contact with at least two other graphical elements in addition to the contact point with the circle.

According to another embodiment of the method, the disposing further comprises positioning the plurality of graphical elements around the circle at predetermined positions, the predetermined positions each being associated with one of the plurality of categories.

According to another embodiment of the method, the disposing further comprises positioning the plurality of graphical elements around the circle at predetermined positions, the predetermined positions each being associated with a category group corresponding to at least two categories of the plurality of categories.

In the first embodiment, there is also described a method of generating a visual representation of a flavor profile. The method includes the steps of obtaining flavor characteristic information representing flavor characteristics of a product or recipe for each of a plurality of flavor categories, determining, using a microprocessor, a length of a plurality of graphical elements, each graphical element being assigned to one of the flavor categories, based on the flavor characteristic information corresponding to the respective flavor category, wherein the length of each graphical element indicates the relative value for a flavor category with respect to the other flavor categories, and disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to another embodiment of the method, each flavor category represents a different sensory flavor which is perceived by a user partaking of the product or recipe.

According to another embodiment of the method, the length of each graphical element indicates the relative preference for a flavor category with respect to the other flavor categories such that a greater length indicates a greater relative value for the category and a shorter length indicates a lower relative value for the category.

According to another embodiment of the method, the disposing further comprises disposing on the computer generated display screen the plurality of graphical elements such that each of the graphical elements is in contact with at least one other graphical element in addition to the contact point with the circle.

According to another embodiment of the method, the disposing further comprises positioning the plurality of graphical elements around the circle at predetermined positions, the predetermined positions each being associated with one of the plurality of categories.

According to another embodiment of the method, the disposing further comprises positioning the plurality of graphical elements around the circle at predetermined positions, the predetermined positions each being associated with a category group corresponding to at least two categories of the plurality of categories.

In the first embodiment, there is also described an apparatus for generating a visual representation of a flavor profile. The apparatus includes at least one microprocessor implementing an obtaining unit that obtains preference information representing flavor preferences of a user with respect to each of a plurality of flavor categories, a determining unit that determines a length of a plurality of graphical elements, each graphical element being assigned to one of the flavor categories, based on the preference information corresponding to the respective flavor category, where the length of each graphical element indicates the relative preference for a flavor category with respect to the other flavor categories, and a display unit that disposes on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to another embodiment of the apparatus, each flavor category represents a different sensory flavor which is perceived by the user.

According to another embodiment of the apparatus, the length of each graphical element indicates the relative preference for a flavor category with respect to the other flavor categories such that a greater length indicates a greater relative preference for the category and a shorter length indicates a lower relative preference for the category.

According to another embodiment of the apparatus, the display unit further disposes on the computer generated display screen the plurality of graphical elements such that each of the graphical elements is in contact with at least two other graphical elements in addition to the contact point with the circle.

According to another embodiment of the apparatus, the display unit further positions the plurality of graphical elements around the circle at predetermined positions, the predetermined positions each being associated with one of the plurality of categories.

According to another embodiment of the apparatus, the display unit further positions the plurality of graphical elements around the circle at predetermined positions, the predetermined positions each being associated with a category group corresponding to at least two categories of the plurality of categories.

In the first embodiment, there is also described an apparatus for generating a visual representation of a flavor profile. The apparatus includes at least one microprocessor implementing an obtaining unit that obtains flavor characteristic information representing flavor characteristics of a product or recipe for each of a plurality of flavor categories, a determining unit that determines a length of a plurality of graphical elements, each graphical element being assigned to one of the flavor categories, based on the flavor characteristic information corresponding to the respective flavor category, where the length of each graphical element indicates the relative value for a flavor category with respect to the other flavor categories, and a display unit that disposes on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

According to another embodiment of the apparatus, each flavor category represents a different sensory flavor which is perceived by a user partaking of the product or recipe.

According to another embodiment of the apparatus, the length of each graphical element indicates the relative preference for a flavor category with respect to the other flavor categories such that a greater length indicates a greater relative value for the category and a shorter length indicates a lower relative value for the category.

According to further embodiment of the apparatus, the display unit further disposes on the computer generated display screen the plurality of graphical elements such that each of the graphical elements is in contact with at least one other graphical element in addition to the contact point with the circle.

According to another embodiment of the apparatus, the display unit further positions the plurality of graphical elements around the circle at predetermined positions, the predetermined positions each being associated with one of the plurality of categories.

According to another embodiment of the apparatus, the display unit further positions the plurality of graphical elements around the circle at predetermined positions, the predetermined positions each being associated with a category group corresponding to at least two categories of the plurality of categories.

In the second embodiment, there is also described a method of determining a flavor profile for a user. The method includes the steps of obtaining food preference information provided by a user regarding a plurality of food elements, obtaining correlation information regarding the plurality of food elements and a plurality of flavor categories, the correlation information providing a correlation between preference for each food element and preference for each flavor category, determining, by a microprocessor and based on the food preference information and the correlation information, a relative user preference for each of the plurality of flavor categories, and generating output data for the user based on the result of the determining.

According to another embodiment of the method, the method further includes the steps of obtaining demographic data regarding the user and obtaining second correlation information regarding the demographic data and the plurality of flavor categories, the second correlation information providing a correlation between the demographic data and preference for each flavor category. In addition, the determining step further includes the step of determining, by the microprocessor and based on the demographic data, food preference information, second correlation information and the correlation information, the relative user preference for each of the plurality of flavor categories.

According to another embodiment of the method, the method further includes the steps of obtaining additional food preference information provided by a user regarding food consumption context and obtaining third correlation information regarding the additional food preference and the plurality of flavor categories, the third correlation information providing a correlation between the additional food preference information and preference for each flavor category. In addition, the step of determining further includes the step of determining, by the microprocessor and based on the demographic data, the preference information, the additional preference information, the second correlation information, the third correlation information and the correlation information, the relative user preference for each of the plurality of flavor categories.

According to another embodiment of the method, the food consumption context includes one of information regarding textures, smells, feelings, tastes, cooking methods, and temperatures of food.

According to another embodiment of the method, the method further includes the step of determining neophobic characteristics of the user based on the demographic data, the preference information, and the additional preference information.

According to another embodiment of the method, the neophobic characteristics of the user include one of information indicating the agreeability of the user to new foods and information indicating the agreeability of the user to new styles of foods.

According to another embodiment of the method, the generating generates output data in a format for use in generating a graphical representation of a flavor profile of the user.

According to another embodiment of the method, the method further includes the step of generating a graphical representation of a flavor profile of the user based on the output data.

In the second embodiment, there is also described a method of determining a flavor profile for a food element. The method includes the steps of obtaining characteristic information including ingredient information for the food element, obtaining correlation information regarding the ingredient information and a plurality of flavor categories, the correlation information providing a correlation between ingredients included in the ingredient information and expected perception for each flavor category, determining, by a microprocessor and based on the characteristic information and the correlation information, a relative perception value for each of the plurality of flavor categories for the food element, and generating output data for the user based on the result of the determining.

According to another embodiment of the method, the method further includes the step of obtaining alteration information regarding the ingredient information based on the characteristic information. In addition, the step of determining further includes the step of determining, by the microprocessor and based on the characteristic information, the alteration information and the correlation information, the relative perception value for each of the plurality of flavor categories for the food element.

According to another embodiment of the method, the food element is a recipe for a prepared food.

According to another embodiment of the method, the characteristic information includes cooking instructions.

According to another embodiment of the method, the food element is culinary merchandise.

According to another embodiment of the method, the alteration information includes at least one of ingredient interaction information and preparation transformation information.

According to another embodiment of the method, the method further includes the step of obtaining alteration information regarding the ingredient information based on the characteristic information. In addition, the step of obtaining correlation information further includes the step of obtaining the correlation information regarding the ingredient information and the plurality of flavor categories, the correlation information providing a correlation between ingredients altered according to the alteration information and the expected perception for each flavor category. Also the step of determining further includes the step of determining, by the microprocessor and based on the characteristic information, the alteration information and the correlation information, the relative perception value for each of the plurality of flavor categories for the food element.

In the second embodiment, there is also described an apparatus for determining a flavor profile for a user. The apparatus includes at least one microprocessor implementing a first obtaining unit that obtains food preference information provided by a user regarding a plurality of food elements, a second obtaining unit that obtains correlation information regarding the plurality of food elements and a plurality of flavor categories, the correlation information providing a correlation between preference for each food element and preference for each flavor category, a determining unit that determines, based on the food preference information and the correlation information, a relative user preference for each of the plurality of flavor categories, and a generating unit that generates output data for the user based on the result of the determining by the determining unit.

According to another embodiment of the apparatus, the apparatus further includes a third obtaining unit that obtains demographic data regarding the user and a fourth obtaining unit that obtains second correlation information regarding the demographic data and the plurality of flavor categories, the second correlation information providing a correlation between the demographic data and preference for each flavor category. In addition, the determining unit is further configured to determine, based on the demographic data, food preference information, second correlation information and the correlation information, the relative user preference for each of the plurality of flavor categories.

According to another embodiment of the apparatus, the apparatus further includes a fifth obtaining unit that obtains additional food preference information provided by a user regarding food consumption context, and a sixth obtaining unit that obtains third correlation information regarding the additional food preference and the plurality of flavor categories, the third correlation information providing a correlation between the additional food preference information and preference for each flavor category. In addition, the determining unit further determines, based on the demographic data, the preference information, the additional preference information, the second correlation information, the third correlation information and the correlation information, the relative user preference for each of the plurality of flavor categories.

According to another embodiment of the apparatus, the food consumption context includes one of information regarding textures, smells, feelings, tastes, cooking methods, and temperatures of food.

According to another embodiment of the apparatus, the apparatus includes a second determining unit that determines neophobic characteristics of the user based on the demographic data, the preference information, and the additional preference information.

According to another embodiment of the apparatus, the neophobic characteristics of the user include one of information indicating the agreeability of the user to new foods and information indicating the agreeability of the user to new styles of foods.

According to another embodiment of the apparatus, the generating unit is further configured to generate output data in a format for use in generating a graphical representation of a flavor profile of the user.

According to another embodiment of the apparatus, the apparatus further includes a second generating unit configured to generate a graphical representation of a flavor profile of the user based on the output data.

In the second embodiment, there is also described an apparatus for determining a flavor profile for a food element. The apparatus includes at least one microprocessor implementing a first obtaining unit that obtains characteristic information including ingredient information for the food element, a second obtaining unit that obtains correlation information regarding the ingredient information and a plurality of flavor categories, the correlation information providing a correlation between ingredients included in the ingredient information and expected perception for each flavor category, a determining unit that determines, based on the characteristic information and the correlation information, a relative perception value for each of the plurality of flavor categories for the food element, and a generating unit that generates output data for the user based on the result of the determining by the determining unit.

According to another embodiment of the apparatus, the apparatus further includes a third obtaining unit that obtains alteration information regarding the ingredient information based on the characteristic information. In addition, the determining unit further determines, based on the characteristic information, the alteration information and the correlation information, the relative perception value for each of the plurality of flavor categories for the food element.

According to another embodiment of the apparatus, the food element is a recipe for a prepared food.

According to another embodiment of the apparatus, the characteristic information includes cooking instructions.

According to another embodiment of the apparatus, the food element is culinary merchandise.

According to another embodiment of the apparatus, the alteration information includes at least one of ingredient interaction information and preparation transformation information.

According to another embodiment of the apparatus, the apparatus further includes a fourth obtaining unit configured to obtain alteration information regarding the ingredient information based on the characteristic information. In addition, the third obtaining unit further obtains the correlation information regarding the ingredient information and the plurality of flavor categories, the correlation information providing a correlation between ingredients altered according to the alteration information and the expected perception for each flavor category. The determining unit also determines, based on the characteristic information, the alteration information and the correlation information, the relative perception value for each of the plurality of flavor categories for the food element.

In the third embodiment, there is also described a method of providing food element recommendations based on flavor. The method includes the steps of obtaining flavor profile information of a user indicating a relative user preference for each of a plurality of flavor categories, performing a query of food elements based on constraint inputs, each food element having associated therewith flavor profile information indicating the relative perception value for each of the plurality of flavor categories for the food element, comparing flavor profile information of each of the food elements, returned by the query, against the flavor profile information of the user to determine food elements having a greatest positive correlation, generating a list of recommended food elements based on the result of the comparing, and presenting the list of recommended food elements to the user.

According to another embodiment of the method, the method further includes the step of second comparing characteristic information of each of the food elements, returned by the query, against the flavor profile attribute information of the user to determine food elements having a greatest positive correlation. In addition, the step of generating further includes the step of generating the list of recommended food elements based on the result of the comparing and the second comparing.

According to another embodiment of the method, the characteristic information of each of the food elements includes at least one of temperature, preparation time, allergens, ingredients, texture, caloric value, fat value, carbohydrate value, vitamin value, health rating.

According to another embodiment of the method, the attribute information of the user includes at least one of demographic information, allergy information, healthy eating preferences, diet or food program preferences, ingredient substitution information, type and style of food preference, neophobia information, and preparation time preferences.

According to another embodiment of the method, the constraint inputs include information indicating previous returned results such that previous returned results are excluded from the query.

According to another embodiment of the method, the constraint inputs include user generated search terms.

According to another embodiment of the method, the constraint inputs include constraints based on at least one of date of the query, time of the query, weather at the location of the query and the location of the query.

According to another embodiment of the method, the constraint inputs include constraints based on recent trends at the time of the query.

In the third embodiment, there is also described a method of providing food element recommendations based on flavor. The method includes the steps of obtaining flavor profile information of a user indicating a relative user preference for each of a plurality of flavor categories, performing a query of food elements based on constraint inputs, each food element having associated therewith flavor profile information indicating the relative perception value for each of the plurality of flavor categories for the food element, wherein the performance of the query further includes comparing flavor profile information of each of the food elements against the flavor profile information of the user provided as the constraint inputs, generating a list of recommended food elements based on the result of the query, and presenting the list of recommended food elements to the user.

According to another embodiment of the method, the comparing step further comprises comparing a value for each flavor category of the flavor profile information of each of the food elements against a value for each flavor category of the flavor profile information of the user to determine a compatibility score for each of the flavor categories.

According to another embodiment of the method, the comparing step further comprises performing a weighing operation to determine an overall compatibility score based on the compatibility scores determined for each of the flavor categories.

According to another embodiment of the method, the plurality of flavor categories each represent a different flavor perception which is experienced when partaking of the food element.

In the third embodiment, there is also described an apparatus for providing food element recommendations based on flavor. The apparatus includes at least one microprocessor implementing an obtaining unit that obtains flavor profile information of a user indicating a relative user preference for each of a plurality of flavor categories, a query unit that performs a query of food elements based on constraint inputs, each food element having associated therewith flavor profile information indicating the relative perception value for each of the plurality of flavor categories for the food element, a comparing unit that compares flavor profile information of each of the food elements, returned by the query, against the flavor profile information of the user to determine food elements having a greatest positive correlation, a generating unit that generates a list of recommended food elements based on the result of the comparing, and a display unit that presents the list of recommended food elements to the user.

According to another embodiment of the apparatus, the apparatus further includes a second comparing unit that compares characteristic information of each of the food elements, returned by the query, against the flavor profile attribute information of the user to determine food elements having a greatest positive correlation. In addition, the generating unit further generates the list of recommended food elements based on the result of the comparing by the comparing unit and the comparing by the second comparing unit.

According to another embodiment of the apparatus, the characteristic information of each of the food elements includes at least one of temperature, preparation time, allergens, ingredients, texture, caloric value, fat value, carbohydrate value, vitamin value, health rating.

According to another embodiment of the apparatus, the attribute information of the user includes at least one of demographic information, allergy information, healthy eating preferences, diet or food program preferences, ingredient substitution information, type and style of food preference, neophobia information, and preparation time preferences.

According to another embodiment of the apparatus, the constraint inputs include information indicating previous returned results such that previous returned results are excluded from the query.

According to another embodiment of the apparatus, the constraint inputs include user generated search terms.

According to another embodiment of the apparatus, the constraint inputs include constraints based on at least one of date of the query, time of the query, weather at the location of the query and the location of the query.

According to another embodiment of the apparatus, the constraint inputs include constraints based on recent trends at the time of the query.

In the third embodiment, there is also described an apparatus for providing food element recommendations based on flavor. The apparatus includes at least one microprocessor implementing an obtaining unit that obtains flavor profile information of a user indicating a relative user preference for each of a plurality of flavor categories, a query unit that performs a query of food elements based on constraint inputs, each food element having associated therewith flavor profile information indicating the relative perception value for each of the plurality of flavor categories for the food element, wherein the performance of the query further includes comparing flavor profile information of each of the food elements against the flavor profile information of the user provided as the constraint inputs, a generating unit that generates a list of recommended food elements based on the result of the query, and a display unit that presents the list of recommended food elements to the user.

According to another embodiment of the apparatus, the comparing unit is further configured to compare a value for each flavor category of the flavor profile information of each of the food elements against a value for each flavor category of the flavor profile information of the user to determine a compatibility score for each of the flavor categories.

According to another embodiment of the apparatus, the comparing unit is further configured to perform a weighing operation to determine an overall compatibility score based on the compatibility scores determined for each of the flavor categories.

According to another embodiment of the apparatus, the plurality of flavor categories each represent a different flavor perception which is experienced when partaking of the food element.

Hereinafter, exemplary implementations will be described with reference to the accompanying drawings. However, variations and modifications may be made without departing from the basic concepts described herein. As used herein the words "a" and "an" and the like carry the meaning of "one or more."

FIG. 1 is a diagram illustrating a flavor lifecycle. The inventors of the present disclosure have determined that the process of applying flavor can be organized into the flavor lifecycle. Although the invention is not limited to only these stages, exemplary stages of the food and flavor lifecycle are: 1) inspire, 2) anticipate, 3) shop, 4) prepare, and 5) celebrate.

As is illustrated in FIG. 1, the inspire stage 1 is the stage in which the cook is looking for recipes or suggestions to inspire the meal preparation. Different kinds of cooks may have different needs during the inspire stage. For example, an excited new cook may be overwhelmed by a large amount of inspiration, while an experienced cook may have a large repertoire of tried and true meals and thus may believe that she has less need for inspiration.

The anticipate stage 2 is the stage in which the cook is creating a shopping list. The anticipate stage is a natural progression from the inspiration stage. In addition, the anticipate stage often includes searching circulars for sales or discovering coupons for certain products which will be used to implement the meals previously imagined during the inspire stage.

The shop stage 3 is the stage where the products which are discovered during the anticipate stage are purchased. These products are often purchased in local stores or on-line.

The prepare stage 4 is the stage in which the meals which were planned in the inspire, anticipate, and shop stages are implemented. Different kinds of cooks have different needs in the prepare stage. For instance, a new cook may not have the skills, tools or products she needs to successfully implement meals. In contrast, an experienced cook may be able to implement a meal even without a recipe. Typical cooks will likely need recipes, videos or even how-to guides to help them implement meals.

The celebration stage 5 is the stage in which cooks can share the result of the preparation. This may include how the meal was received, how easy or difficult the meal was to prepare, etc.

Each of these stages may be enhanced using a flavor advisement system. One example of a flavor advisement system is FlavorPrint® created by McCormick®. The flavor advisement system described as follows utilizes Flavor-Print® to illustrate the features of the embodiments of the invention but is not limited thereto.

The flavor advisement system may be represented to a user by way of a user flavor advisement mark which represents each user's unique flavor sensory impression profile. These flavors represent a much larger flavor and aroma continuum. This user flavor advisement mark (herein "flavor mark") is generated and displayed by a flavor mark generating system implemented by at least one microprocessor. However, the flavor advisement system is not limited to representing a user flavor advisement mark and may operate entirely without providing a visual representation of the user flavor advisement mark to the user.

FIG. 2 illustrates the flavor mark generating system. The user flavor mark input data 10 or the food element flavor mark input data 15 is received by the flavor mark generating system from either the user flavor mark determining system or the food element flavor mark determining system, which is described in detail in a later section. The user flavor mark input data 10 includes information regarding the flavor preferences of the particular user for whom the flavor mark is to be displayed. The flavor mark input data 10 is input into the flavor mark display determining unit 11 which associates the preference data in the user flavor mark input data with predetermined categories. Each category represents a different flavor characteristic such that at least one of the categories is found in every food, spice and recipe. Each graphical spoke of the user flavor mark represents the user's preference with regard to the respective category. The flavor mark display determining unit 11 converts the preference data found in the user flavor mark input data 10 into visual representation data which is used by the display unit 12 to display a user flavor mark.

The food element flavor mark input data 15 includes information regarding the flavor characteristics of the particular food element for which the flavor mark is to be displayed. The flavor mark input data 15 is input into the flavor mark display determining unit 11 which associates the characteristic data in the food element flavor mark input data 15 with predetermined categories. Each category represents a different flavor characteristic such that at least one of the categories is found in every food, spice and recipe. Each graphical spoke of the food element flavor mark represents the food element's perceived value for the respective category. The flavor mark display determining unit 11 converts the characteristic data found in the food element flavor mark input data 15 into visual representation data which is used by the display unit 12 to display a food element flavor mark.

Figure 3B:
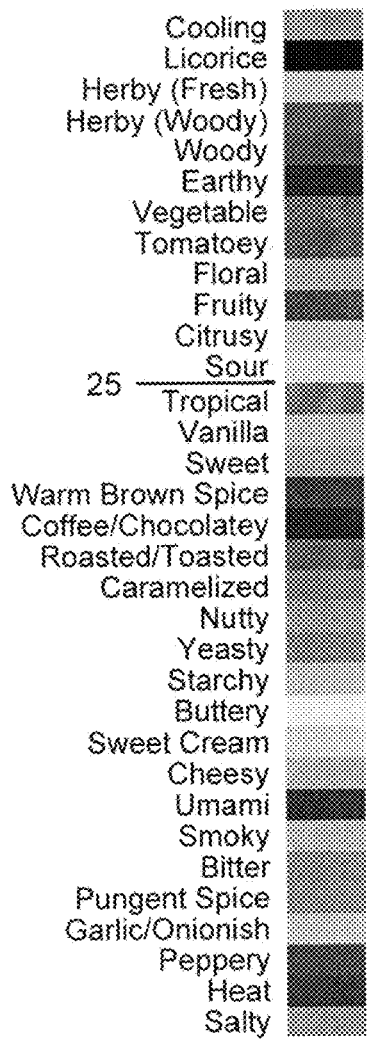

FIGS. 3A and 3B illustrate an example of the user flavor mark according to one embodiment of the invention. In the example shown in FIG. 3A, the user flavor mark is displayed such that each category, which is associated with a particular flavor characteristic or with a particular flavor, is represented according to the intensity indicated in the flavor mark input data 10. Each slice representing a category is represented by a different color and is shown as being longer in length according to the preference of the user. Thus, category 2 shown in FIG. 3A represents a category for which the user has higher preference. Category 22 shown in FIG. 3A represents a category for which the user has lower preference. The categories are relative representations such that a category with a greatest length represents the characteristic or flavor which the user prefers the most and vice versa. Alternatively, the representations can be relative with respect to sub groups within the total number of categories. Although the categories may be relative the categories may not be mutually exclusive such that more preference for one category does not automatically indicate less preference for another category. However, in an alternative embodiment, the categories may be linked such that preference is mutually exclusive.

FIG. 3B illustrates an alternative representation 25 of the user flavor mark input data 10. This illustration can be displayed independently or together with the user flavor mark 20 shown in FIG. 3A. This representation lists the name of the category as well as a line or bar indicating the level of preference of the user.

Figure 4:
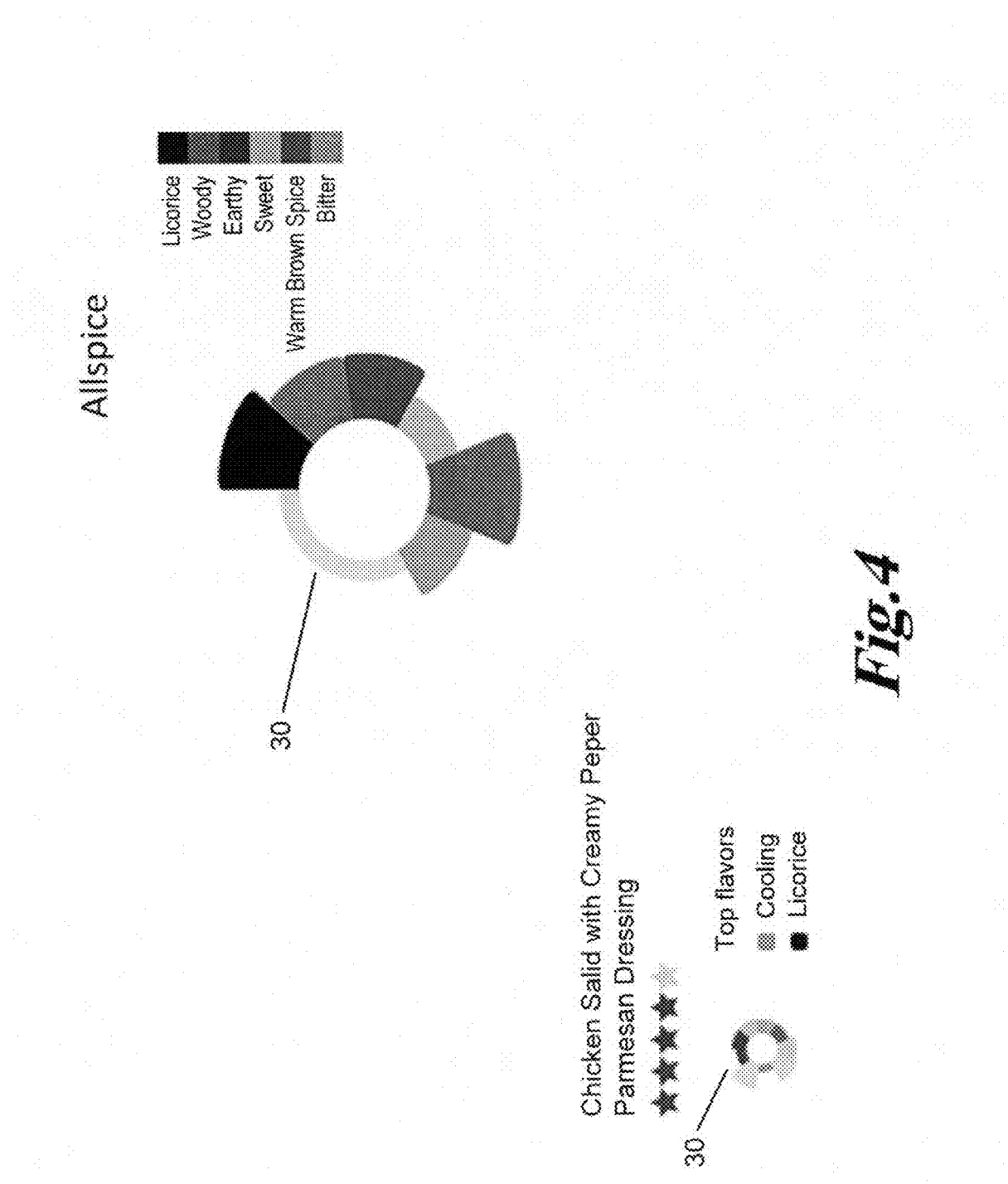
FIG. 4 illustrates a food element flavor mark for a product and a recipe according to one embodiment of the invention.

FIG. 4 illustrates a representation of the food element flavor mark for a recipe or a product. The food element flavor mark represents how much relative flavor is found in the recipe or product for a particular category. For instance, for the flavor category of "Woody", the Allspice example shown in FIG. 4, provides an example of relatively less value than the value for "licorice" and relatively more value than the value for "sweet". The food element flavor mark may also in an alternative embodiment illustrate how much flavor a food element has on an absolute scale for a particular category. For example, with respect to the category "Woody" the Allspice example may have a value of 3 out of 10, where 10 is the maximum perception of the flavor "Woody" and 0 is no perception of the flavor "Woody". The scale is not limited to 10 but may be any scale which provides an indication of amount.

For instance, FIG. 4 illustrates the food element flavor mark 30 of the Allspice product. The food element flavor mark 30 of a product can include all categories similar to the user flavor mark 20 shown in FIG. 3A or may be limited to some percentage of the total number of categories. The shown categories may be the categories with the highest representation in the product or recipe, the categories which are greater than zero, or the categories which are most relevant to the product or recipe or the category of product or recipe. Further, the displayed categories can be filtered based on the preferences of the user to provide the categories which are most useful or most relevant to the user.

The food element flavor mark for a product or recipe may be a representation of the perceived intensity of the relative category with respect to the other categories. Alternatively, the flavor mark may be a representation of the perceived intensity of the relative category with respect to a product which would be perceived as having no flavor. In addition, the food element flavor mark may be a representation of the perceived intensity of the relative category with respect to an absolute scale as is discussed previously.

The food element flavor mark may be associated with a recipe. Such a food element flavor mark would represent the flavors which would be perceived by a user partaking of the food created by the recipe. Because a completed food includes many different ingredients, the associated food element flavor mark may be a conglomeration of the various flavors of the individual ingredients, and as modified by the cooking methods and preparation sequence. The details regarding how the food element flavor mark input data 15 is obtained are described later.

The food element flavor mark representing a recipe may have a greater number of categories displayed than the food element flavor mark of a product. Alternatively, the food element flavor mark of a recipe may have the same or a lower number of categories displayed than the food element flavor mark of a product. In addition to the display of the food element flavor mark, the top flavors can be displayed for a recipe or a product. These may represent the flavors which would be the most perceived by a user partaking of the product or recipe.

The user flavor mark may be a dynamic representation that is updated as the user's flavor preferences are updated or better determined. The user flavor mark represents the user flavor profile and provides the user with a visual representation of the user's flavor preferences. The user flavor profile is part of the user's overall user preference profile, which includes a more detailed study of the elements which characterize the user. Although the user flavor profile is what is expressly represented by the user flavor mark, elements of the user preference profile are used to determine the user flavor profile as is described in a later section and are thus indirectly represented in the user flavor mark.

Figure 5B:
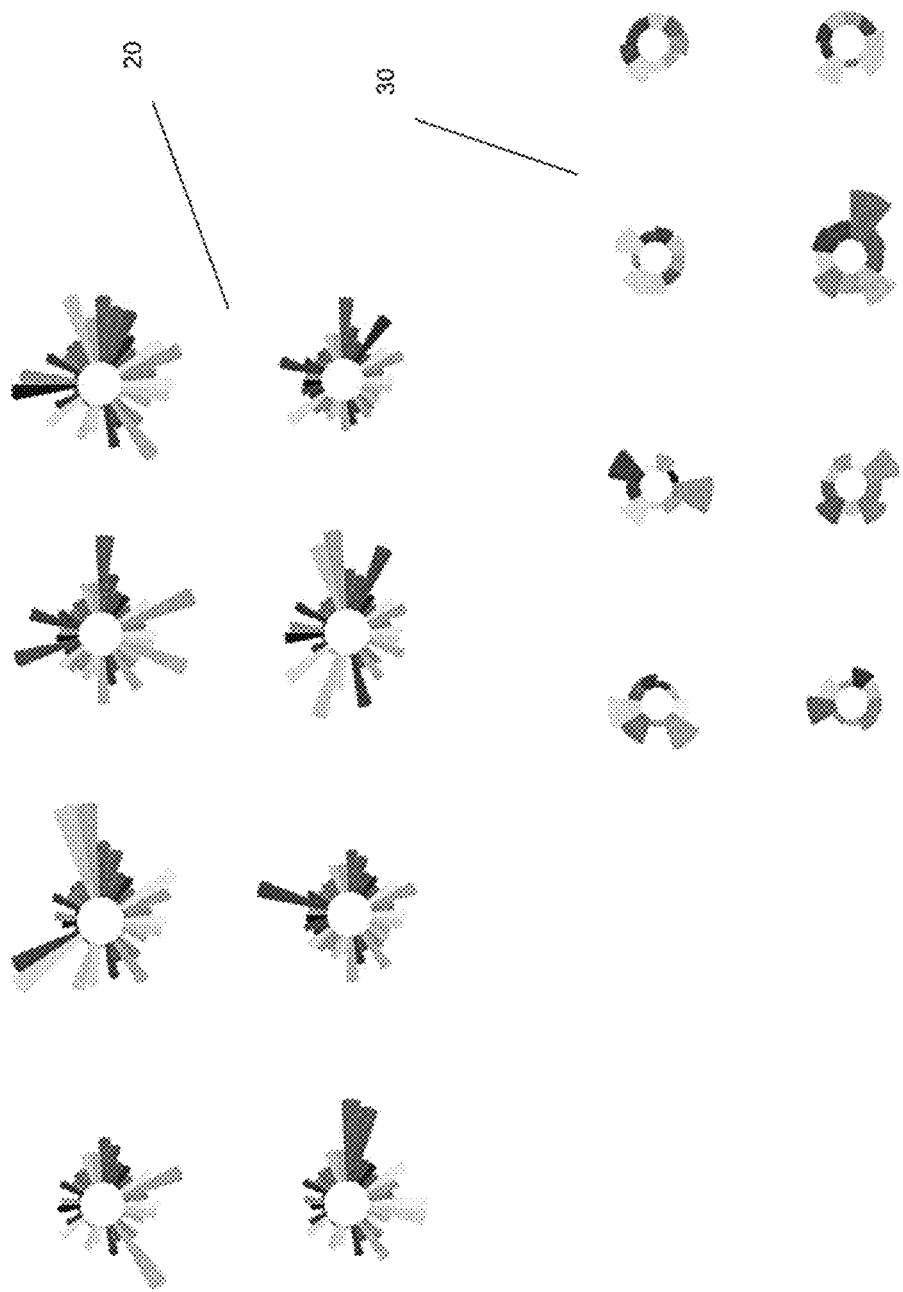
FIG. 5B illustrates a number of exemplary user and food element flavor marks.

FIG. 5A illustrates the organization of the user preference profile 35. As is illustrated in FIG. 5B the user flavor profile 36 is included in the user preference profile 35. In addition, as is discussed later in the disclosure, a user texture profile 38 may also be included in the user preference profile 35. In addition to the user flavor profile 36, the user preference profile 35 includes other information of the user 37. As was noted previously, this information represents a detailed study of the elements that characterize the user. A more detailed explanation, as well as numerous examples of this information is provided later in the disclosure. The user preference profile may be organized for a single user or for a group of users, such as a household.

In addition, as is illustrated in FIG. 5B, the user flavor mark may be very different for different users and the food element flavor mark may be very different for different products or recipes. In addition, each of the user flavor mark and the food element flavor mark may be displayed with every category or with only a percentage of the categories.

Figure 6:
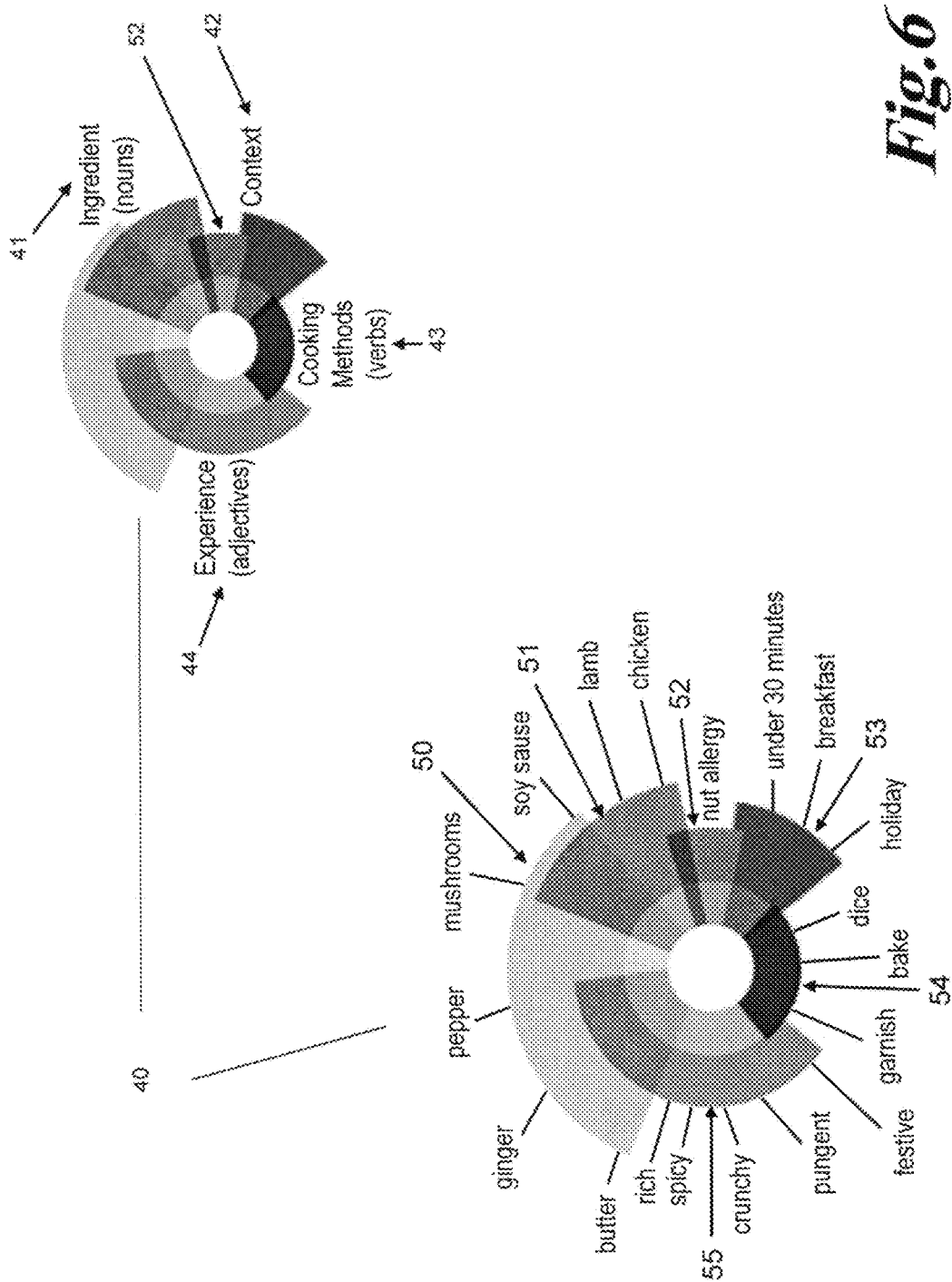
FIG. 6 illustrates an alternative embodiment of the user flavor mark.

In an alternative embodiment shown in FIG. 6, the user flavor mark 40 may include categories which are subdivided into groups and displayed on this basis. For instance, the categories may be divided into ingredients (nouns) 41, food experiences (adjectives) 44, cooking methods (verbs) 43, and flavor context 42. The preferred ingredients may include different meats, vegetables, dairy, eggs, spices, sauces, etc. 50 & 51. The preferred food experiences may include different textures, smells, feelings, tastes, temperatures, etc. 55 The preferred cooking methods may include different ways of preparing the food such as by baking, dicing, garnishing, etc. 54. Flavor context may include any allergies or specific food needs that the user may experience 52. The flavor context also includes the context in which the user prefers to have food prepared, such as quickly prepared foods (under 30 minutes), breakfast foods or holiday foods 53.

In this embodiment, the user flavor mark is visually represented using a multi-layer wheel in which different categories such as the preferred ingredients (nouns) 41, preferred food experiences (adjectives) 44, preferred cooking methods (verbs) 43, and flavor context 42, are assigned a different color and position around the wheel. In addition, different groups within each category are given a different shade of the color assigned to the category. For example, in the category which corresponds to preferred ingredients (nouns), different groups within the category are assigned different shades 50 & 51.

The visual representation of the user flavor mark 40 illustrates the strength of the preference based on how far a particular category reaches out from the center. For instance, in the user flavor mark shown in FIG. 6, the strength of the user's preference for particular ingredients is stronger than the user's preference for cooking methods. This can be seen from the visual representation of the user flavor mark because the light slice 50 reaches farther out from the middle than does the dark slice 53. When the user flavor mark input data determines that the user has strong feelings about a certain category, this category will be given greater weight. This greater weight is represented in the user flavor mark.

The visual representation of the user flavor mark 40 also illustrates the depth of the preference based on how wide the particular slice is displayed. For instance, if the user has many different or diverse likes for cooking methods, this slice can be represented as being wider (covering more circumference of the inner circle) than another slice.

The visual representation of the user flavor mark 40 illustrates, for any category, the breadth of the particular subject's preference as well as the intensity of the preference for a particular category.

Figure 7:
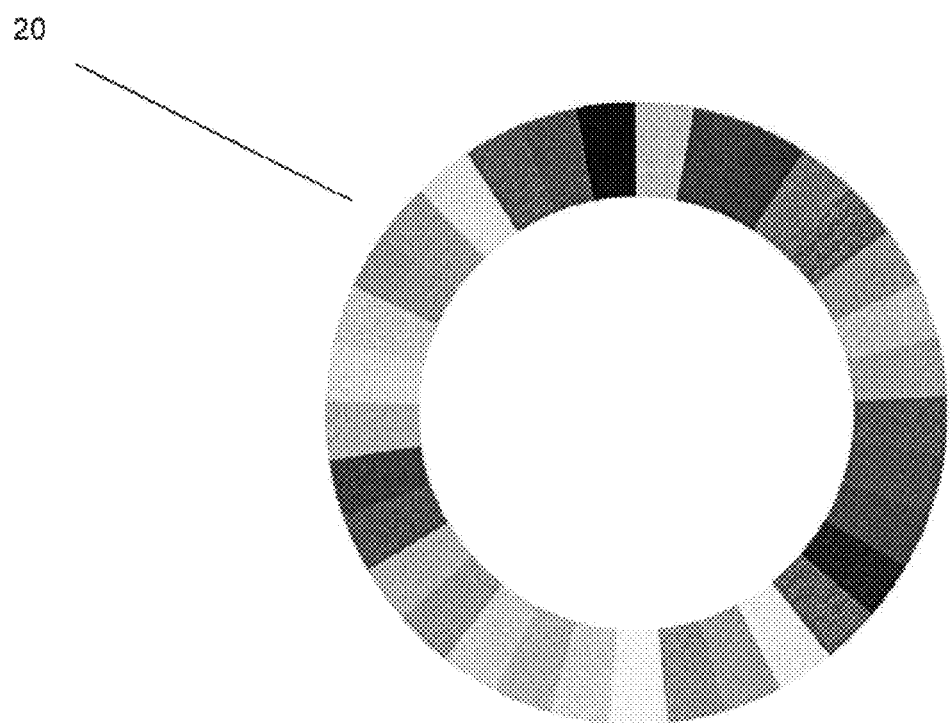
FIG. 7 illustrates visual representation of one embodiment of the user flavor mark for which each of the categories is set to the lowest value above zero.

In each of the embodiments shown in FIGS. 3-6, the position of the categories may be predetermined. For instance, as is illustrated in FIG. 3A, each of the different flavor categories is assigned to a specific position around the center circle. FIG. 7 illustrates an example of the circle for which each flavor category is displayed at a minimum value.

Figure 21:
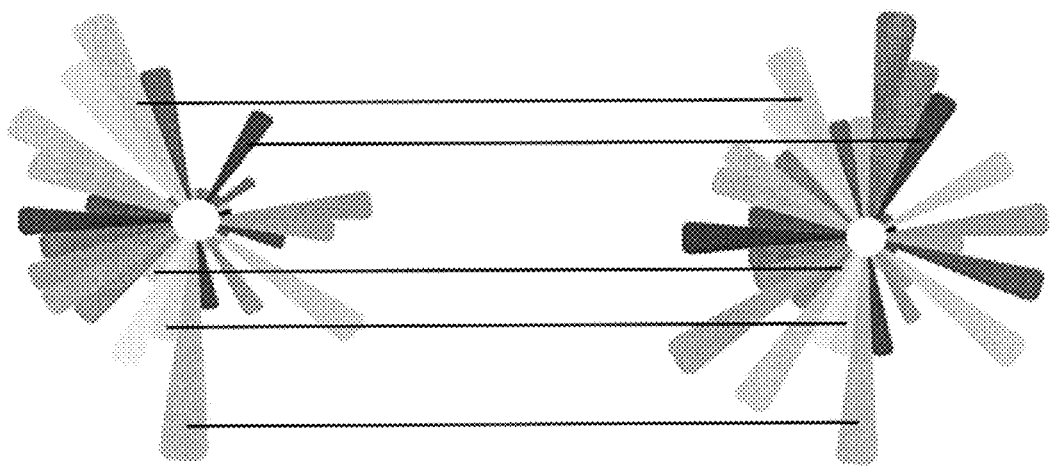
FIG. 21 illustrates an example of a comparison between user flavor marks.

In this embodiment, the position of the categories is the same for each user for which a user flavor mark is generated. This enables multiple user flavor marks for different users to be easily compared visually, as is shown in FIG. 21. FIG. 5B illustrates the different user flavor marks 20 for different users. Each of the spokes, corresponding to a particular category, is positioned at the same location around the center circle in each of the marks.

In contrast, with regard to the food element flavor marks 30, which include only a percentage or subset of the total number of categories, the position of the categories are not set. The subset of the total number of categories may be, for example, the top nine categories of the food element. The position of these categories is determined based on that set positions for the user flavor mark 20 and are positioned to be as close as possible to the set positions for the user flavor mark 20. Alternatively, the position of the categories for the food element flavor mark 30 can be determined based on the top categories for the object for which the food element flavor mark is displayed.

Alternatively, the user flavor marks 20 may be generated such that the positions of the categories are not set. Further, in the alternative embodiment, the food element flavor marks 30 may be generated such that the positions of the categories are set based on groups such that all categories within one group are always displayed in a predetermined position. For instance, if the categories represented by the colors green, red, pink and blue are assigned to a group, this group can be assigned to the top right quarter of the flavor mark such that if any of these categories are selected to be displayed, such category will always be displayed in the top right quarter.

Figure 8B:
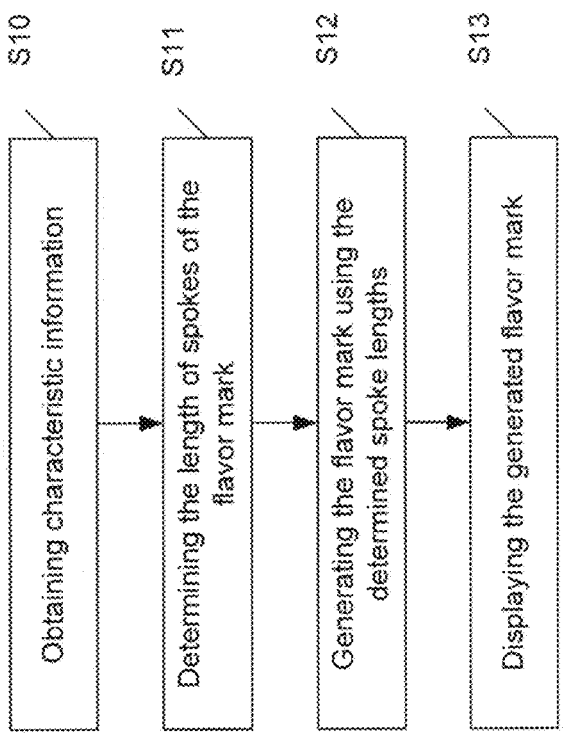
FIG. 8B illustrates a process diagram describing the processes of generating a food element flavor mark for a recipe or product.
Figure 8A:
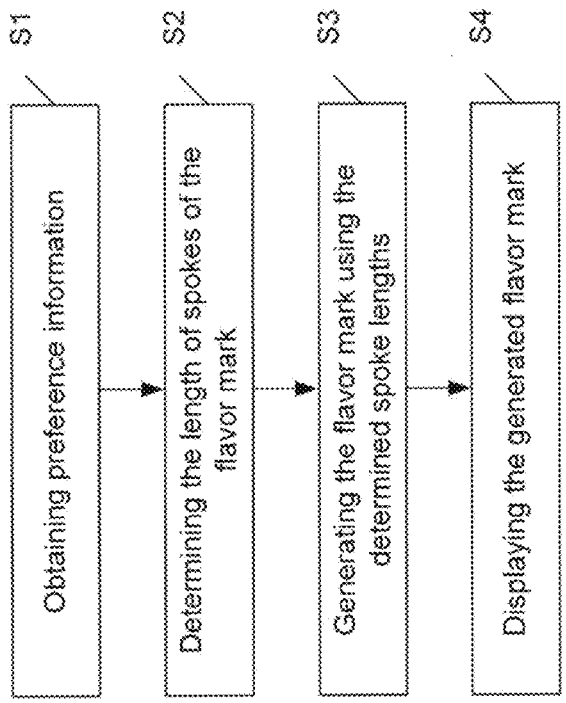
FIG. 8A illustrates a process diagram describing the processes of generating a user flavor mark.

FIG. 8A illustrates the processes of generating a user flavor mark. FIG. 8B illustrates the processes of generating a food element flavor mark. These processes generate a visual representation of a flavor profile. The processes may also be applied to other entities in addition to users, recipes or products.

FIG. 8A illustrates the process for generating a user flavor mark for a single user or a group of users.

In Step S1, preference information is obtained representing flavor preferences of a user with respect to each of the different flavor categories. The preference information shown in FIG. 2 as flavor mark input data 10, is obtained for a particular user and is used to generate the user flavor mark.

In step S2, a microprocessor is used to determine the length of each of the graphical spokes corresponding to a category. Spoke 21 shown in FIG. 3A is an example of a spoke having a relative longer length, while spoke 22, shown in FIG. 3A, is an example of a spoke having a relative shorter length. The length of each of the graphical spokes is determined based on the preference information corresponding to the particular category associated with the respective graphical spoke. For instance, spoke 21 is determined to be longer in FIG. 3A based on the fact that the user preference information indicates that the user relatively prefers the "tomatoey" flavor.

Figure 8D:
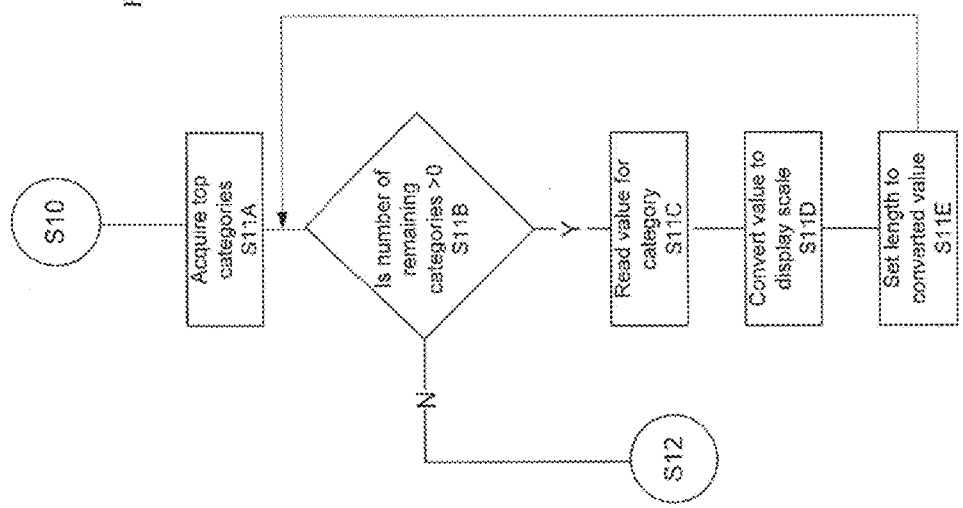
FIG. 8D illustrates further detail for the process diagram describing the processes of generating a food element flavor mark for a recipe or product.
Figure 8C:
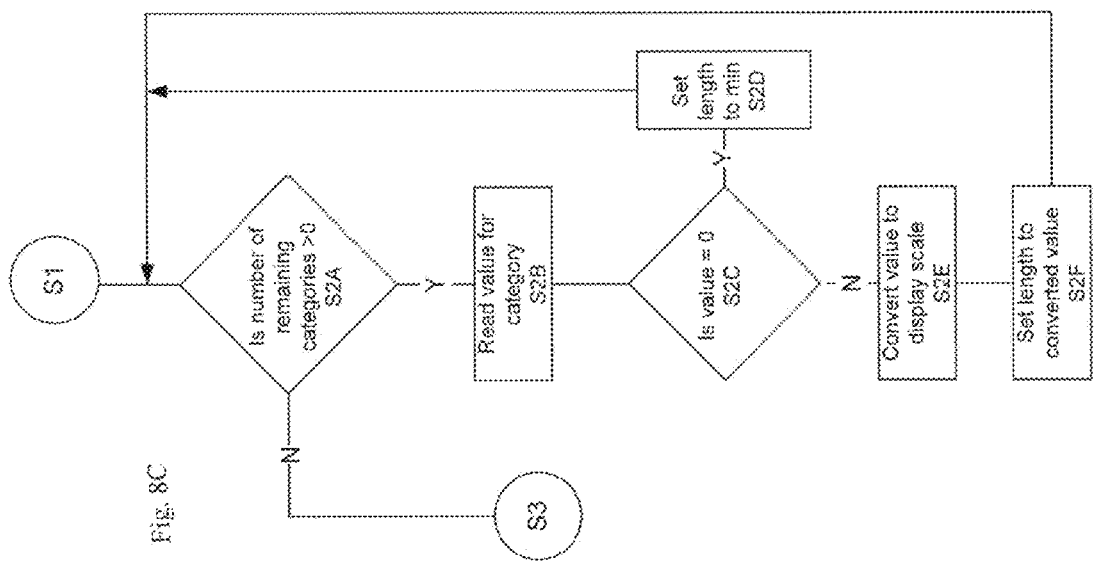
FIG. 8C illustrates further detail for the process diagram describing the processes of generating a user flavor mark.

FIG. 8C illustrates further detail regarding the process of determining the length of each of the graphical spokes corresponding to a category. As is shown in FIG. 8C, once the preference information representing flavor preferences of the user with respect to each of the different flavor categories is obtained in step S1 the flow proceeds to step S2A which determines whether the number of categories which have not yet been processed is greater than 0. The process steps through each of the categories to be displayed in the user flavor mark in order to set the length of the spokes for the respective categories. If the answer to step S2A is yes, the flow proceeds to step S2B where a value for the category is read from the preference information found in the user flavor mark input data 10. The flow then proceeds to step S2C in which it is determined if the value for the category is zero. When the answer to this step is yes, the flow proceeds to step S2D, which sets the length of the spoke for the category to the minimum value and the flow returns to step S2A. When the answer to step S2C is no, the flow proceeds to step S2E, which converts the value found in the preference information to the display scale for the spoke. Alternatively, the value in each category in the user flavor mark input data 10 may previously be converted into the display scale. For example, if the display scale has ten different lengths, the preference values for the specific categories may be set according to the ten different scaled lengths. This process can be performed in step S2E or can be performed beforehand and included in the user flavor mark input data 10. In step S2F, the converted or read value is used to set the length of the respective spoke. The flow then returned to step S2A. When the answer at step S2A is no, the flow proceeds to step S3.

In step S3, the user flavor mark is generated with the determined length. The graphical spokes are generated to be disposed around a center circle such that each of the spokes contacts the circle at a contact point and protrudes from the contact point away from the circle according to the determined length. As shown in FIG. 3A, the graphical spokes are disposed such that each of the spokes is in contact with at least two other graphical spokes, in addition to the contact point with the circle, without overlapping the other neighboring graphical spokes. The spokes are also narrower closer to the circle and wider farther away from the circle. This allows the spokes to continue to be in contact as they protrude from the circle. Alternatively, in the embodiment shown in FIG. 6, the elements representing the categories do overlap the neighboring graphical elements.

In step S4, the generated user flavor mark is displayed on a computer generated display screen.

FIG. 8B illustrates the process for generating a food element flavor mark for a recipe or product or for a group of recipes or products.

In Step S10, flavor characteristic information is obtained representing flavor characteristics of a product or recipe for each of a plurality of flavor categories. The flavor characteristic information shown in FIG. 2 as flavor mark input data 15, is obtained for a particular recipe or product and is used to generate the food element flavor mark.

In step S11, it is determined, using a microprocessor, the length of each of the graphical spokes corresponding to a category. Spoke 21, shown in FIG. 3A is an example of a spoke having a relative longer length, while spoke 22 shown in FIG. 3A, is an example of a spoke having a relative shorter length. The length of each of the graphical spokes is determined based on the flavor characteristic information corresponding to the particular category associated with the respective graphical spoke. For instance, the licorice spoke is determined to be longer in FIG. 4 based on the fact that the flavor characteristic information indicates that the product produces a relatively greater "licorice" flavor. Alternatively, the licorice spoke is determined to be longer in FIG. 4 based on the fact that the flavor characteristic information indicates that the product produces a greater "licorice" flavor with respect to the absolute scale.

FIG. 8D illustrates further detail regarding the process of determining the length of each of the graphical spokes corresponding to a category. As is shown in FIG. 8D, once the flavor characteristic information corresponding to the categories is obtained in step S10 the flow proceeds to step S11A which, in one embodiment, determines the top categories for the food element flavor mark. In an alternate embodiment, this step is skipped as all the categories are displayed for the food element. The flow then proceeds to step S11B, which determines whether the number of categories which have not yet been processed is greater than 0. The process steps through each of categories to be displayed in the food element flavor mark in order to set the length of the spokes for the respective categories. If the answer to step S11B is yes, the flow proceeds to step S11C where a value for the category is read from the characteristic information found in the food element flavor mark input data 15. The flow then proceeds to step S11D, which converts the value found in the characteristic information to the display scale for the spoke. Alternatively, the value in each category in the food element flavor mark input data 15 may previously be converted into the display scale. For example, if the display scale has ten different lengths, the characteristic values for the specific categories may be set according to the ten different scaled lengths. This process can be performed in step S11D or can be performed beforehand and included in the food element flavor mark input data 15. In step S2E, the converted or read value is used to set the length of the respective spoke. The flow then returns to step S11B. When the answer at step S11B is no, the flow proceeds to step S12.

In step S12, the food element flavor mark is generated with the graphical spokes having the determined length. The graphical spokes are disposed around a center circle such that each of the spokes contacts the circle at a contact point and protrudes from the contact point away from the circle according to the determined length. As is shown in FIG. 4, the graphical spokes are disposed on the computer generated display screen such that each of the spokes is in contact with one or two other graphical spokes in addition to the contact point with the circle, without overlapping the other neighboring graphical spokes. The spokes are also narrower closer to the circle and wider farther away from the circle. This allows the spokes to continue to be in contact as they protrude from the circle. Alternatively, in the embodiment shown in FIG. 6, the elements representing the categories do overlap the neighboring graphical elements.

In step S13, the generated food element flavor mark is displayed on a computer generated display screen.

FIG. 9 illustrates a device used for determining user flavor mark input data 10 which is used to generate a user flavor mark. The device utilizes a computer and at least one microprocessor to obtain flavor preference data and to generate the user flavor mark data.

The flavor mark data generating unit 110 receives input from at least a flavor reference data storage 101, an obtained data storage 102 and a preference obtaining unit 100. These inputs are utilized by the flavor mark data generating unit 110 to derive the user flavor mark input data 10. Further description of the process of deriving the user flavor mark input data 10 will be described as follows.

Figure 10:
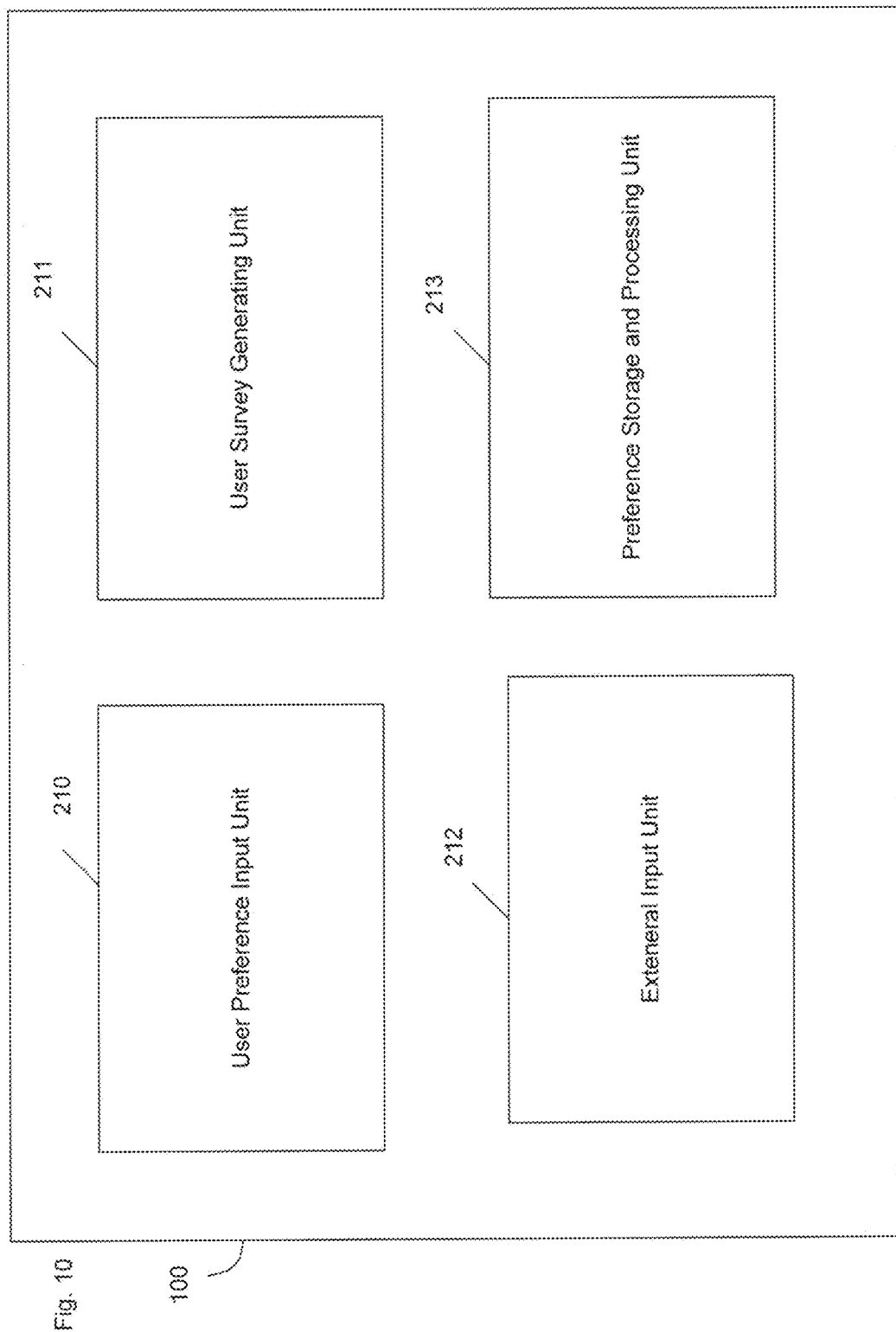
FIG. 10 illustrates a block diagram of the elements of the preference obtaining unit.

FIG. 10 illustrates in more detail the elements of the preference obtaining unit 100. Included in the preference obtaining unit 100 is, at least, a user preference input unit 210, a user survey generating unit 211, an external input unit 212 and a preference storage unit 213. The preference obtaining unit 100 is not limited to these particular elements and can be constructed in a different organization.

The user preference input unit 210 describes an element which obtains preference information from a user. This obtaining of preference information may be via a web interface implemented by a web server and client device or via any interface which obtains preference information from a user and transmits this obtained information via a network or some other communication implementation to a server which implements the preference obtaining unit 100.

Figure 11A:
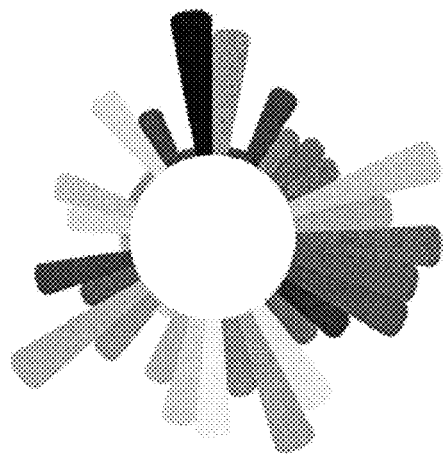
Figure 11B:
Figure 11C:

In one embodiment, the user preference input unit 210 is implemented by a web survey. FIGS. 11A-D illustrate an example of a web survey according to one embodiment of the invention. FIG. 11A shows a getting started page 220 which instructs the user regarding the survey process. FIG. 11B shows an example of a dietary preference selection 221. In this example, the user is provided with the option of "eat most things," "vegetarian", and "vegan", however other options relating to dietary preference are also possible. FIG. 11 C illustrates an example of determination regarding a user's preference. This example illustrates that user providing a binary opinion regarding select foods and flavors. The survey can also provide the user with different types of mechanisms to indicate preference such as rating from 1-10 or an indication of several levels of like or dislike. Further detail regarding how dislikes are treated is described later in the description. FIG. 11D illustrates an example of an allergy/intolerance input survey.

The survey may be conducted on an individual or group basis. The individual survey results may also be combined to generate group survey results. The survey may also be conducted on a household basis such that the group is the members of the household.

The user preference input unit 210 may also obtain preference information by using information from external websites or locations such as social networks, which the user has permitted to be accessed. Information from shopper's cards which the user has permitted to be accessed may also be used to obtain the preference information. In addition, tools such as a dinner party kit can be used to obtain preference information from a user or users in a fun and social setting. For example, the dinner party kit could provide an opportunity for multiple people to fill out information before or while attending a dinner or party. This information can be input via the user preference input unit 210 using mobile devices such as a tablet computer, etc. Such activities would allow an interactive way of obtaining preference information.

The user preference input unit 210 further obtains feedback data from the flavor platform which will be described in more detail later. The information that is provided to the user preference input unit 210 is obtained through mini surveys, though postings and through the general application of the user flavor mark by the user.

The user survey generating unit 211 included in the preference obtaining unit 100 generates the survey for obtaining preference information for the user. In the case of an network based survey, the user survey generating unit 211 can update and tailor the survey based on previous answers provided by the user. The user survey generating unit 211 can also update the global survey which is the basis of the survey for each user based on previous responses of the universe of users.

The user survey generating unit 211 is able to tailor the survey based on whether the survey is for an individual user or for a group of users. The user survey generating unit 211 is able to tailor the survey based on factors such as location or type of device used for the survey and update the survey based on the demographics or assumed demographics of the user partaking in the survey. These techniques enable the survey to be more precise and less tedious for a user. The survey generating unit 211 is also able to generate multiple versions of the survey such as a simple version, detailed version, etc., which provide the user with the option of partaking in a more or less detailed survey process.

The full survey generated by the survey generating unit 211 may be designated to be utilized by the user only at the commencement of the process of generating the user flavor mark. Alternatively, the survey can be taken by the user at multiple times throughout the user's enjoyment of the flavor platform. In this case, the survey generating unit 211 may generate the survey based on previous user interaction and data obtained about the user and the user's activities.

The external input unit 212 is able to obtain data by scanning or upload preference information obtained at a previous time. For example, the external input unit is able to obtain preference information which is collected by a user at a dinner party.

The preference storage and processing unit 213 organizes and processes the preference information gleaned from the multiple sources such as the survey, shopper data, historical activity, external website information, social network information, demographic information, location information, etc. in order to prepare information about user preferences regarding flavor.

FIG. 9 further illustrates the flavor reference data storage unit 101. The flavor reference data storage unit 101 stores flavor information which when compared against the preference information provides an indication of user preference for a flavor. A simple example of the information found in the flavor reference data storage unit 101 is information indicating that a high preference for tomatoes will result in a corresponding preference for the "tomatoey" flavor category. Each of the flavor categories, which are represented by the flavor mark shown in FIG. 3A, have inter-relational information stored in the flavor reference data storage unit 101. This relational information is predetermined and obtained based on years of research and data gathering and parsing. The information provided by the flavor reference data storage unit 101 enables the flavor mark data generating unit 110 to calculate the user flavor mark input data 10.

FIG. 9 also illustrates the obtained data storage unit 102. Each of the storage units described herein can be implemented on a non-transitory computer readable medium such as a memory or the like. The obtained data storage unit 102 stores the user flavor mark input data 10 each time it is calculated and this information is used when updating the user flavor mark input data 10. As is shown in FIG. 9, the obtained data storage unit 102 receives the user flavor mark input data 10 from the flavor mark data generating unit 110.

In an alternative embodiment shown by the dotted line in FIG. 9, the preference obtaining unit 100 can be connected to the obtained data storage unit 102 such that obtained preference information of the user is first stored in the obtained data storage unit 102 before being accessed by the flavor mark data generating unit 110.

The flavor mark data generating unit 110 begins the process of generating the user flavor mark input data 10 by obtaining preference information from the preference obtaining unit 100 or from the obtained data storage unit 102. The preference information is specific to the user for which the user flavor mark input data 10 is being generated by the flavor mark data generating unit 110.

The preference information obtained by the flavor mark data generating unit 110 may be calculated based only on active data obtained, for example, by way of the survey generated by the user survey generating unit 211 or based only on a passive data obtained, for example, by way of the clickstream data, social media posts, and/or purchase data, which may be obtained from loyalty card data or other data sets, or based on a combination of active and passive data.

The flavor mark data generating unit 110 then takes all the information provided by the preference obtaining unit 100 such as likes and dislikes for certain foods, flavors, characteristics, temperatures, contexts, web activity, purchasing data, food and applies a filtering algorithm. This filtering algorithm corrects for factors such as random variance and other skewing factors to provide a more accurate representation of a user's actual flavor preferences.

The flavor mark generating unit 110 additionally utilizes the information filtered by the filtering algorithm and determines the food neophobia of the user. The food neophobia corresponds to the users agreeability to new food or food experiences. The generating unit 110 additionally utilizes the information filtered by the filtering algorithm to determine the food style neophobia. Food style neophobia corresponds to the users agreeability to new food styles. For instance, a user may have a predicted food style based on demographic or location. The food style neophobia determines the user's agreeability to food styles that are different for the predicted food style.

Each of the filtered preference information and neophobia information are utilized by the flavor mark generating unit 110 to obtain information from the flavor reference data storage unit 101. Using these different information sets, a flavor profile is generated for the user by applying the preference information to the reference data. Using this comparison a determination can be made regarding the user's relative preference for any one of the plurality of food categories. This information is then formatted and output as user flavor mark input data 10.

The flavor mark generating unit 110 is able to substitute information based on demographic insights when limited preference information is available. This substitute information can be reduced or removed as more information regarding the user is obtained over time. Because the generation of the user flavor mark input data 10 is an ongoing process, the generation will be performed multiple times. The performance of the generation can be performed each time new information is obtained, at a predetermined interval or based on administrator input.

The demographic insights may be based on information provided by or obtained about the user or may be based on demographic assumptions generated based on location, etc.

The flavor mark generating unit 100 additionally calculates flavor mark input data 10 for a group of users. This calculation can be performed for one set of preference data which is obtained for a group of users and transmitted by the preference obtaining unit 100 or may be performed for several sets of preference data transmitted by the preference obtaining unit 100. When generating the user flavor mark input data 10, an additional step of filtering is performed, which addresses conflicting data and performs aggregation in a way which is consistent with flavor preferences. For instance, if a flavor or food is disliked by one of the members of the group, this dislike can be taken into account for the entire group. The group can also be associated with different weights, such that certain users are given higher priority over other users. For example, the user having the flavor mark generated for the group can provide an indication of priority for a visiting guest, etc. In addition, when generating user flavor mark input data 10 for a group certain preference information can be given more weight. For instance, preferences for foods or flavors, which are found to be more relevant, can be given more weight over other information. This weighing can also be performed for the generating process for individual users as well. Also as was noted previously, a group can be considered the household of which the user is a member or a household for which the user prepares meals.

The flavor mark generating unit 100 can also generate user flavor mark input data 10 for a micro-segmented demographic. For instance, based on gathered data form a number of users in a selected location or group, user flavor mark input data 10 can be generated for this larger group of users.

FIG. 12 illustrates a device used for determining food element flavor mark input data 15 which is used to generate a food element flavor mark for a recipe or a product. The device may also be used for generating a food element flavor mark for other elements in addition to a recipe or a product. The device utilizes a computer and at least one microprocessor to obtain characteristic data and to generate the food element flavor mark data 15.

Figure 13:
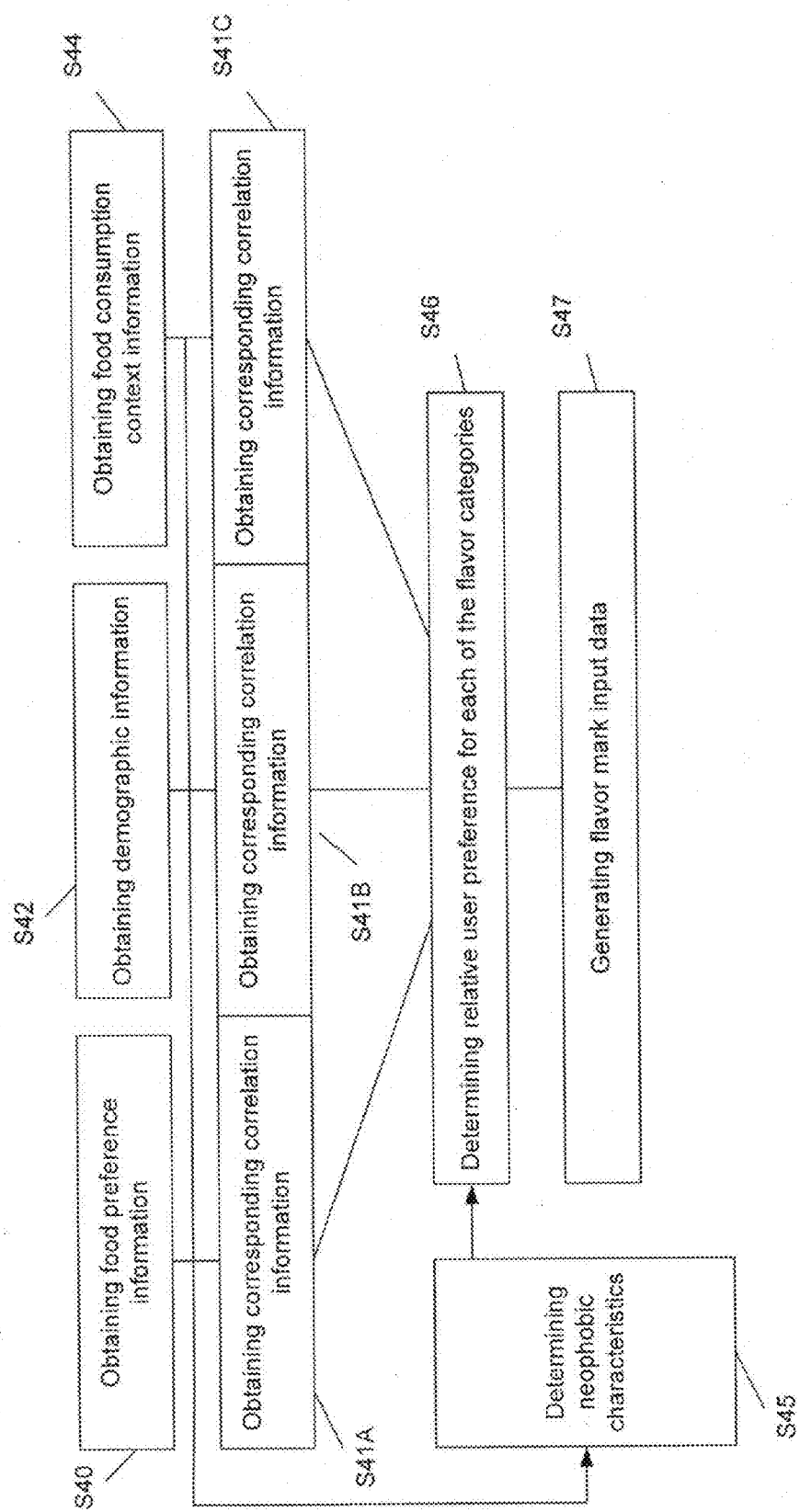
FIG. 13 illustrates a process for determining a user flavor profile and a user preference profile.

The characteristic obtaining unit 300 shown in FIG. 13 obtains information regarding the food elements which are included in the recipe or product which is the subject of the generation. This information is then forwarded to the flavor mark data generating unit 310.

The flavor reference data storage unit 310 contains information regarding the particular flavor categories and the correlations between the ingredients or foods and the flavor categories. The flavor reference data storage unit 310 also includes information regarding interactions and effects ingredients and foods have on one another.

The flavor mark data generating unit 310 generates the food element flavor mark input data 15 for the recipe or product based on receiving information regarding the particular ingredients or elements included in the product or recipe from the flavor reference data storage unit 301. The flavor mark data generating unit 310 also includes interaction and preparation change information from the flavor reference data storage unit 301 which allows the flavor mark data generating unit 310 to apply the correct flavor profile information to the recipe or product. The flavor reference data storage unit 301 also implements a correction rule based algorithm to mitigate errors and overcompensations and to ensure that the flavors which are indicated as represented in the recipe or product fairly represent the flavors which would be perceived by a user partaking of the recipe or product after preparation steps such as cooking, etc.

The flavor mark data generating unit can also generate food element flavor mark input data 15 for an ingredient based on information obtained from the flavor reference data storage unit 301.

FIG. 13 illustrates a process for determining a user flavor profile that is used in the process of generating a user flavor mark.

Step S40 describes a step of obtaining food preference information regarding a plurality of food elements. In this step, information is obtained regarding the user's or group of users' preferences for certain foods, categories of food, flavors, etc. Examples of these food elements are, for instance, tomatoes, onions, beef, fish, seafood, garlic, salt, spice, etc. Information regarding the user's preference for these food elements may be reflected, for example, in binary information such as "like" and "dislike" and in range information such as 1/10 or 5/10.

In step S41A, correlation information regarding the plurality of food elements and the flavor categories is obtained. This information is obtained from the flavor reference data storage unit 101 by way of two way communication with the flavor reference data storage unit 101. The correlation information provides a correlation between a user's preference for each food element and the user's preference for each flavor category of the number of flavor categories shown for example in FIGS. 3A and 3B. Table 1 provides an example of the number of flavor categories. This list is exemplary and is not exhaustive as other categories could also be utilized.

| | |
|---|---|
| Cooling | Like with mint, cooling flavors feature a bright, fresh, sometimes intense sensation felt in your mouth and nose. |
| Licorice | A sharp, fruity aroma and flavor associated with black licorice, fennel and anise seed, as well as the distinct character of ouzo & sambuca. |
| Herby (Fresh) | A strong, fresh, green aroma and flavor associated with herbs like basil in pesto or parsley in tabbouleah salad. |
| Herby (Woody) | A combination of freshly cut wood and green herbs, the aroma and flavors are found in green tea and dry herbs like oregano, rosemary & thyme. |
| Woody | A light yet distinct aroma or flavor associated with raw apples, cinnamon sticks or freshly-cut cedar, oak and apple wood found in dishes like cedar plank grilled salmon or oak aged chardonnay. |
| Earthy | Thick, rich and full-bodied, earthy flavors are most reminiscent of foods such as mushrooms or potatoes. |
| Vegetable | The aroma and flavor of a combination of vegetables such as carrots, broccoli, corn and cabbage. |
| Tomatoey | The tangy, bright flavor of dishes with fresh, cooked or sun-dried tomato as a central ingredient. |
| Floral | Sweet and aromatic, floral notes range from light scents of rose to stronger perfumes of lavender. It is commonly associated with herbal teas, honey and essential oils. |
| Fruity | While not citrusy, fruity flavors combine the soft, bright and tart notes associated with ripe berries, apples and pears. |
| Citrusy | A little sweet and a little sour, citrusy flavor includes lemon, lime, grapefruit and orange. |
| Sour | Call it tart, biting, or it just makes you pucker up, sour is one of the five basic tastes we experience when eating acidic foods such as citrus fruits and vinegars. |
| Tropical | Bright and predominantly sweet like bananas yet, can have a sour bite as you experience with fresh pineapple. Tropical flavors and aromas are brought about through pina coladas, mango salsa, or fresh topical fruits like coconut and papaya. |

-continued

| | |
|---|---|
| Vanilla | Sweet and sometimes reminiscent of marshmallow or bourbon, vanilla complements many desserts and sweet, baked dishes. |
| Sweet | This sugary and mouth-watering basic taste is one of the more universally loved. It's commonly associated with honey soaked desserts, maple syrup drenched pancakes and frosting. |
| Warm Brown Spice | Reminiscent of the warm, welcoming scents associated with Fall, warm brown spice flavors include cinnamon, cloves, nutmeg and mace. |
| Coffee/Chocolatey | Think less milk chocolate candy and darker, slightly bitter, roasted coffee or cocoa beans. |
| Roasted/Toasted | Warm, slightly nutty and caramelized, roasted and toasted flavors are associated with buttered toast, crusts of artisan bread or rich, outer layer of a standing rib roast. |
| Caramelized | As sugar caramelizes, it takes on a smooth, buttery sweet flavor, much like you'll find in toffee or caramel sauce. |
| Nutty | The unique flavor and aroma associated with all types of nuts, from creamy macadamia to fruity almonds. Nutty flavors are also associated with foods like sesame seeds, aged Gouda cheese, amaretto, and whole wheat bread. |
| Yeasty | The aroma that fills the air when fresh bread is baked or the aroma of a full-bodied beer; these scents typify yeasty flavors. |
| Starchy | Subtle in cooked corn and white rice but more noticeable in boiled beans, plain potatoes or pasta, starchy flavors are thought to be bland. They may even be difficult to detect for some, as we love to smother these foods with sauces and butter. |
| Buttery | A mild, soft and slightly sweet, fatty flavor common to olive oil, pistachios, and unsalted butter. |
| Sweet Cream | The sweet and fatty flavor associated with whipping cream, cream cheese and ice cream. |
| Cheesy | Ranging in degrees of boldness, sharpness and fruitiness that you find in cheddar, Swiss and parmesan, cheesy flavors are adored in classics like macaroni & cheese, fondue, and manicotti. |
| Umami | A savory, mouthwatering basic taste associated with mushrooms, tomatoes, and soy sauce. |
| Smoky | With a deep, chargrilled aroma, smoky flavors can bring to mind touches of several flavors-pecan or apple wood in bacon, or stronger notes of oak, mesquite, and hickory in whiskeys and BBQ ribs. |
| Bitter | We vary in our sensitivity to bitterness, a basic taste. Some may find it harsh and unpleasant making dark chocolate, coffee and tonic water off their lists of favorites while others enjoy that prominent taste in radicchio, kale and cabbage. |
| Pungent Spice | A sharp almost stinging sensation felt throughout your nose and mouth when enjoying wasabi, coarse grain mustard or horseradish. They may even make your eyes water just a bit. |
| Garlic/Onionish | Fresh garlic and onion flavors can carry a sharp punch, but when cooked, they become sweet, mild and creamy. |
| Peppery | Whether using black, white or green peppercorns, peppery flavors take on a woody aroma and flavor and add a warm bite to foods. |
| Heat | Heat refers to the burning sensation felt in the mouth and throat, experienced slightly when you eat black pepper or ginger and more intensely with chile peppers like jalapenos or habaneros. |
| Salty | Salty is one of the five basic tastes. Capers, anchovies, pickles and cured meat to name a few will conjure this sharp taste. |

This correlation information can be obtained independently based entirely on the food element preference information or alternatively can be obtained based on a combination of the food element preference information, the demographic information and the food consumption context information.

Step S42 describes a step of obtaining demographic information regarding the user or the group of users, such as a household. This information includes information such as, but not limited to, assumed ethnicity, age, sex, location, etc. Step S44 describes a step of obtaining food consumption context information such as, but not limited to, time, feelings, meal, weather, cooking methods, and temperatures of food. The information obtained in steps S40, 42 and 43 is further described previously with regard to the preference obtaining unit 100.

In steps S41B and S41C corresponding correlation information is obtained with regard to the demographic and food consumption context information. As with the food preference information, this correlation information can be obtained independently, or alternatively, can be obtained based on a combination of the food element preference information, the demographic information and the food consumption context information.

In addition, in step S45, neophobic characteristics of the user are determined based on the demographic data, the food preference information, and the context information. The neophobic characteristics of the user include, but are not limited to, the food neophobia and the food style neophobia of the user. The food neophobia corresponds to the users agreeability to new food or food experiences. The food style neophobia corresponds to the users agreeability to new food styles. A limited number of examples of food styles are Greek, Italian, European, Barbeque, Chinese, Sushi, Ceviche, etc.

In step S46, the relative user preference for each of the flavor categories is determined based on the obtained and determined information found in steps S40, 41A-C, 42, 44, and 45. Further information regarding the determining is described previously with regard to the flavor mark data generating unit 110.

The obtained relative user preference for each of the flavor categories corresponds to the user flavor profile which is included in the user preference profile. The user preference profile also includes, among other information, additional information about the user such as the demographic data and the neophobic characteristics of the user. The user flavor profile may also be applied to a group such as a household. In this embodiment the group would have a user preference profile which includes a user flavor profile.

In step S47, the user flavor mark input data 10 is generated based on the determining performed in step S46. This information may be forwarded to the flavor mark display determining unit 11 and used to generate a user flavor mark or may be forwarded to other systems in the flavor platform for use in providing recommendations or providing various interactions.

Figure 14:
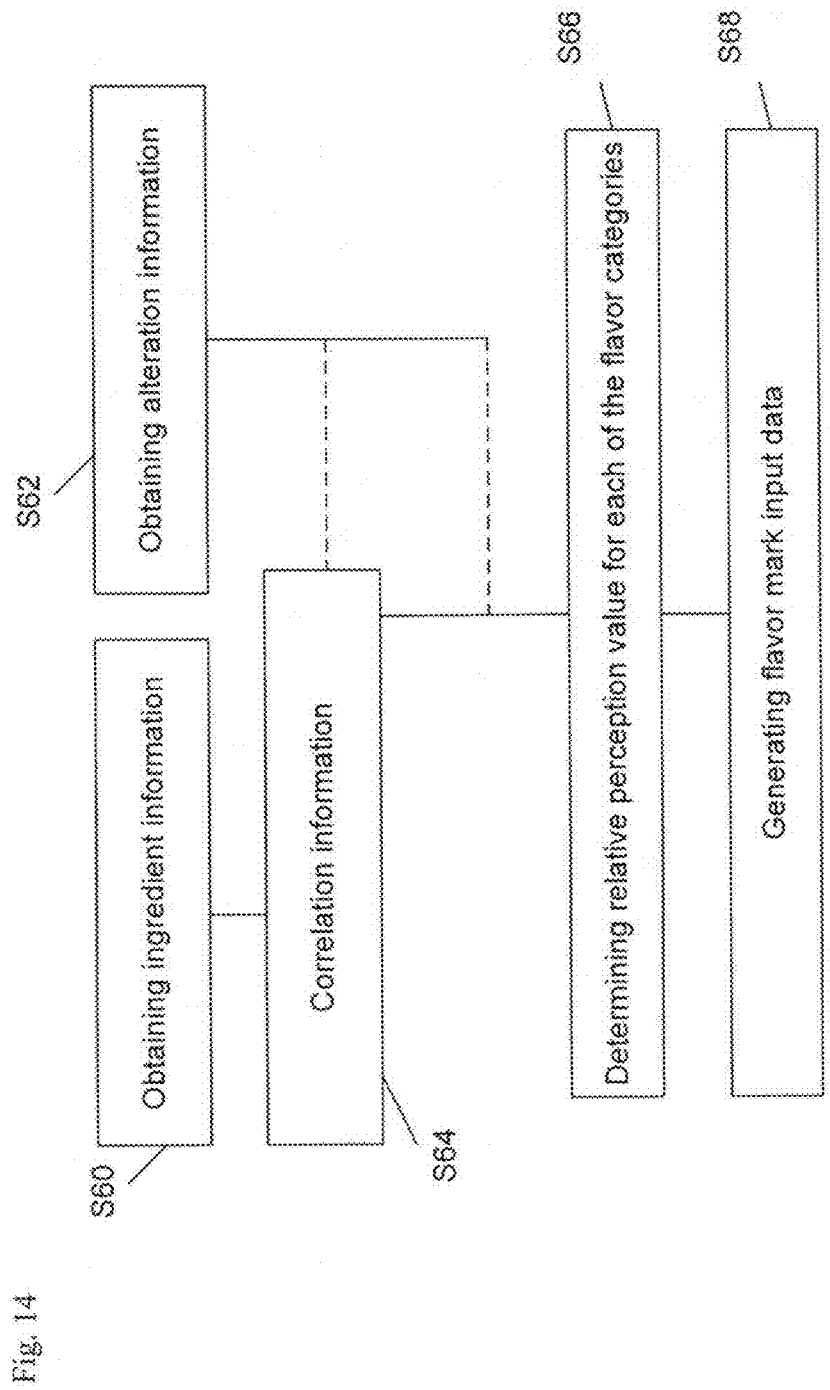
FIG. 14 illustrates a process for determining a food element flavor profile.

FIG. 14 illustrates a process for determining a food element flavor profile for a recipe or product. The process can also be applied to any food element in addition to a recipe or product. For example, the process can be applied to a ingredient or a food sub-part or other similar food part.

In step S60 ingredient information of the food element in question is obtained. The ingredient information describes the particular ingredients that are included in the recipe or product. For example, the recipe shown in FIG. 4 "chicken salad with creamy pepper parmesan dressing" will include a number of different ingredients such as chicken, parmesan, pepper, etc. The ingredient information for this recipe may be obtained from a database containing the recipe, a database linked to the recipe or may be obtained through manual input by a user. For instance, the flavor platform may have access to ingredient lists for products and recipes through a third party service or through a local database included in the flavor platform.

In step S62, there is obtained alteration information regarding the recipe or the product. The alteration information reflects changes that take place in the ingredients due to cooking, baking, cooling, etc. and due to the timing, sequencing and interactions between the ingredients. The alternation information further reflects that some ingredients will have more or less influence on the final flavor perception based on where they are introduced in the preparation process.

In step S64, correlation information is obtained for each of the ingredients with respect to the number of flavor categories. The correlation information provides a correlation between the ingredients and expected perception for each flavor category. Further discussion regarding the obtaining of the correlation information is found previously with respect to the flavor reference data storage unit 301.

The correlation information can be obtained independently for each ingredient or can be obtained in light of the alteration information. Thus, the process may operate such that the alternation information is taken into account only in the determining step S66 or may also be taken into account in the obtaining of correlation information S64.

In step S66, the relative or absolute perception value for each of the flavor categories is determined based on the correlation information and the alteration information.

In step S68, the flavor mark input data 10 is generated based on the result of the determining.

Figure 15:
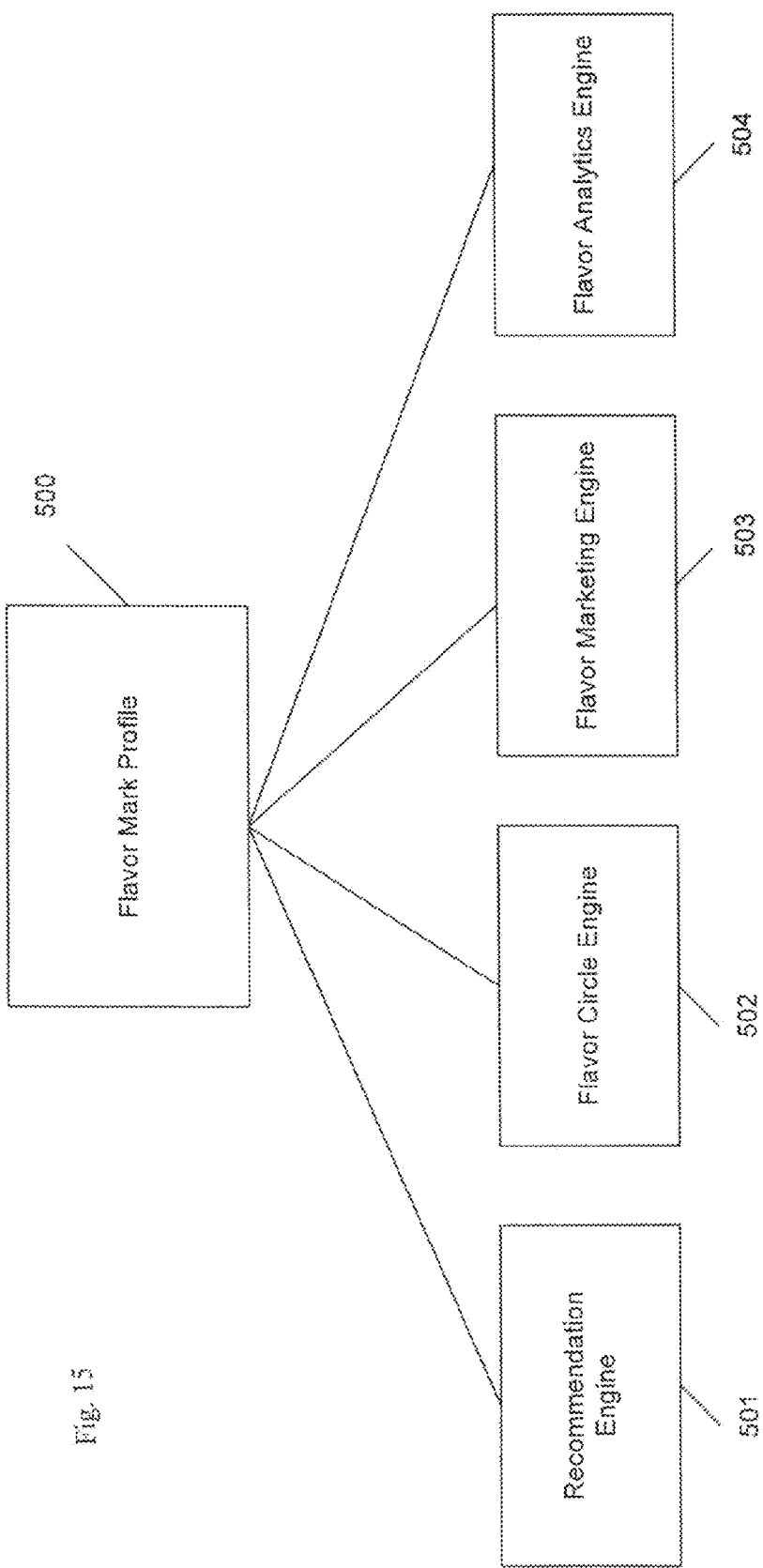
FIG. 15 illustrates a system for applying the user preference profile.

FIG. 15 illustrates a system for applying, the user flavor mark, the user flavor profile, and the user preference profile to generate recommendations, to foster relationships, to provide targeted marketing and to provide analytics.

As is shown in FIG. 15, the user flavor profile and the user preference profile is utilized by the recommendation engine 501, the flavor circle engine 502, the flavor marketing engine 503 and the flavor analytics engine 504.

The recommendation engine 501 provides personalized recommendations based on the user flavor profile and the user preference profile. The flavor circle engine 502 generates correlations between the user flavor profile and the user preference profile of different users, which can be used, for example, in a social platform by which users can interact with one another. The flavor marketing engine 503 utilizes the user flavor profile and the user preference profile to generate marketing offers, advertisement targeting and individualized shopping experiences. The flavor analytics engine can utilize the user flavor profile and the user preference profile from a group of users to provide organizations with better insight into customer preferences and behaviors.

Figure 16:
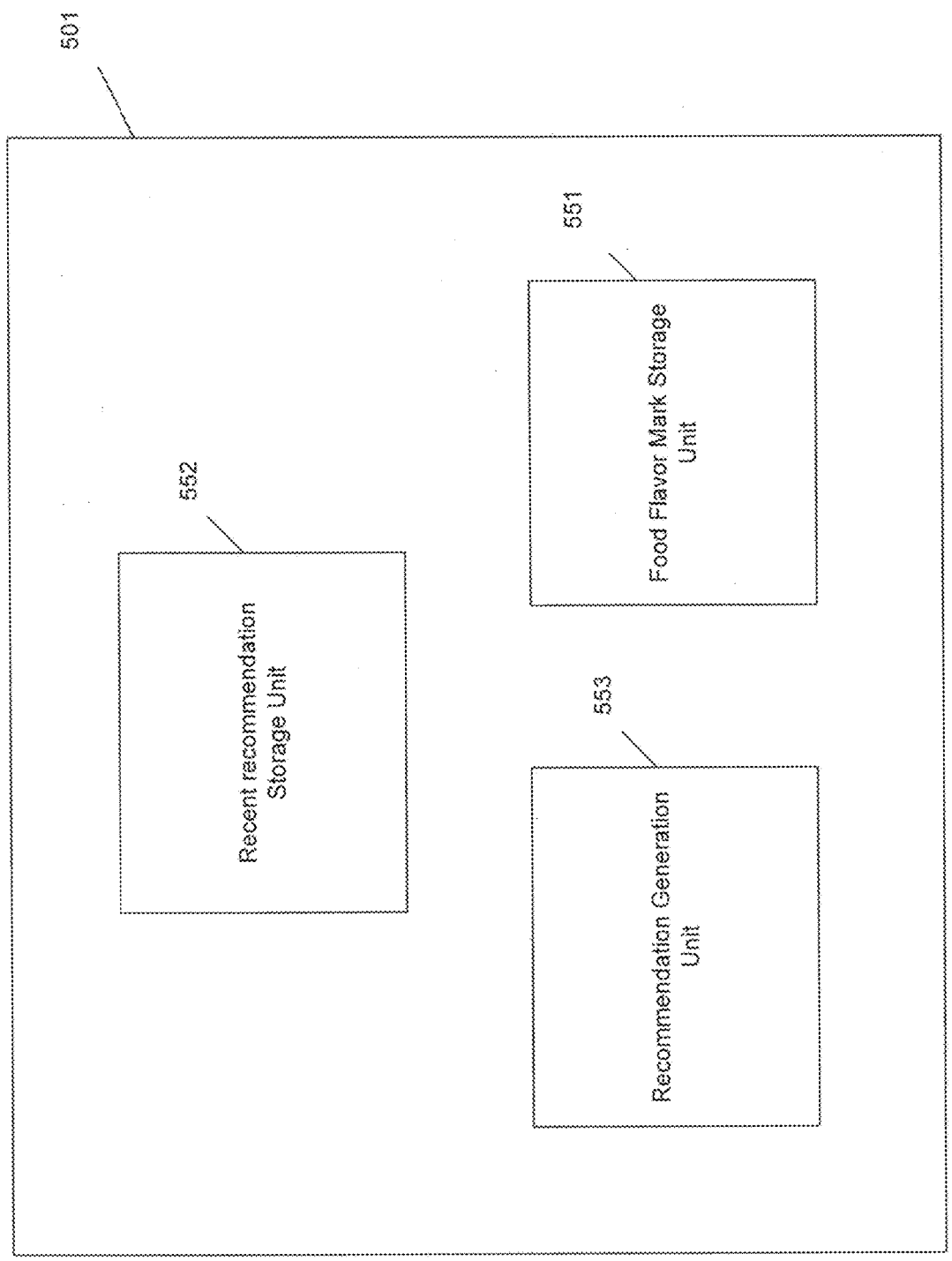
FIG. 16 illustrates a block diagram providing detail regarding the flavor recommendation engine.

FIG. 16 illustrates more detail regarding the flavor recommendation engine 501. As is shown in FIG. 16, the flavor recommendation engine 501 includes, for example, a food flavor mark storage unit 551, a recent recommendation storage unit 552, and a recommendation generation unit 553.

The food flavor mark storage unit 551 stores flavor and characteristic data for each of a plurality of food elements in addition to the flavor profile and corresponding data for each of the food elements. These food elements may include, for example, recipes, food products, dinner menus, culinary dishes, sides, main courses, ingredients, etc. The food flavor mark storage unit 551 is accessed and searched by the recommendation generating unit 553 when performing the recommendation process. The searching is performed with multiple constraints. In addition, the searches may be performed based on input for the user or entirely absent from input from the user. For example, the user could request "main dishes with 30 min or less prepare time." This search could be performed based on the user constraints as well as based on the user flavor profile and the user preference profile data.

The recent recommendation storage unit 552 stores recent recommendations that were provided to the user. This data is taken into account to ensure that the user is not repeatedly provided the same recommendations every time a recommendation is requested or generated.

The recommendation generation unit 553 generates the user recommendation by applying a scoring algorithm to search results obtained from searching the food flavor mark storage unit based on received user flavor profile and the user preference profile data.

The user flavor profile data includes information regarding the flavor preferences of the user for the plurality of flavor categories shown, for example, in FIGS. 3A and 3B. This information is directly used to generate the visual user flavor mark. In addition, the user preference profile data includes attribute information of the user, such as demographic information, allergy information, healthy eating preferences, diet or food program preferences, ingredient substitution information, type and style of food preference, neophobia information, preparation time preferences, etc. This information provides additional information regarding the user's preferences complementing the information regarding the user's flavor preferences.

Table 2 illustrates an example of some of the elements that may be included in the user preference profile data which may be included in addition to the flavor profile data. This example shows the user preference profile data for a group (a household).

TABLE 2

| Profile |
|---|
| 30 Minutes or less is how much Total time the group is willing to spend to get a weeknight dinner on the table. |
| Willing to spend 1 hour on the weekend |
| Avoids tree nuts and MSG |
| Prefers a low fat/low sodium balanced diet |
| Is adventurous when it comes to trying new things |
| Food neophobia score is low = 13 (willing to try new foods) |
| The top 5 foods and/or recipes that someone in your group will not eat for dinner: |
| 1. Liver |
| 2. Potatoes |
| 3. Peanuts |
| 4. Frozen entrée |
| 5. Spinach |

The recommendation generation unit 553 performs a weighing algorithm which considers and weighs each of the factors in the user preference profile when considering recommendations for the user. For example, certain attributes can be given greater weight based on other attributes. For example, if the user has a low food neophobia, the user may be willing to try a food that may have a slightly different flavor profile and thus the flavor preference for a particular flavor may be given less weight. A rule based algorithm can also be applied to determine what foods should be considered or removed from consideration in the returning of results.

Once the recommendation generation unit 553 performs the search, a list of preliminary results are each evaluated based on determining a flavor profile match between the food element and the user. The preliminary results may be randomized such that different top results are provided at different times. The results may also be adjusted based on predetermined factors such as, for example, time or date of search, or to preference certain recipes to promote certain ingredient products. For example, certain foods elements can be selected based on the season or the weather in the user's location or based on recent popular trends in a general area, an area local to user, or an area selected by the user.

The results are further filtered based on the attributes provided in the user preference profile. The query may be performed multiple times in order to obtain a sufficient number of acceptable matches for the recommendation. Alternatively, the original search query may include information regarding the user preference profile as well as the user flavor profile, and matches may be determined based on the provided information.

Once a sufficient number of recommendations are generated by the recommendation generation unit 553, the results are sorted and returned or presented to the user.

The recommendations can also be clustered based on theme. For instance, the recommendations can be provided to the user in groups of products or recipes. For example, if the user is a parent of three children, this information can be used to provide "quick and easy" recipe recommendations for a weeknight. Each of the recipes in the recommended group of recipes is related in that the recipe is "quick and easy." Similarly, a user could be provided with a recommendation of food elements with the theme "sweet treats." This recommendation would provide the user with a number of different recommended recipes that could be considered "sweet treats", such as cake or cookies.

Figure 17B:
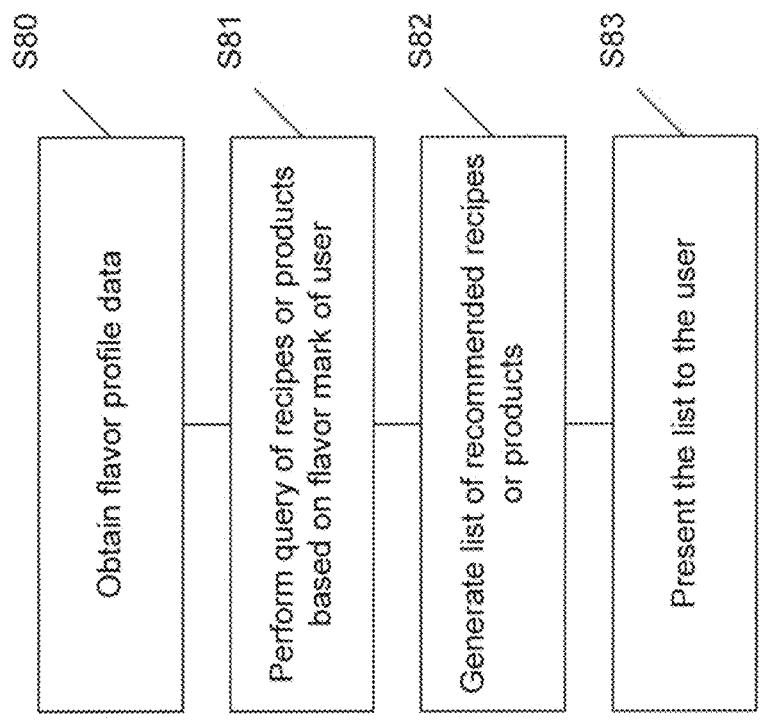
FIGS. 17A-C illustrate the process of providing recommendations to a user based on flavor.
Figure 17A:
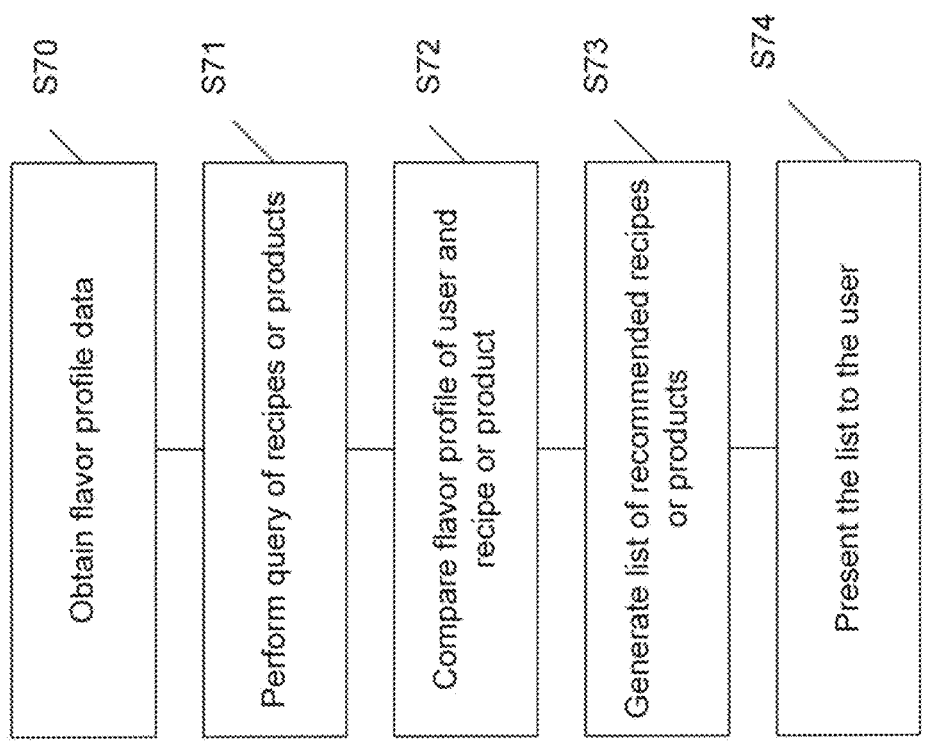

FIGS. 17A-B illustrate the process of providing recommendations to a user based on flavor. In this process, flavor profiles of users are compared against flavor profiles of food elements such as recipes and products.

The process can be implemented according to one embodiment shown in FIG. 17A. In this embodiment, in step S70, user preference profile data is obtained. The obtained data includes the user flavor profile data utilized for displaying the user flavor mark and indicating the flavor preferences of the user for the plurality of flavor categories shown, for example, in FIGS. 3A and 3B. In addition, the obtained data can include additional user preference profile data regarding attribute information of the user such as demographic information, allergy information, healthy eating preferences, diet or food program preferences, ingredient substitution information, type and style of food preference, neophobia information, and preparation time preferences, etc.

In step S71, a query is performed of food elements such as recipes or products. The query, which is performed using the food flavor mark storage unit 551, may also be performed by querying an external database or information service connected, for example, by a network.

In step S71, each food element has associated therewith flavor profile information indicating the relative or absolute perception value for each of the plurality of flavor categories for the food element. Thus, each food element, such as, for example, a flavor, product, food, or recipe, is stored with information which can be used to display a respective food element flavor mark.

The query is based on constraints such as search inputs entered by a user. The constraints may also be based on recent trends at the time of the query. For example, if all users or similar users have recently searched for a term or have liked a certain product or type of food element, this information can be used to constrain or modify the search or the results.

The flavor system may provide recommendations, not based on a search, but simply in response to the user loading a page or an application ("app"). These recommendations will based on the user flavor profile and may be based on search terms that may be predetermined to be of interest to the user based on flavor preferences or based on demographic information etc.

The constraint inputs may also include information indicating previous returned results such that previous returned results are excluded from the query. The previous returned results can also be used to filter the recommendations after the results from the query are returned. The process may be performed with filtering of results being preformed through the query or with filtering after the results are returned.

The constraint inputs may also include constraints based on the date of the query, the time of the query, the weather at the location of the query and the location of the query. Thus, the query can include additional information that either includes the additional data such as the time, weather, location or date or simply indicates that this information should be considered by the search generating algorithm. For instance, when the location is the south, regional foods of this area are given higher weight in the search for "foods that take less than thirty minutes." So, if each of the food elements in the database includes information regarding the preparation time as well as information indicating regional preference, the search which includes the above noted terms will result in each food element with a 30 minute or less preparation time and a positive southern regional preference.

In step S72, the flavor profile data of the user can be compared against each of the returned food elements to determine food elements which have a high flavor compatibility score. The top results can be determined in step S73 and presented to the user in step S74.

In one embodiment of the process described in FIG. 17A, a large number of results may be obtained form the query in step S71 and the results can be filtered in step S72 by way of the characteristics of the food elements being compared against the preferences and user flavor profile information.

The characteristics of the information of each of the food elements includes the temperature, preparation time, allergens, ingredients, texture, caloric value, fat value, carbohydrate value, vitamin value, health rating, etc. of the food element. For instance, the food element may be a recipe which includes chicken, requires cold preparation, has 100 calories upon consumption and has a high flavor compatibility score. This information can be used to exclude this food element based on the user preference profile information which indicates that the user doesn't like cold dishes including chicken. Similarly if the user is on a diet, this information could be, for example, used to filter out food products having a high fat content. The health rating could, for instance, indicate whether the food has ingredients that are considered unhealthy or healthy for consumption. Various standards could be used to determine the health rating for a food element. In addition, the health rating could be determined based on the user preference profile information. For instance, if the user has diabetes, the health rating of a sugary food element could be low which a health rating of green beans, for example, could be high.

Step S72 may also perform the comparison by comparing a value for each flavor category of the flavor profile information of each of the food elements against a value for each flavor category of the flavor profile information of the user to determine a compatibility score for each of the flavor categories. The comparing may also perform a weighing operation to determine an overall compatibility score based on the compatibility scores determined for each of the flavor categories.

An example of the process for determining the compatibility between a user and a food product is performed by obtaining the user preference profile information including the user flavor profile data and the flavor profile data of the food product which includes characteristic data of the food product. It is then determined whether the food product includes an ingredient that is highly disliked or for which the user is allergic. The dislike score may include levels of dislike. In addition the flavors of the food product are compared against the user flavor profile and preferences of the user and correlations and similarities are considered. A correction algorithm is performed to ensure more accurate correlation between the likes and dislikes of the user and the food element in question. The dislike is generalized into underlying flavor driver attributes and a probabilistic model is applied to filter out conflicting information. For example, a comparison can also be performed using foods that the user has indicated were liked and the food element in question and this information can be considered. Additional adjustments are performed based on characteristics in the user preference profile such as demographic information, allergy information, healthy eating preferences, diet or food program preferences, ingredient substitution information, type and style of food preference, neophobia information, preparation time preferences, etc.

Figure 17C:
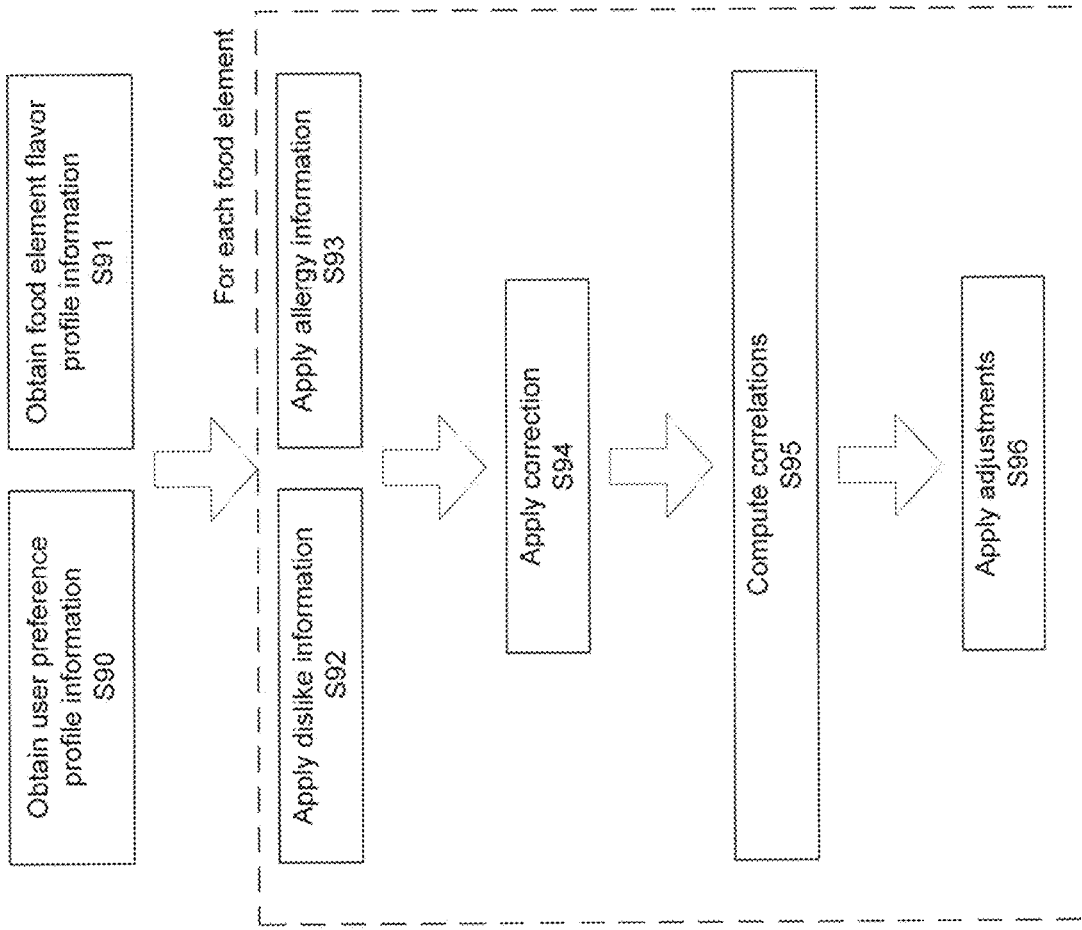

FIG. 17C illustrates the above example of the process or algorithm for determining the compatibility between a user and a food product as applied, for example, in step S72 of FIG. 17A. In step S90, user preference profile information is obtained for the user. This user preference profile information includes user flavor profile information. In step S91, flavor profile information is obtained for each food element which is returned by the query. Steps S92-S96 are applied for each food element returned by the query. In step S92, the dislike information is applied to the food element. In step S93 the allergy information is applied to the food element. Unlike the allergy information the dislike information is not binary. In particular, the dislike is generalized into underlying flavor driver attributes and a probabilistic model is applied to filter out conflicting information. The correction applied in step S94 ensures more accurate correlation between the likes and dislikes of the user and the food element in question. For example, a user may have previously indicated that they disliked a similar food element but may have a high flavor compatibility. In this case, the previous dislike may be given a lower weight based on the result of the application of the correction. In step S95, the flavor characteristics of the food element are compared against the user flavor profile to determine correlations. As was described previously, preparation and combination of ingredients in a product or recipe may affect the flavor profile of the food element and so this is considered when computing correlations. A comparison can also be performed using foods that the user has indicated were liked and the food element in question. In step S96, adjustments are performed as is noted the previous example. The adjustments can also be performed in concert with the computing of correlations in step S95. The adjustments are performed based on characteristics in the user preference profile such as, but not limited to, demographic information, allergy information, healthy eating preferences, diet or food program preferences, ingredient substitution information, type and style of food preference, neophobia information, preparation time preferences, etc.

FIG. 17B illustrates an example in which user flavor profile data is obtained in step S80 similarly to step S70. In step S81, the query is performed based on constraints similar to step S71. However, in step S81, the query is further generated based on the user flavor profile. In addition, the user preference profile as well as the user flavor profile is included in the query such that the query only returns results having flavor category values, for instance, matching or within a range to the corresponding category values of the user. The query may also take into account the demographic information, allergy information, healthy eating preferences, diet or food program preferences, ingredient substitution information, type and style of food preference, neophobia information, and preparation time preferences, in performing the search. This information can be also utilized in step S72 in the embodiment illustrated in FIG. 17A.

In step S82, the list of recommended recipes or products is generated based on the result of the query. In step S83, the list of recommend food elements is presented to the user by way of a display on a graphical display unit or via a computer based output.

FIG. 18A illustrates an example of the flavor recommendation engine that powers the various user interfaces on the website. The recommendations can be obtained for each of main course, desserts, sides or other types of dishes or food elements. As is illustrated in the example shown in FIG. 18A, each of the recipes includes a score out of 100 which indicates the compatibility of the food product to the user.

The compatibility score indicates how compatible the user is to the food element. For example, if the user has compatibility score that is close to 100, this would be an indication of a high compatibility between the user flavor profile and the flavor profile of the food element.

The settings of the user enables the user to add and remove information corresponding to the user preference profile. For example, the user may permanently or temporarily adjust the attribute data in the user preference profile. For instance, the user may indicate that they like or dislike certain food, have various cooking equipment or do not have certain items in their pantry and general cooking preferences. This information may affect the recommendations.

FIG. 18B is another example of a recommendation list presented to the user. In this case, the user has entered the search terms "chicken dinner." The system has returned a number of recommendations and has provided a number of generic recommendations regarding flavors that the user may enjoy. These recommendations are based on the search constraints as well as the user flavor profile.

Figure 19:
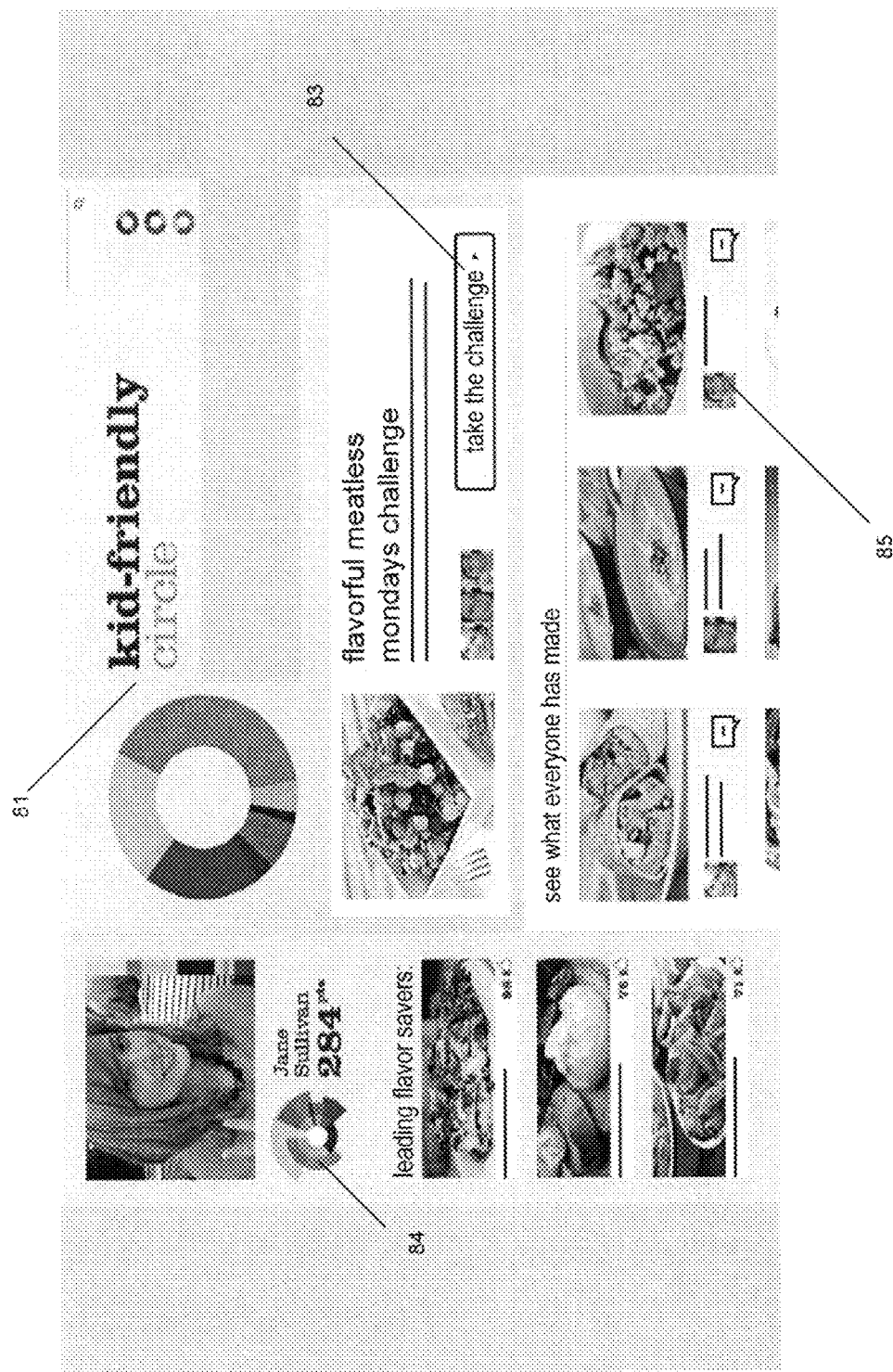
FIG. 19 illustrates an example of the flavor circle which is implemented by the flavor engine.

FIG. 19 illustrates an example of the flavor circle which is implemented by the flavor circle engine 502.

The flavor circle is a social element to the flavor system and provides a space where users can discover other users having similar flavor preferences. Flavor circles are group experiences that inspire users to try new flavors. Users are encouraged to embark on fun challenges, to mingle with other like-minded cooks, and find helpful tips, tools, and recommendations 85. The points system 84 can also be a part of the flavor circles and encourage loyalty.

Figure 20:
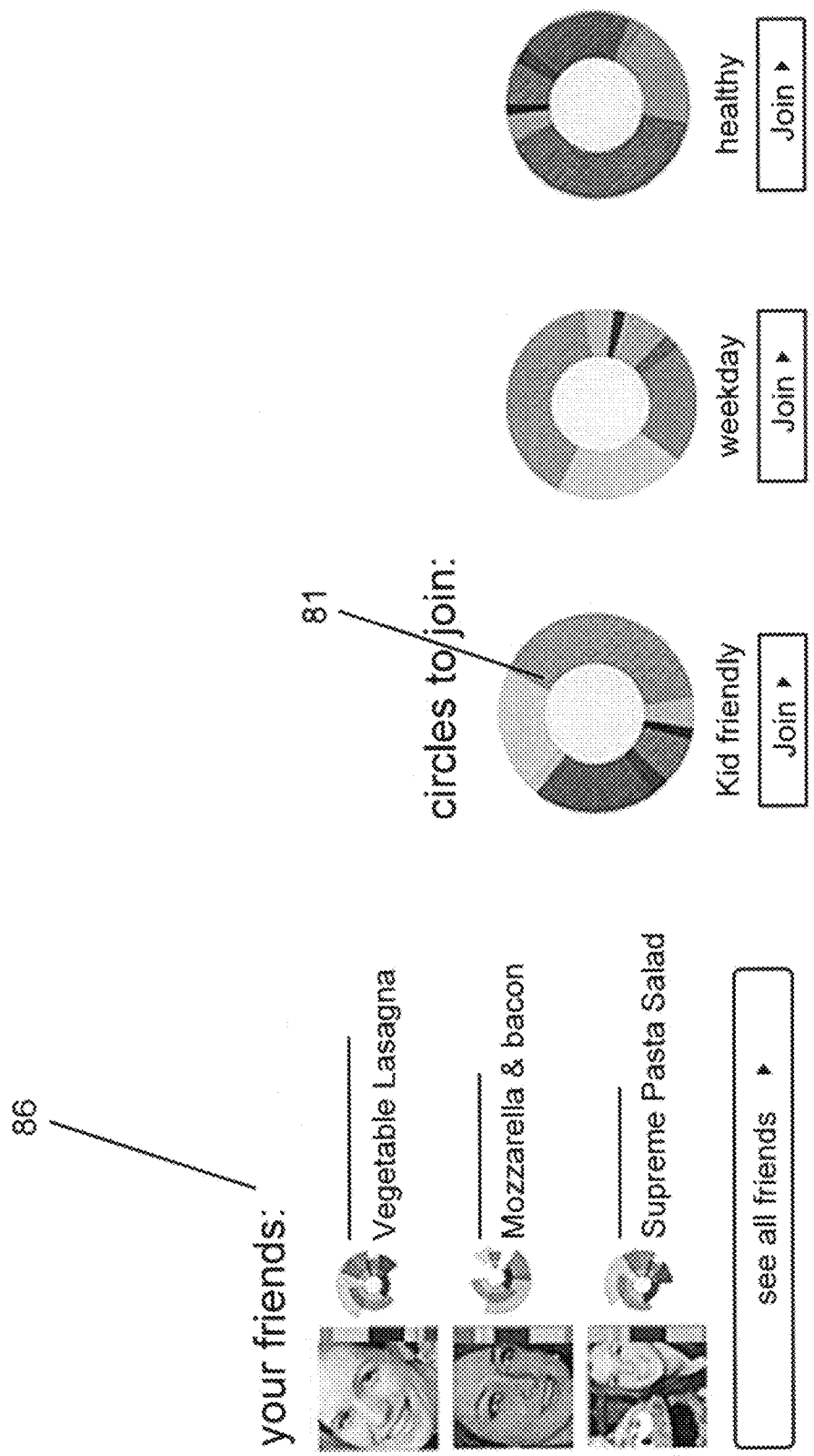
FIG. 20 illustrates an additional example of the flavor circle which is implemented by the flavor engine.

Flavor circles can be joined by users having a common interest. For example, as is shown in FIG. 20, a group entitled "kid-friendly" enables users who are interested in discovering "kid-friendly" recipes or tips to meet other like-minded users to interact. The circles can also be topic based such as "Extreme Grilling", "The Spicier the Better", "Explore the World by Flavor" and really anything a user might want to create. The flavor circles can include lists of what other members of the group have made, as well as flavor values which are unique to the group. Flavor Circles would also allow consumers to engage with one another in like minded forums to ask questions and give advice to others for a community aspect. The flavor circles also may include certain challenges which are unique to the group.

The flavor platform may allow users to follow or friend other users and join one or more flavor circles. Users will be able to see the flavor circles of the other users, which they have followed or connected with. This will provide the users with ideas about new flavor circles to join. Flavor circles may also be searchable by keyword in order to find new flavor circles. In addition, the flavor platform can use the flavor mark and associated flavor profile data to suggest new flavor circles which may be of interest to the user.

The groups can be based on any one of the aspects of the flavor profile. For example, a group could be created for users having similar food allergies or for users having similar food texture preferences. Points can be earned by participating in the flavor circles and the flavor platform 84. The points can be applied, for example, to discounts for the user.

As is shown in FIG. 19, when a user joins a particular flavor circle, the user is presented with a page which includes information about the flavor circle. The flavor circle page includes certain challenges which are unique to the circle 83. The flavor circle page may also include information about the users that are members of the circle, users that have taken the challenge, or information about what meals the circle members have made. In addition, as is shown in FIG. 20, there also may be another portion of the page which includes friends of the user who are also members of the circle 86.

The flavor circles may also enable comparison between the user preference profile of one user and the user preference profile of another user. The user preference profile of each user includes the user flavor profile which is used to generate a user flavor mark. FIG. 21 illustrates an example of a comparison between the user flavor marks. A similar comparison can be performed using a matching algorithm which determines a compatibility score for a two users or a compatibility score for a user to a group of users, where the group compatibility score is based on a weighted combination of flavor profile data.

Flavor compatibility scores can be used to bring together users with similar flavor preferences. For example, the system could provide suggested connections based on flavor compatibility. In addition, this information can be used to provide a user with information about the user's compatibility with previously connected users. Such a system would enable users to find users who may be interested or who may like a certain type or style of food. For example, the system could recommend a meal and recommend users who also might like the meal, enabling the user to plan out a dinner party including potential guests. In addition to comparing flavor preferences of a user against flavor preferences of another user, the system can allow users to compare a food element such as a recipe against the flavor mark and flavor profile of connected users to ensure that the connected users would enjoy the recipe. This will allow the user to plan meals that a group of users or household will enjoy.

The flavor circle engine is able to indentify other users with similar flavor profiles and find foods that these users have indicated they enjoy. This information can be used to recommend food elements to users. For example, if user A has a flavor profile having a 98.1/100 compatibility score with user B, the system will determine which food elements have been indicated as liked or favored by user B and will recommend these elements to user A. Alternatively, the system could use the liked or favored element of user B as an additional factor in determining recommendations for user A. For instance, the recommendation engine 501 could use this information in the determination of recommendations. The system may also use the full user preference profile of the users to perform comparisons and make connections.

Figure 22:
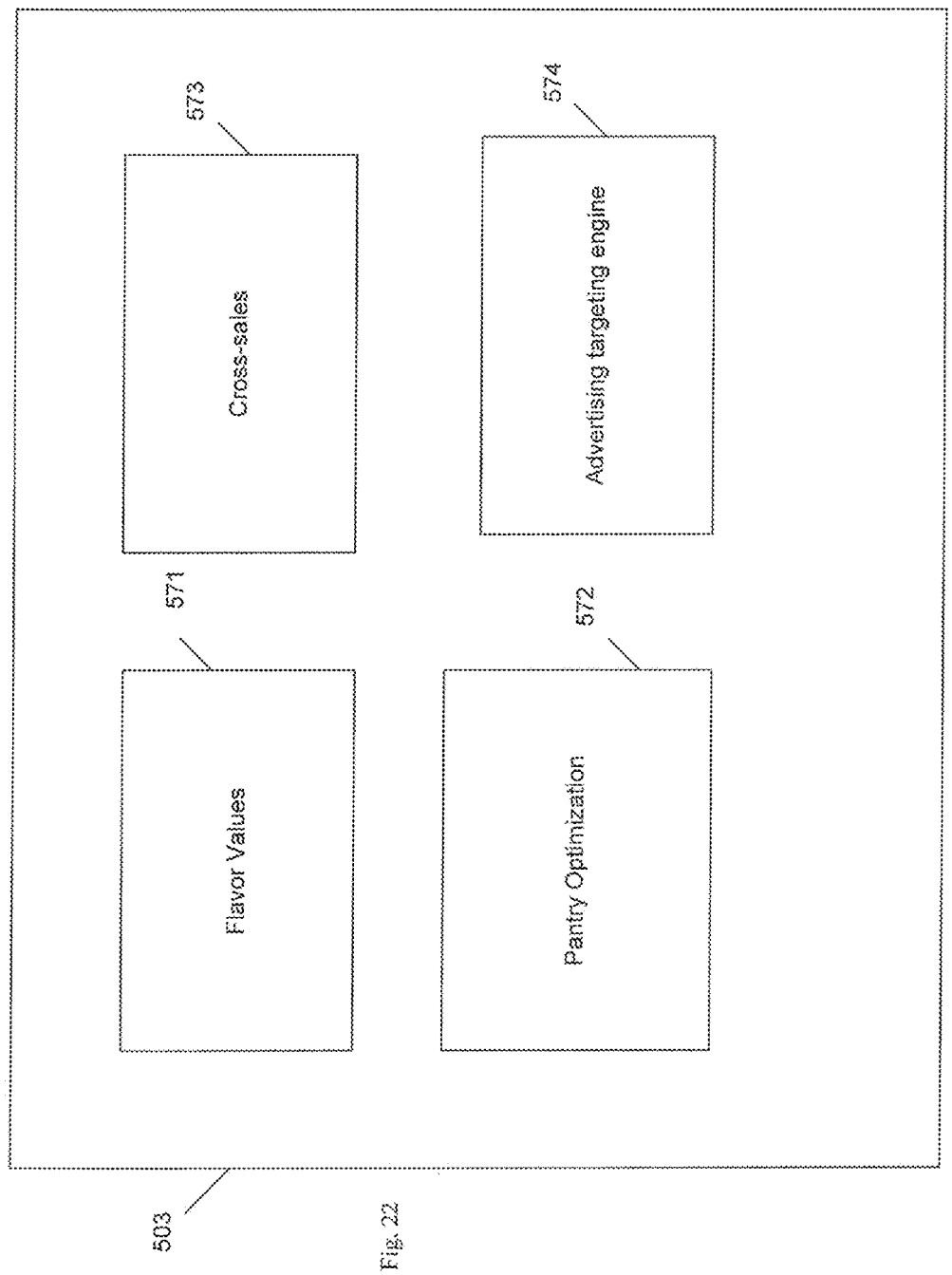
FIG. 22 illustrates an example of an implementation of the flavor marketing engine.

FIG. 22 illustrates an example of an implementation of the flavor marketing engine 503. The flavor marketing engine 503 includes several elements including for example the flavor values 571, the pantry optimization 572, the cross-sales 573, and the advertising targeting engine 574.

The flavor values category 571 provides an example of how the flavor marketing engine can be used to provide special offers to the user based on the flavor mark and associated profile data.

The flavor value program or flavor saver is a way to save money on new flavors and recipes. Users often are hesitant to waste money in a food budget on products and flavors that they are not sure they will actually like. Therefore, the flavor values provides a way for users to experiment with new flavors at a discount.

The flavor values can be implemented using "always on" offers tied to circulars. The always on element will be a dynamic engine that pulls in circular data to evaluate what is on sale at a user's local (geo-targeted or saved preference) grocery store (say 3 items), and then delivers a recipe or product recommendation based on what is on sale and on the user's flavor profile. It will also let the user know how much the user has saved by making the recipe that week. Because circulars are issued weekly and the engine itself is dynamic, there is no manual effort associated with the engine (except for general maintenance and upgrades). In addition, the always on engine is simple to implement and requires much less effort than a specific campaign or event—i.e. Thanksgiving which is a specific time and would require unique inputs for that given time range. In addition, the always on engine can run 365 days a year.

In another implementation, ingredients are bundled together and matched to a recipe and presented to a community. If enough people vote for the bundle, a substantial discount will be available for the bundle. In order to make the user aware that the bundle that the user voted for will be receiving a discount (FIG. 7), the user can be notified by email, text, message, or some other form of electronic communication 60.

In addition to discounts which are tailored to an entire community, group or geographic area, discounts can be tailored to the user or group's individualized flavor profile. For instance, if, based on the user's flavor profile, it is predicted that the user may enjoy some new flavor, a coupon for the ingredients or products which include this flavor can be provided.

The flavor values can also be implemented via a points system. Contributions to a flavor platform can be awarded with points. Points may also be awarded for posting to social networks. In addition, points may be awarded for implementing recipes, taking polls, buying certain products etc. Contributions can include posting, joining circles, voting, etc. The points may be redeemed for coupons or discounts on flavors or products.

The pantry optimization category 572 also shown in FIG. 22 is an example of the user flavor profile data and user preference profile data can be used to provide recommendations regarding what foods and spices should be purchased when shopping. In addition, the pantry optimization is able to take note of what is in your pantry, including leftovers, and provide suggestions based on this information and your flavor profile. The pantry optimization is additional able to recommend recipes based on recent purchases or what a user currently has available in their pantry and order new supplies if needed.

The cross-sales category 573 illustrates an example of how the user flavor profile data and user preference profile data can be utilized to market items which are associated with the food preparation process like cookware, bakeware, kitchen electronics, etc.

Using the information gleaned through the flavor platform, important marketing information can be obtained which allows recommendations to the user for these food related objects.

The advertising targeting engine 574 utilizes the user flavor profile data and user preference profile data to provide targeted advertising data. The targeted advertising data provides specific advertisements based on the preferences of the user. For example, when providing advertisements to a user, data from the user flavor profile and user preference profile can be used to provide targeted and individualized advertisements, which are relevant to the user. As a result, advertisements can be provided that not only use information provided by sources such as cookies, etc., but also use information provided by the user regarding the user's preferences and flavor profile.

Figure 23:
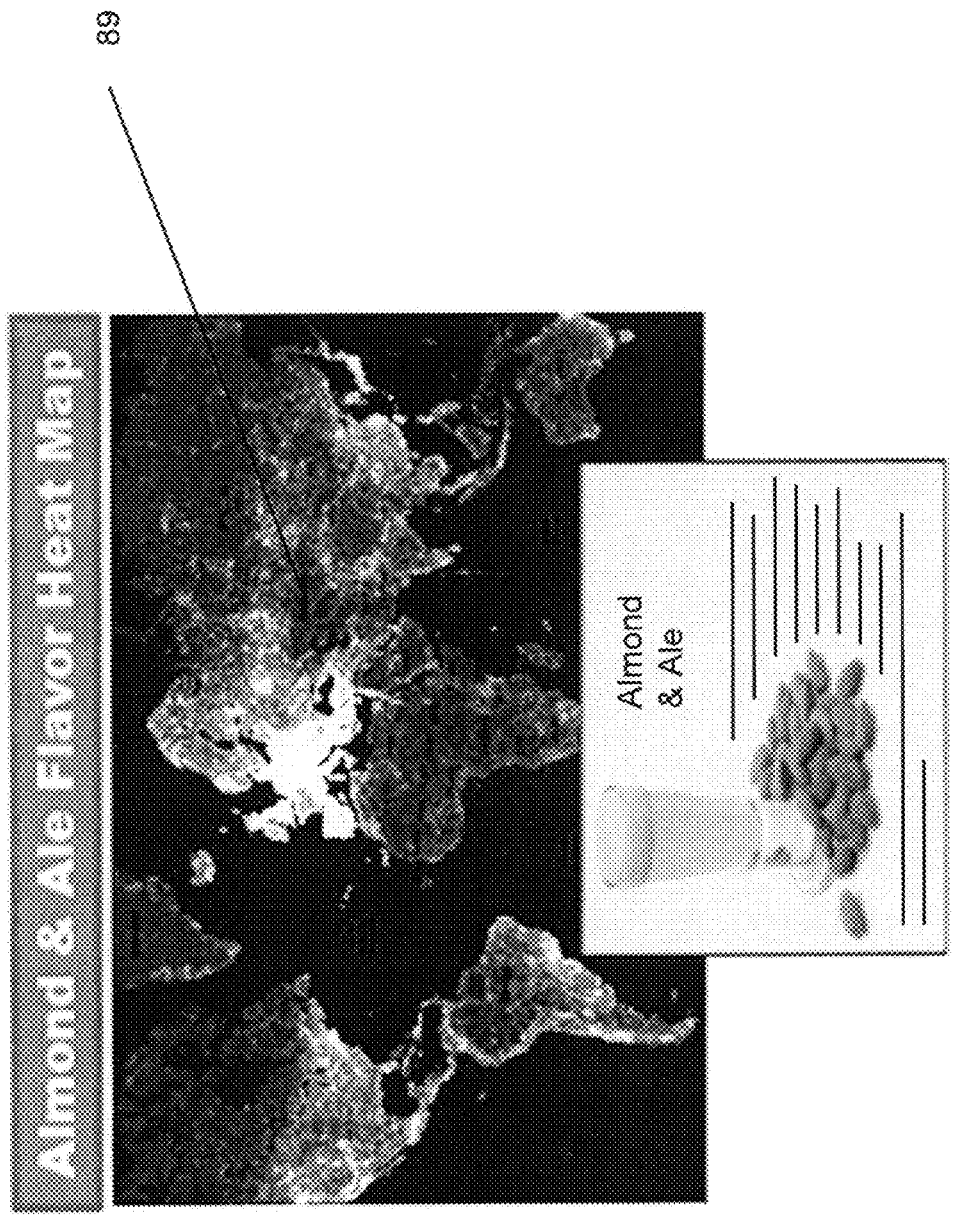
FIG. 23 is an example of an implementation of the flavor analytics engine.

FIG. 23 is an example of an implementation of the flavor analytics engine. In this example, a flavor heat map 89 is generated using flavor mark and flavor profile information for each of the user's in the system. The vast data set of user flavor mark and associated flavor profile information can be analyzed and applied to many uses. These uses include, for example, information for information for inventory analysis, tracking of key flavor trends, creating content or products to meet consumer demand, information for menu insights. For instance, in the example of inventory analysis, preferences or preference trends in a particular area can provide insights into where inventory should be shifted or bolstered. In the example of menu insights, flavor preference or trends can provide restaurateurs with insights regarding how a menu should be tailored or changed.

Figure 24:
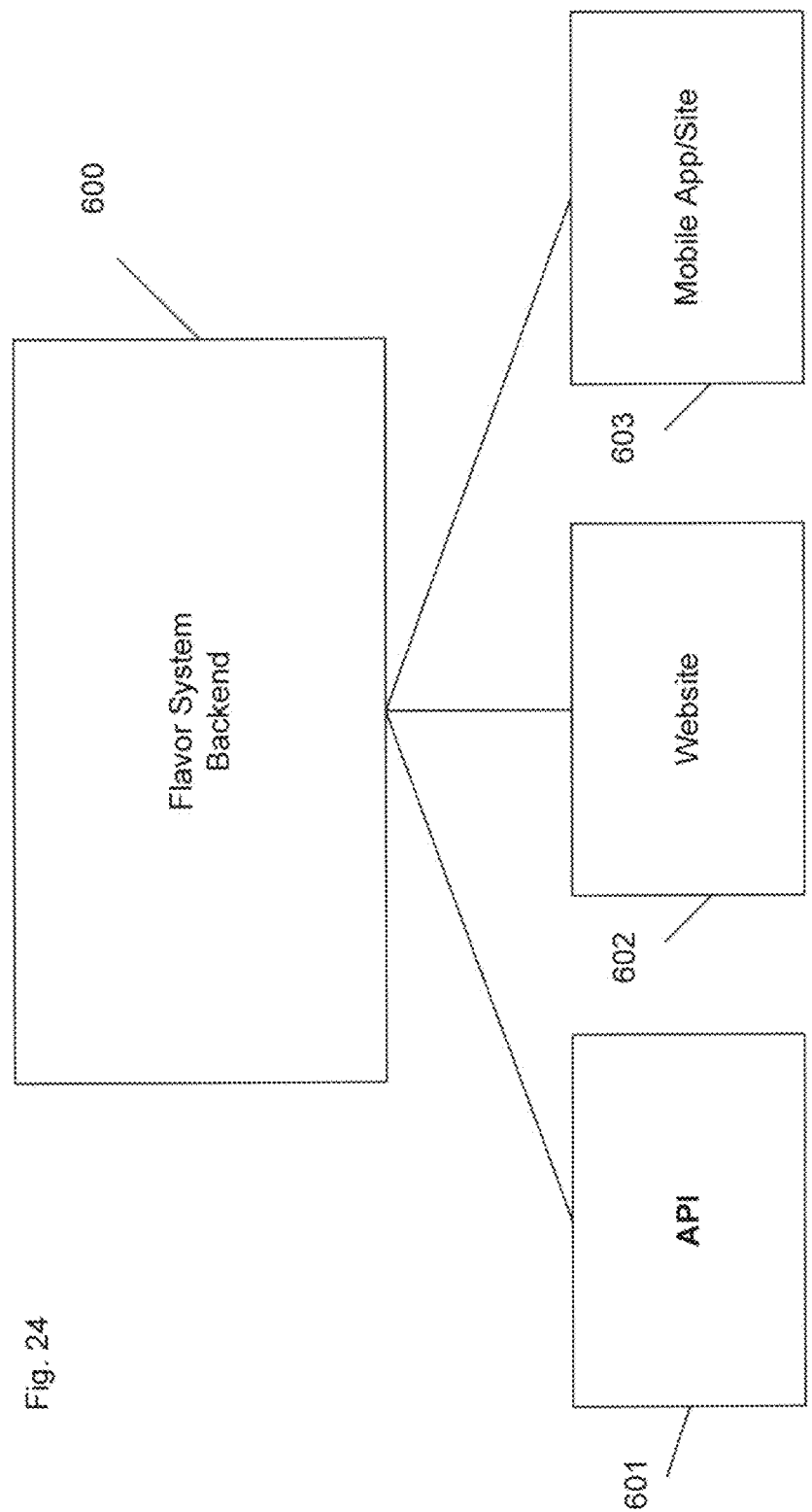
FIG. 24 illustrates an example of the organization of the flavor backend according to one embodiment of the invention.

FIG. 24 illustrates an example of the organization of the flavor backend 600 according to one embodiment of the present invention. As is shown in FIG. 24, the flavor system backend 600 implements and powers the API 601, the website 602 and the mobile app/site 603.

The flavor system backend 600 may be implemented in multiple different ways. According to one embodiment of the invention, the flavor system backend 600 may be implemented by way of a flavor platform.

The flavor platform allows data of users to be aggregated and connected with other databases to determine consumer interests and trends. For example, loyalty card data can be linked to, or combined with, information about the user flavor profile and user preference profile data to determine a clear link to sales.

In addition, the flavor platform includes elements which enable implementation of a display of advertisements manually built from data sources, a flavor matching recommendation engine which utilizes an algorithm and which is incorporated into third party web pages, and flavor matching recommendations (e.g. flavornator) and third party integration.

This display could be implemented by a flavor lightbox, among other things, that is used to test consumer's acceptance of various grocery products and flavor combinations on a regional level, such as state or other geographic area. The lightbox is a javascript implementation which enables the display of information. The use of a lightbox is exemplary and the features described herein are not limited thereto.

The flavor matching recommendation engine is able to access data from a number of sources in order to make a suggestion or pairings. The pairings will be characterized by "triggers" and an associated "flavor". A primary source for "the trigger" is the retailer local weekly digital circular. Additional sources may include historical transactional data, Flavor DNA (flavor mark), recipes, shopper loyalty card data, etc.

Trigger and flavor products are defined by categories across various cooking contexts. For example, the cooking contexts could be baking, grilling and cooking and various products within these contexts could be used as trigger products or flavor categories.

The flavor platform will have the ability to deploy the flavor matching recommendation engine to match multiple products together in an advertisement, such as a web based banner advertisement.

The historical transactional and partner shopping loyalty data can be sources for data mining and prospective data analysis to identify hidden predictive associations between trigger products and flavors. Manufacturer level and basket level associations can be analyzed and included. The flavor profile data can be used to tune and interpret the mined associations. The associations, both obvious and hidden, will enable implementation of the algorithm which drives the recommendation engine.

There are multiple combinations which can be considered. For instance, trigger product to flavor clustering, flavor to flavor clustering, combination (product and flavor) to flavor clustering.

An implementation of the flavor platform could be a flavor engine database, which includes flavor clusters, product information, ad performance and transactional data, generating an intelligent banner advertisement. When this advertisement is selected, a flavor lightbox can be generated by accessing the flavor algorithms which suggest other flavors and recipes. The data which the users access and select in the lightbox will be provided to the flavor algorithms to help the algorithms learn.

There will also be included a customer profile database which includes information regarding user flavor profile and user preference profile data. The n-dimensional database and associated access APIs are used as a repository for information to be used in the creation of personalized meal and dish recommendations. The database will be structured to work with an email service and other 3rd party services. In the database, each consumer profile record may contain among other things, a unique identifier, the date the record was created, the date the record was last modified, the user's email address, as well as a variety of fields used to hold self-profiled personal flavor preferences.

The flavor matching recommendation engine can also be linked to third party sites so that, when initialized by consumer interaction, the engine will process the originating product or recipe in real time and then suggest and display additional products or flavors that may interest the user. The recommendations will be made via the lightbox so that the user remains on the retailer page. Functionality will exist to allow the user to add the product to a shopping list and/or a shopping cart.

Dynamic query inputs will be gathered from the third party retailer's content on the page where the flavor engine button is displayed. The button will appear on pages where the content is sufficient/relevant for making recommendations A recommendation could also be based solely on the user flavor profile and user preference profile data where the page has no sufficient or relevant information for making a recommendation. Example pages are recipe detail page, circular category pages, and circular browsing pages. These dynamic query inputs will be downloaded to the flavor database and matched to the appropriate cluster products and then returned to the consumers as the recommendation.

Inputs could include products within the content, recipes within the content, retailer/store information, and geographic information. Similarly to the cluster optimization described previously, the engine will continue to optimize cluster associations to account for new elements being added to demographic data database, current sales trends, new product launches, and additional filters being added to the final recommendation. These filters could include price range, product availability, on sale or circular featured products at a retailer.

An example of the flow for the integration of the flavor matching recommendation engine into third party retailers is as follows. First, a flavor recommendation button or link is provided on third party retailer's websites. Second, when the button is selected or clicked, a recommendation algorithm is triggered which uses information from the page which originated the click. The flavor engine analyzes the click source and page context to determine flavor cluster matches. The product recommendations are then determined and assembled in a dynamic display which displays the recommendations. The conversion and transaction data of the process could be sent back to the flavor algorithm as normal clickstream data to further optimize the flavor recommendations.

Another implementation of the flavor recommendation engine enables third parties to incorporate the flavor platform and a flavor recommendation service within applications provided by a third party. This implementation could use javascript and includes relevant contextual data (to be used to make a recommendation) for the page currently in view. Necessary data-points can be returned (including image URLs if necessary) to allow the third party to build a user interface ("UI") (for the current contextual page view) that represents this data. Any consumer actions taken against the recommendations as they are represented by the third party may include additional access to the recommendation engine to register the action taken (e.g. "Add To List", "View Details"). This closed loop will ensure the recommendation engine's continued optimization.

An optional "Flavor Reporting Dashboard" will give platform administrators access to daily reporting. This dashboard will provide key metrics and activity levels for the flavor platform such as the volume of queries and breakout by content type driven through the APIs, the rank and volume of the recommendations processed and provided to consumers through the engine, the top protein to flavor correlation metrics, and key performance indicators ("KPIs") for "conversion" based goals to provide sales impact metrics.

An example of the flow for the integration of the recommendation engine for third parties is as follows. First the flavor engine parses the content source for relevant keywords. The flavor engine analyzes the keywords to determine flavor cluster matches. For example, flavor clustering groups similar flavor data. This cluster grouping organizes flavors based on how the flavors fit into an organization or continuum. Thus, certain flavors will be organized to be closer to other flavors, etc. The product recommendations are determined and the flavor engine assembles and generates data for a dynamic display to display results. The conversion and transactional data from the process can be analyzed and used to further optimize the flavor recommendations.

Figure 25:
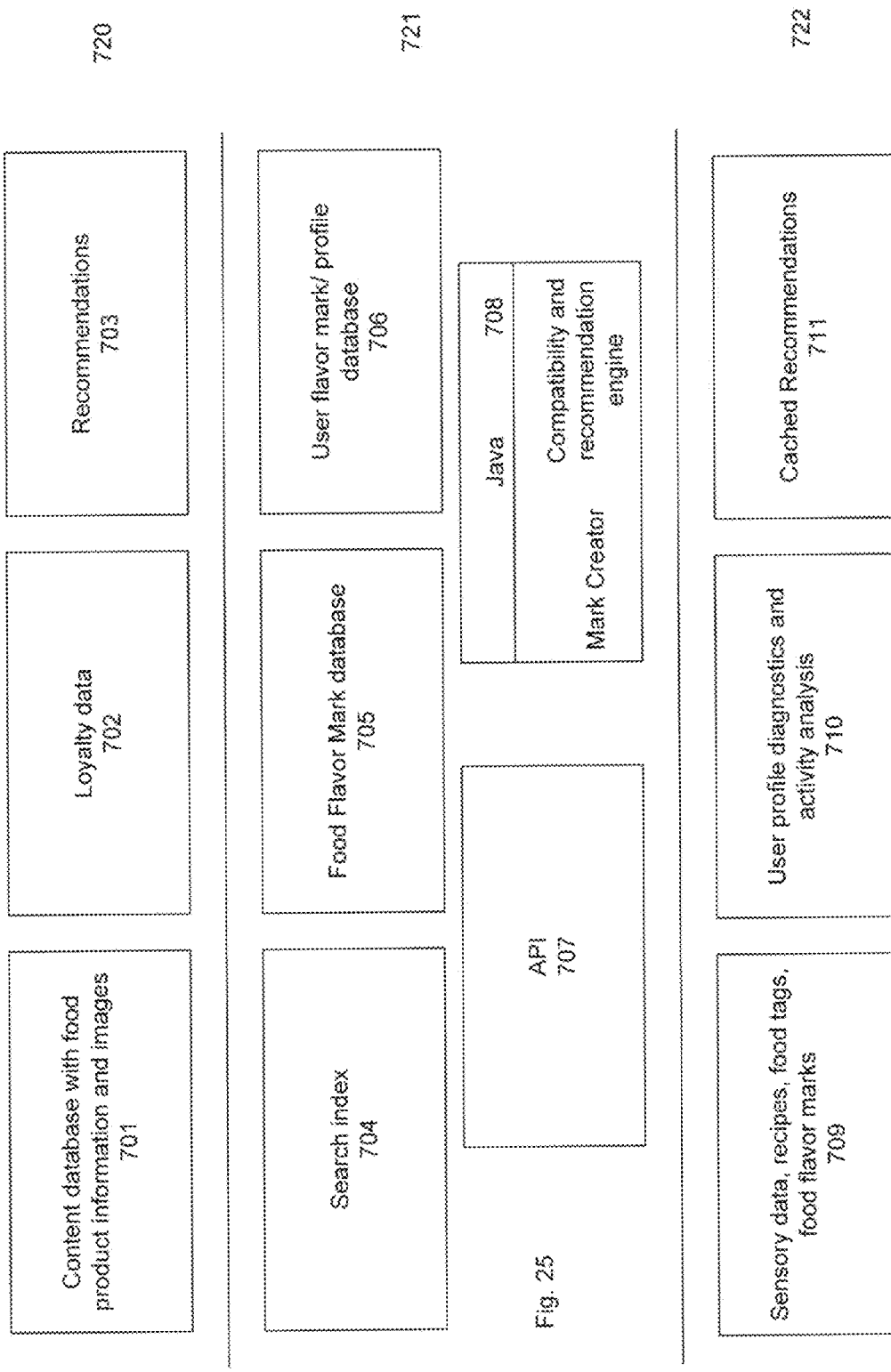
FIG. 25 illustrates the flavor system backend according to one embodiment of the invention.

In another embodiment, the flavor system backend 600 can be implemented as is illustrated in FIG. 25. In this figure, each of a number of different databases are implemented in different service locations or in different groups. For instance, group 720 includes the content database 701, the loyalty data database 702 and the recommendation database 703.

Group 721 includes a search index database 704, the food flavor mark database 705, the user flavor mark and associated profile database 706, the API engine 707 and the Mark creator and compatibility and recommendation engine 708 which may be implemented in Java.

In group 722, there is included the sensory data, recipes, products, ingredients, food tags and food flavor mark database 709, the user profile diagnostics and activity analysis database 710 and cached recommendations database 711.

These databases are merely examples of databases or programs that are utilized within the flavor system described in the previous figures. This example is provided to illustrate that the various databases and programs described herein can be located at different locations in order to protect certain information or obtain efficiency. In addition, network security and encryption can be used to ensure that certain data is not open to access by unauthorized users.

Figure 26:
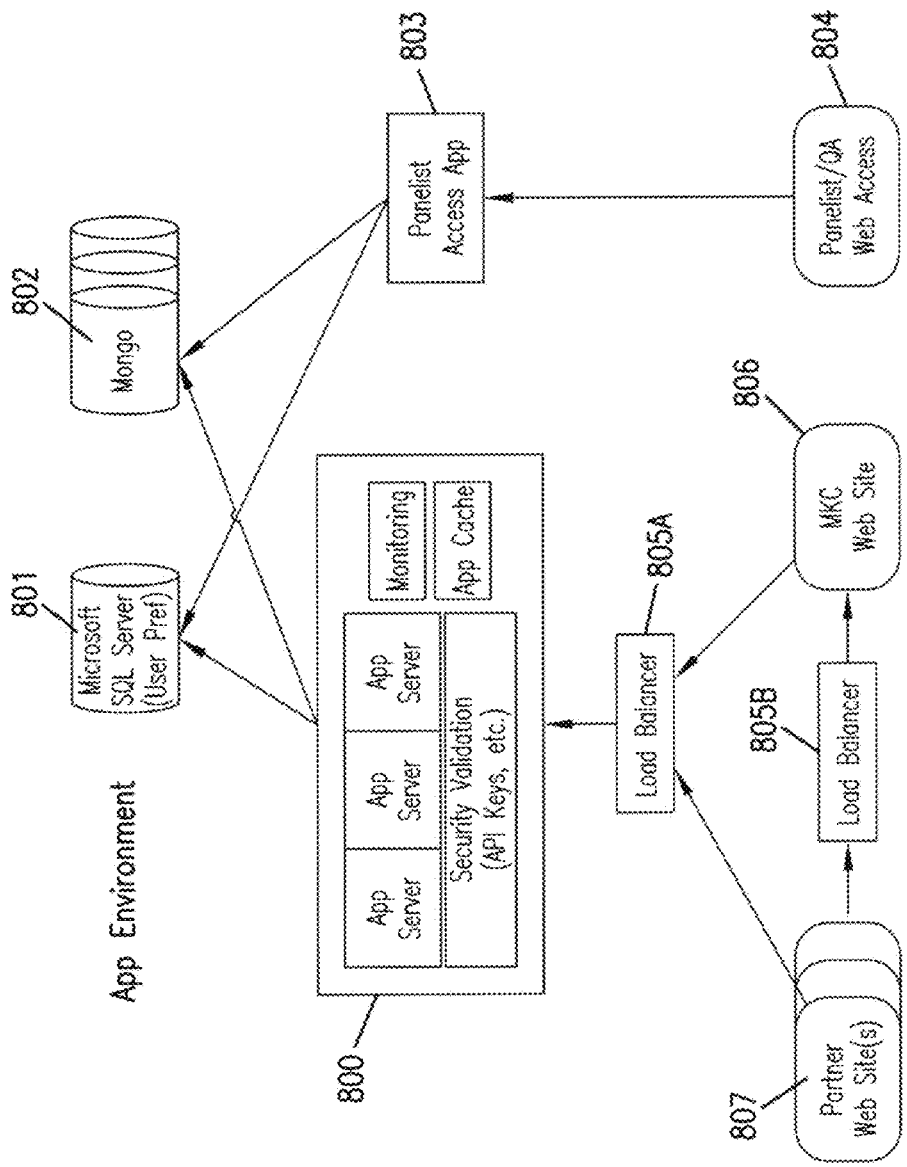
FIG. 26 illustrates an exemplary application environment for the flavor system.

The databases may also implement a document-oriented database system. As shown in FIG. 26, the document orientated database 802 provides a food and flavor ontology inter-connected knowledge store.

In addition, the application ("app") server 800 may provide implementation of the various algorithms described above. In addition to the document-oriented database system 802, the system can utilize a SQL type database 801 to provide information. The website 806 and the partner websites 807 which access the data via API will be provided information from the app server 800 directly or indirectly. In addition, load balancers 805A-B can be used to ensure proper load balancing. The information in the databases 801 and 802 can be accessed directly by way of a panelist access app 803. This application can be accessed by the administrators via portal 804.

Figure 27A:
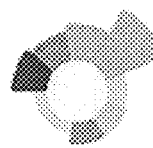
FIGS. 27A and 27B illustrate exemplary integration of the food element flavor mark and third party websites and apps.
Figure 27B:
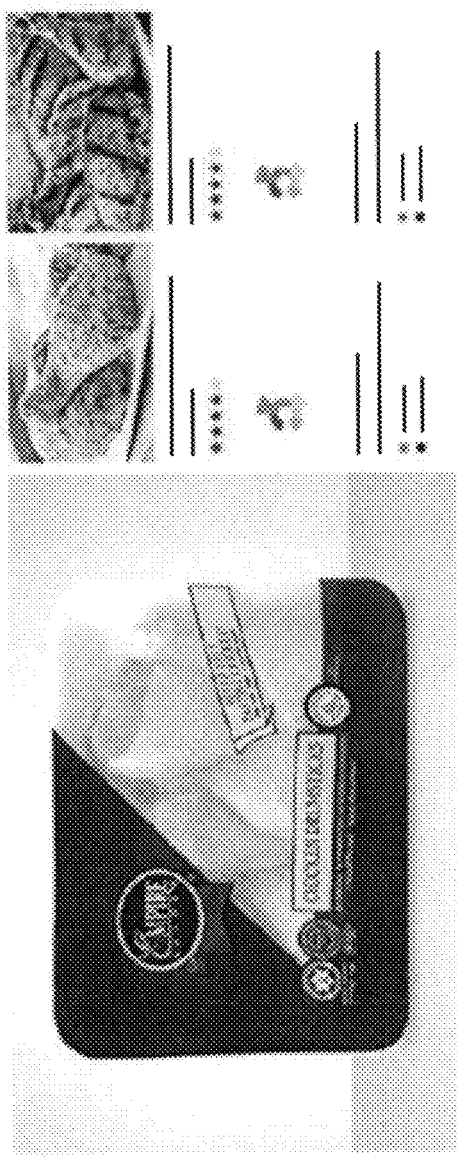

The API 601 shown in FIGS. 27A-B is implemented to enable integration of the flavor mark and third party websites and apps. In the example shown in FIG. 26, the API enables websites that provide circulars or on-line sales to incorporate the flavor mark into the presentation.

For instance, in the example shown in FIG. 27A, the flavor mark of a recipe is shown along with the match score, displayed as a percentage, of the recipe to the user's flavor mark. The information provided to the third party sites can enable products to obtain a flavor mark as well as an indication of compatibility with a user.

In the example shown in FIG. 27B, a product is shown that may be purchased online or at a physical store. This product information is used to obtain recipes from the flavor system. The information obtained also includes the flavor mark of the recipe as well as the match score of the recipe to the user.

The API 601 can be used by electronic circulars, apps, websites, social media or any other similar type of third party service. For instance, a dating service could utilize the API to obtain information about flavor compatibility between users. Similarly, a site which enables users to explore different cultures, such as a travel site, could allow users to discover local foods and flavors by linking the data to certain foreign locales.

Figure 28:
FIG. 28 illustrates the website implementation of the flavor system.

FIG. 28 illustrates the website 602 implementation of the flavor platform. The website may be used to implement the flavor platform and provide a way (not shown in FIG. 28) by which users can provide information used to generate a flavor mark and a user flavor profile and a user preference profile. The website also provides a way by which the flavor mark and associated flavor profile data can be updated to provide a more on point flavor representation of the user and the user's preferences.

In FIG. 28, the user's flavor mark is displayed 930 along with an indication of the top flavors of the user 931. The page could also include a list of recommendations that are provided to the user 934 whereby the user could indicate their additional preference etc. The website could also provide the user with the ability to update their flavor mark and profile 933 and an indication of how close the user is to getting a complete starting profile 932.

Figure 29:
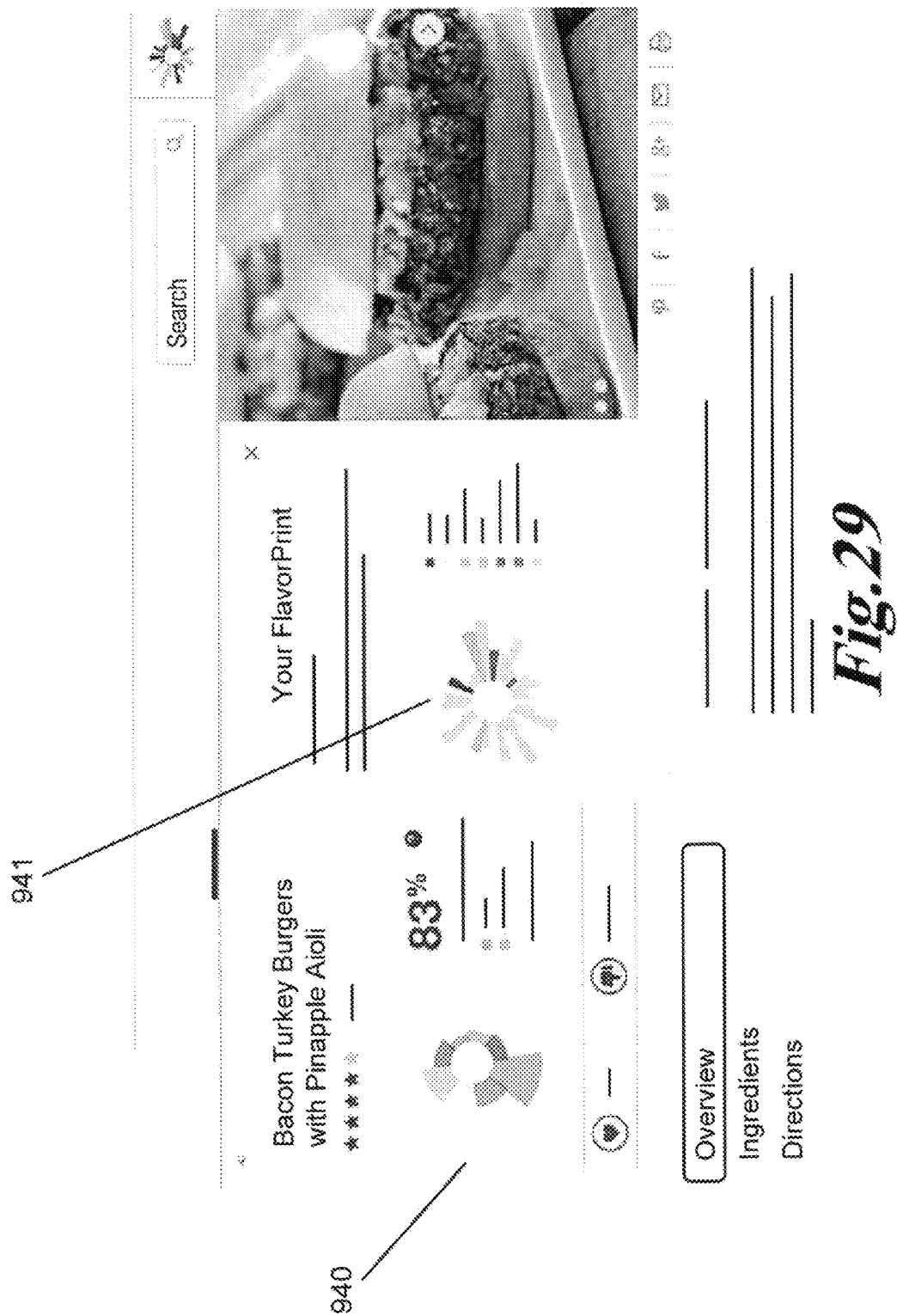
FIG. 29 illustrates another example of the website implementation of the flavor system.

In FIG. 29, an example of a recipe page is illustrated. In this example, different recipes are displayed. In this example shown in FIG. 29, the page includes information about flavor mark and compatibility of the recipe 940. The page also includes an indication of the flavor mark of the user 941 highlighting the flavors that are matching with the recipe and additional information as to why the compatibility match was made.

Figure 30:
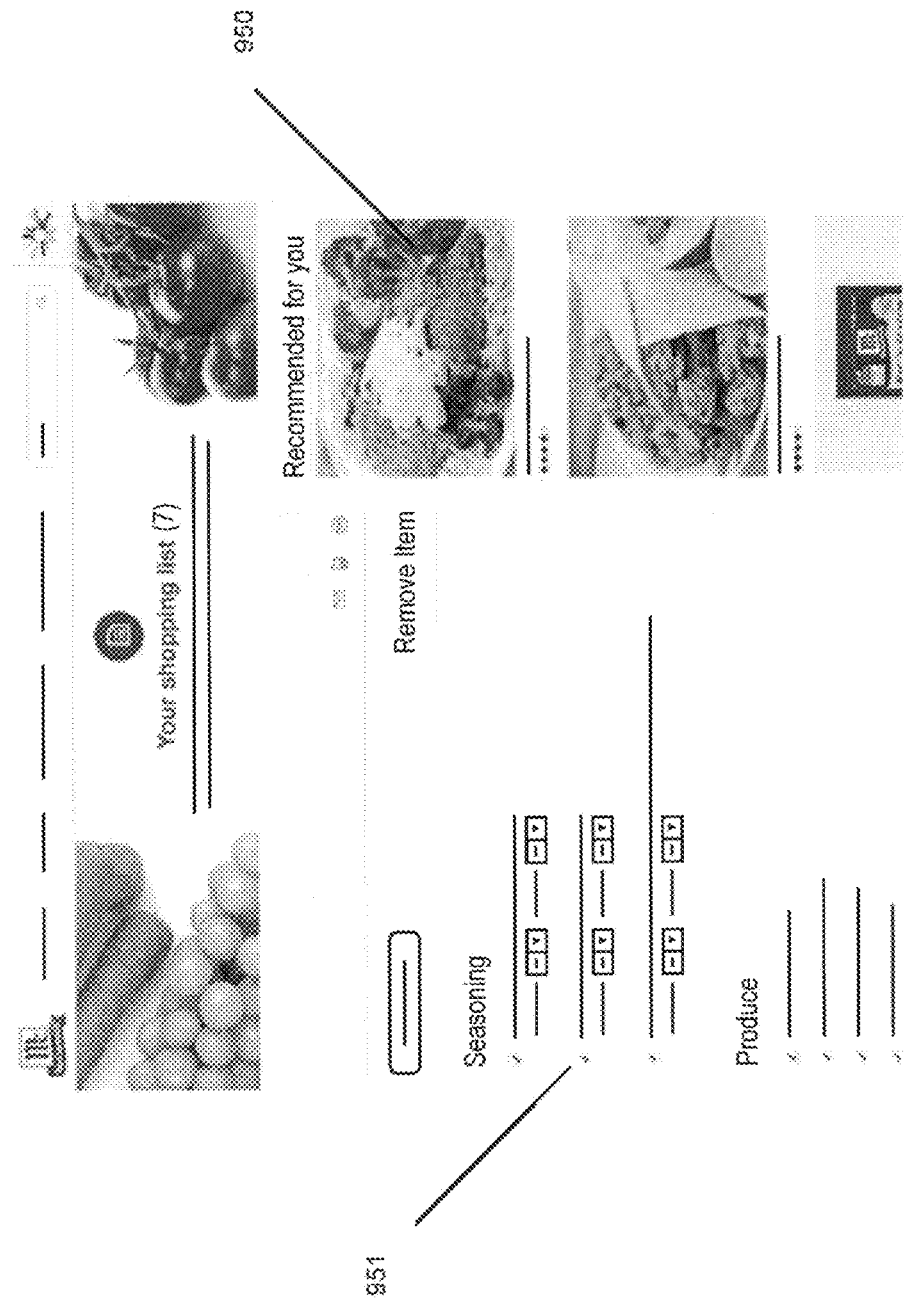
FIG. 30 illustrates another example of the website implementation of the flavor system corresponding to the shopping list feature of the website.

In FIG. 30 shows an example of a shopping list feature of the website. The shopping list can provide the user with the ability to add products, ingredients or food elements to a list for later purchase or access. For instance, when a recipe is selected from a recommendation 950, the user can group the ingredients of the recipe and select these elements to be added to a list 951.

The website may be organized based on section such that one section corresponds to the flavor mark and provides a user with the ability to access and update the user flavor profile data and the user preference profile. Another section may correspond to recipes and provide the user with the ability to discover recipes based on recommendations and exploration. Another section may correspond to spices and flavors and may enable the user to explore and discover new spices and flavors. A further section may correspond to health and wellness options or could be directed a certain type or style of food such as "seafood."

Figure 31:
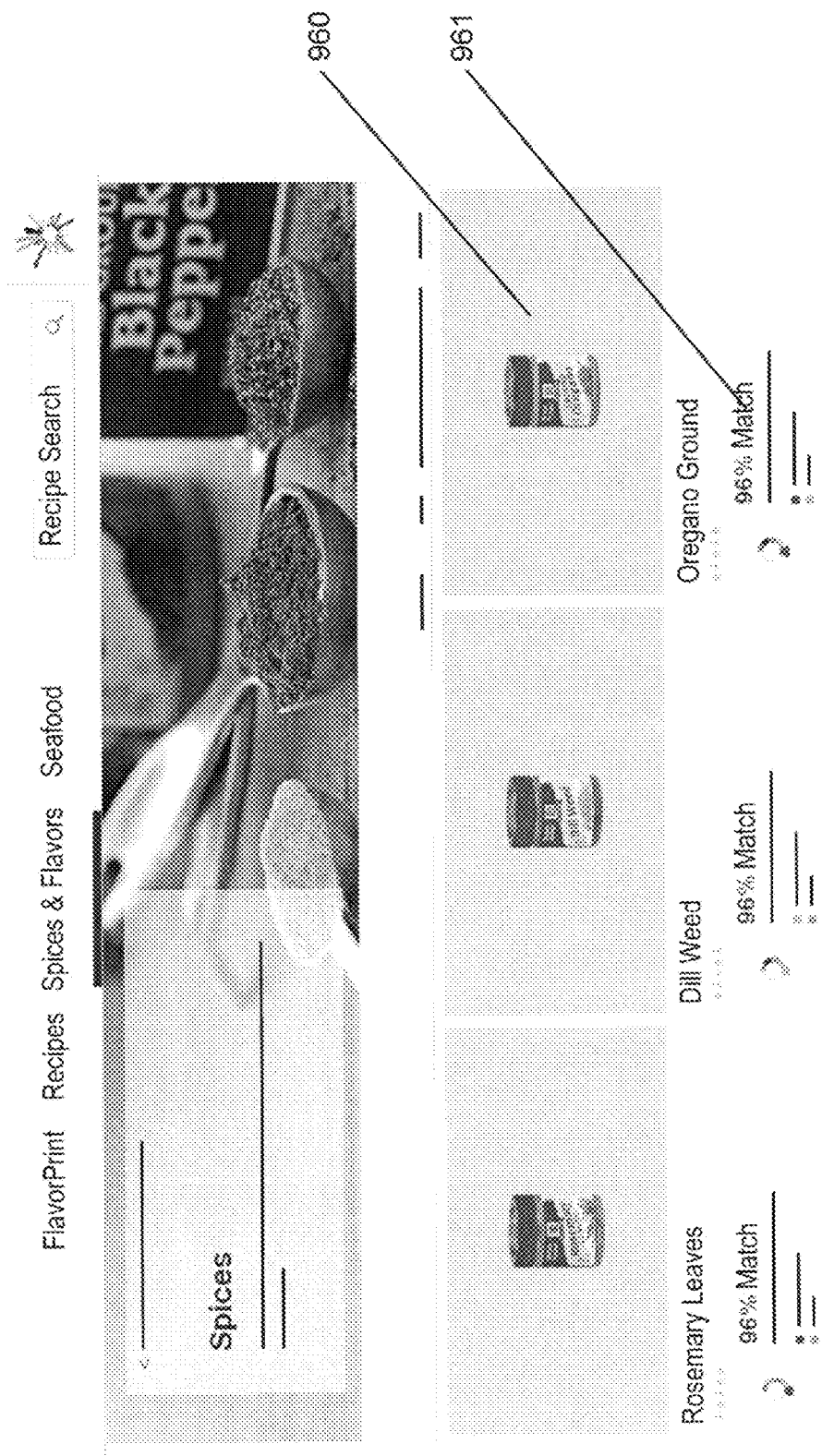
FIG. 31 illustrates another example of the website implementation of the flavor system corresponding to the spices and flavors page.

FIG. 31 provides an example of the spices and flavors page. In this example each spice is listed 960 and a match score 961 is provided for the user flavor profile. The spices can be listed in, for example, alphabetical order, based on flavor mark compatibility, and based on rating.

Figure 32:
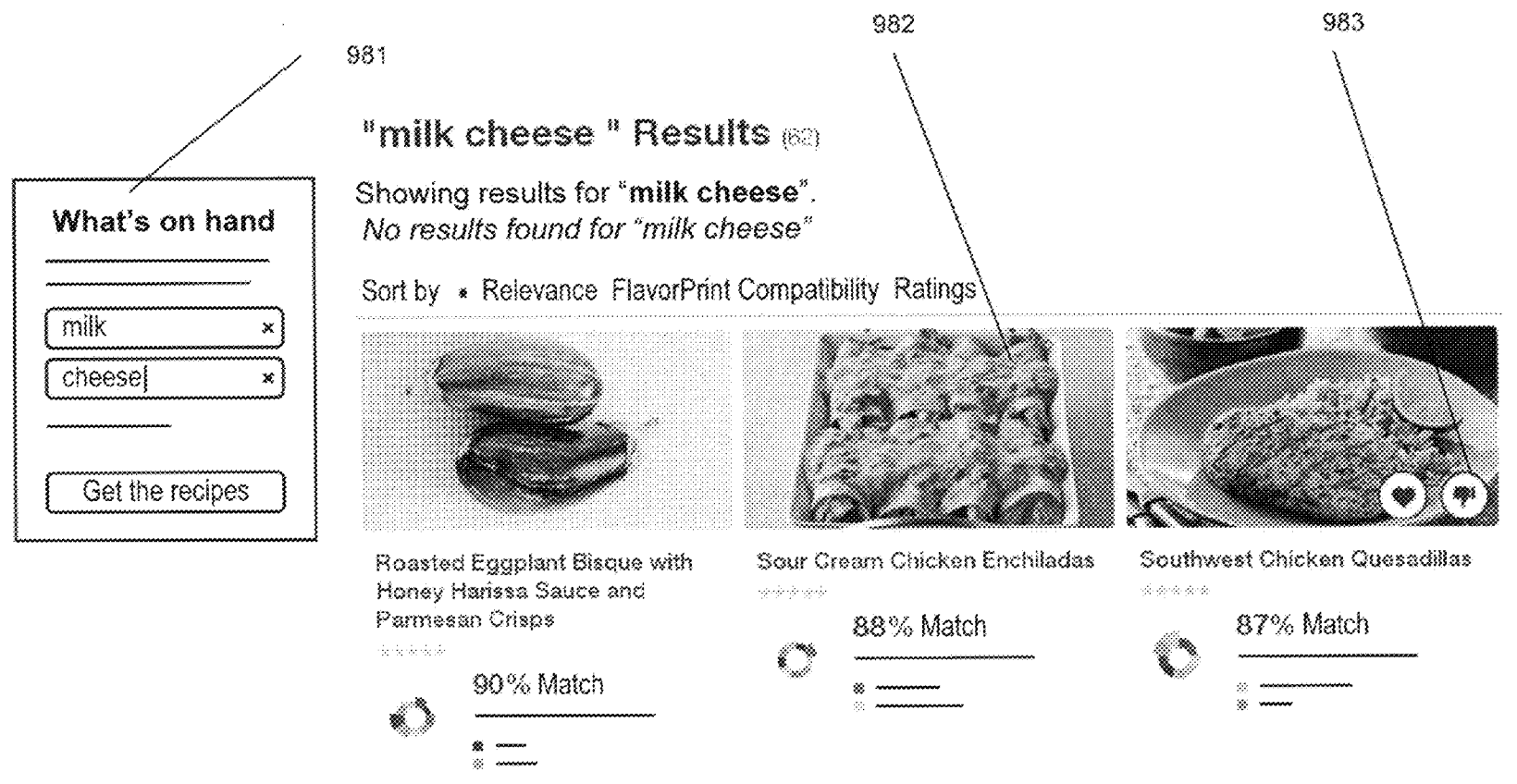

FIG. 32 provides an example of the page by which a user can enter an ingredient recipe search. The website may also provide the user with the opportunity to obtain recipe recommendations based on ingredients that can be considered as "on hand" for the user 981. The resulting recipes 982 will be provided to the user and can be sorted based on, for example, rating, flavor mark compatibility, and relevance. Each result can then be liked or disliked 983. The user can save a recipe for later in a virtual cookbook or recipe list.

Figure 33:
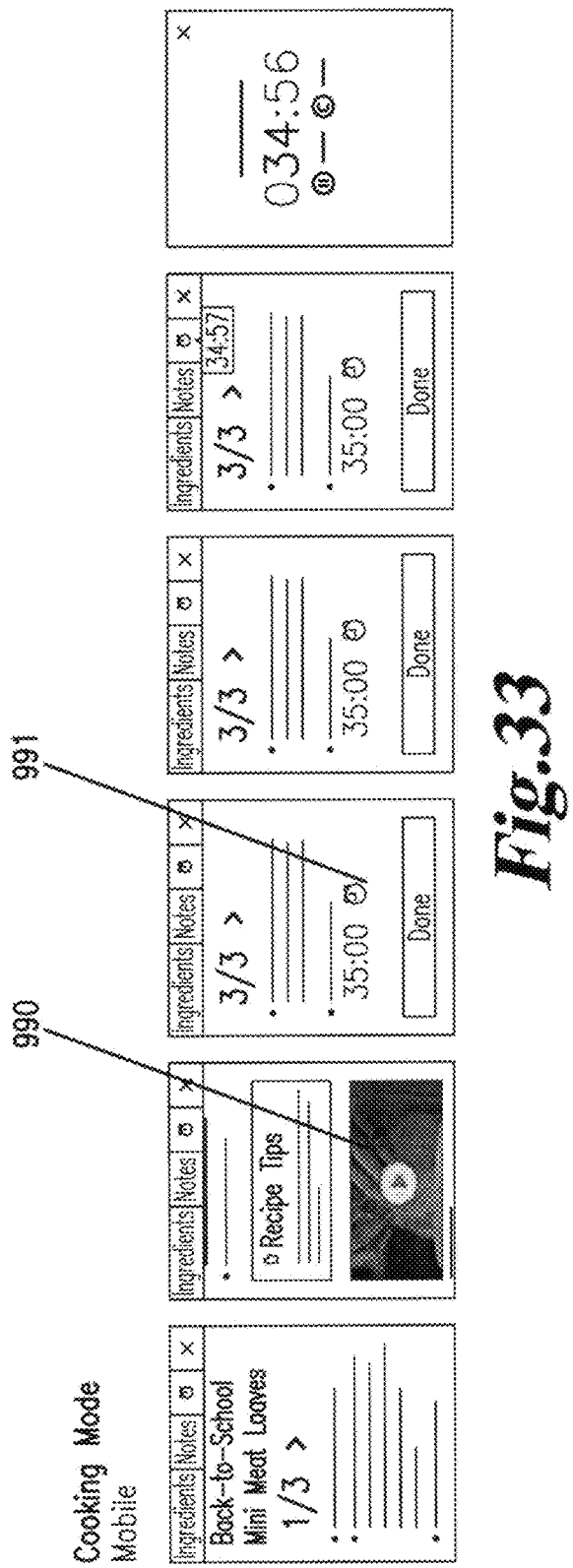
FIG. 33 shows an example of an implementation of the mobile version of the website.

A mobile application or website 603 can also be implemented in the flavor system. The mobile application can be implemented on a smart phone or a tablet or other similar hardware. FIG. 33 shows an example of an implementation of the mobile view of a website. The features shown in FIG. 33 are representative and may also be implemented via a stand-alone application. In such an implementation, the application enables the user to perform all the functions of the website in addition to some additional features.

The user can be guided through a recipe by way of "step-by-step" recipe instructions. FIG. 33 shows that at least one of the steps of the recipe are explained to the user through videos and instructions 990. Alternatively, none of the steps may be explained to the user in this way. A timer 991 is also provided to the user to give the user time frames for the various steps. Once the user has completed the step, the user so indicates and the next page is provided. The cooking mode can also provide the user with various cooking conversions to help the user include the right amount of ingredient. For example, if the recipe calls for 1 tablespoon, the website can provide the user with instructions for how many teaspoons is equivalent to 1 tablespoon. In addition, the application can provide potential substitutions. For instance, if the recipe calls for a number garlic cloves the application can provide an indication of the amount of garlic powder that this number is equivalent to. The website can also provide substitutions based on the user flavor profile or user preference profile. For example, a user with a gluten allergy could be provided with certain substitutions. The website may also provide the user with the ability to easily scale the recipe for more or less persons. For example, if the recipe is intended for four users, the recipe can be scaled for one user. The website may also provide the ability to scale ingredients.

Further, as cooking devices have become more connected, the website can provide instructions to a network connected cooking device such as an oven or a stove to ensure that the meal is prepared with precisely the correct timing and temperature. Each of these features may also be implemented by way of the application.

Each of the embodiments discussed previously may be implemented with "texture" in combination with, or alternatively in place of, flavor. When texture is used in combination with flavor, these two elements can be weighted such that texture characteristics and texture preferences are given a greater or lower weight, with respect to flavor characteristics and flavor preferences, when calculating recommendations, for example, or performing other functions on the flavor platform. Also, similar to flavor, texture can be weighted based on demographic or location data such that certain texture categories are given greater weight than other texture categories.

Texture represents the food element's physical interaction with the user when consumed by the user. The user is able to perceive a number of different qualities or properties of the food element which can be described as the food's texture. For example, a user may have differing levels of preference for texture such as a high preference for crunchy foods and a low preference for chewy foods. Similar to the flavor examples provided above, a plurality of texture categories can be provided and the user's preference level for each category can be determined. Table 2 shown below provides a number of examples of textures that may be used, however, these examples are not exhaustive and other categories of texture may also be used.

TABLE 3

| | |
|---|---|
| Slipperiness | A smooth and slick sensation in the mouth, typical of foods such as olive oil, oysters or okra. |
| Crispy/Crunchy | The crack and intense sound you hear as you chew rigid foods like chips, crackers or celery. |
| Juicy | When you chew foods such as grapes, peaches, raw tomato or a medium rare steak, juices burst into your mouth. |
| Chewy | Opposite of crunchy foods, chewy foods don't break, but change form as you chew them, common of sponge cake, beef jerky, caramel candy or chewing gum. |
| Creamy | Creaminess creates a rich, thick mouth coating as you eat it, similar to the sensation delivered by mousse, ice cream, ricotta cheese or ranch dressing. |
| Crumbly | Crumbly foods are those that break into pieces very easily. Unlike crunchy food, crumbly has little to no cracking feel as you bite. Think cornbread, streusel topping or scones |
| Tenderness | The ease of biting and chewing foods, but still maintaining a bit of resistance. Tender foods melt in your mouth like filet mignon, steamed carrots, baked cod or salmon. |
| Thickness | As these foods or beverages pass over your tongue they feel dense, rich, and flow slowly like milkshakes, Greek yogurt or sour cream. |
| Thinness | Opposite of thick, thinness refers to the lack of weight, substance and speed in which liquids like water, pulp-free fruit juices or broth pour. |
| Gumminess | The stickiness caused by starch in cooked foods like white rice, oatmeal, or grits. |
| Flaky | Much like pie crusts, biscuits or even fish, when flaky foods break, pieces are very thin and almost flat compared to crumbs. |
| Softness | Similar to tenderness, softness describes the ease of biting and chewing foods but with less resistance, like white sandwich bread or soft cheeses like cream cheese or Brie. |
| Hardness | Hardness describes a food's dense, brittle qualities and the force it takes to break them, like hard candy or raw carrot sticks |
| Moistness | A texture similar to juiciness, except much less moisture is released upon chewing. Moistness is commonly associated with rotisserie chicken, fresh strawberries, carrot cake or white cake. |
| Dryness | The opposite of moist, dry foods like crackers, well-done steak, or red wine, absorb moisture from your mouth as you eat them. |
| Gooeyness | Sticky, thick, and soft, gooey foods have a bit of a coating effect, like hot fudge, melted caramels or melted cheese. |

This information can be added to the user's profile data to provide a texture profile. The texture profile can be used to provide recommendations and can be used to provide a texture mark. In addition, the texture information can be utilized together with the user flavor profile and the user preference profile information for the user to provide recommendations. The user texture profile can be included in the user preference profile.

In addition, food elements such as recipes and food products can have generated therefor texture profiles which indicate the relative or absolute level of texture for a category that would be perceived by a user which consumed these food elements. This information can be used as the sole basis for a recommendation or together with other information to provide a recommendation to the user.

For example, if a user had a high preference for "softness" and "juicy" foods, the user could be provided with the top recommendations of watermelon and cantaloupe, for example, which have a texture profile which indicates that the characteristics of these foods have a higher value for the categories of "softness" and "juicy."

Certain portions of the processing, such as the determination of the flavor mark or other applications of the flavor mark, can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 34:
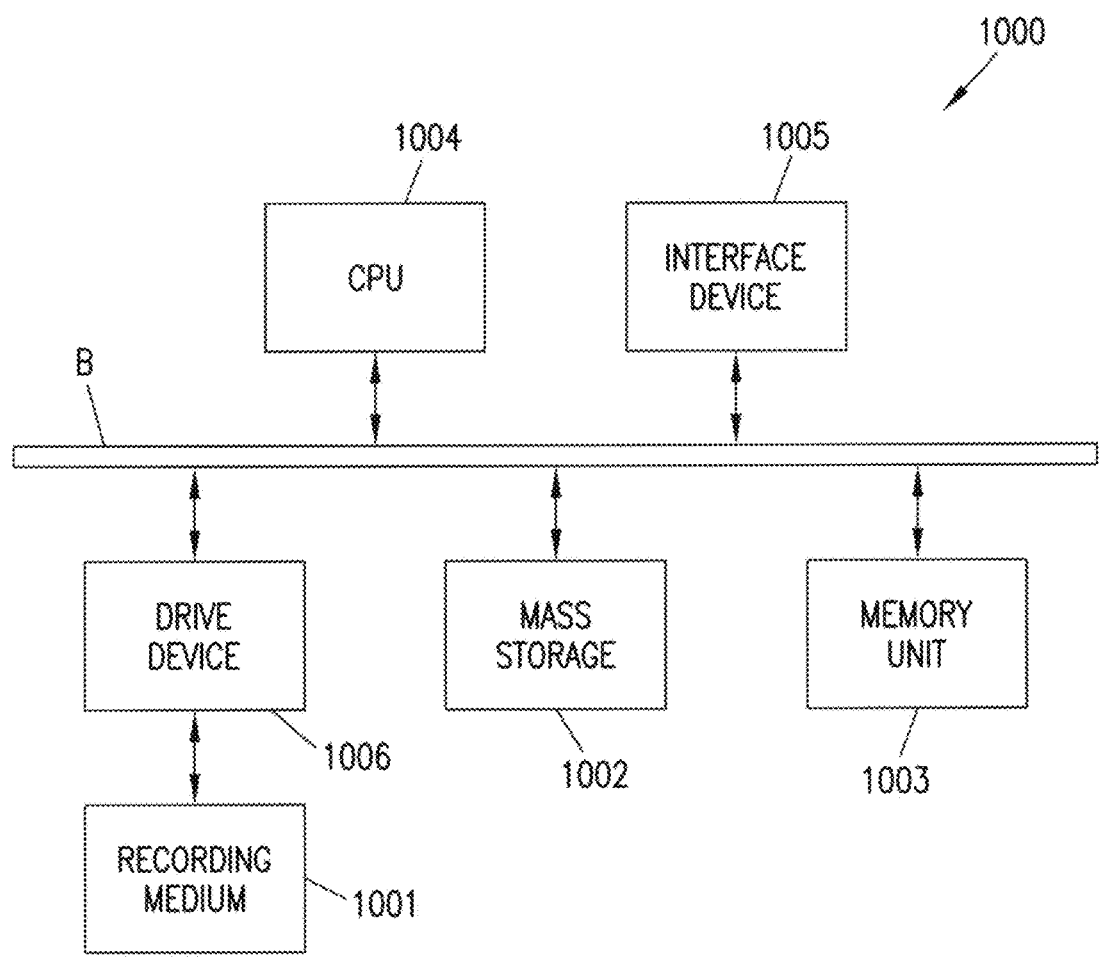
FIG. 34 illustrates an example of a computer and corresponding hardware according to one implementation of the invention.

In addition, certain features of the embodiments can be implemented using a computer based system (FIG. 34). The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of generating a visual representation of a flavor profile, comprising:
   obtaining preference information representing flavor preferences of a user with respect to each of a plurality of flavor categories;
   determining, using a microprocessor, a length of a plurality of graphical elements, each graphical element being assigned to one of the flavor categories, based on the preference information corresponding to the respective flavor category, wherein the length of each graphical element indicates the relative preference for a flavor category with respect to the other flavor categories; and
   disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

2. The method according to claim 1, wherein each flavor category represents a different sensory flavor which is perceived by the user.

3. The method according to claim 1, wherein the length of each graphical element indicates the relative preference for a flavor category with respect to the other flavor categories such that a greater length indicates a greater relative preference for the category and a shorter length indicates a lower relative preference for the category.

4. The method according to claim 1, wherein the disposing further comprises disposing on the computer generated display screen the plurality of graphical elements such that each of the graphical elements is in contact with at least two other graphical elements in addition to the contact point with the circle.

5. The method according to claim 1, wherein the disposing further comprises positioning the plurality of graphical elements around the circle at predetermined positions, the predetermined positions each being associated with one of the plurality of categories.

6. The method according to claim 1, wherein the disposing further comprises positioning the plurality of graphical elements around the circle at predetermined positions, the predetermined positions each being associated with a category group corresponding to at least two categories of the plurality of categories.

7. A method of generating a visual representation of a flavor profile, comprising:
   obtaining flavor characteristic information representing flavor characteristics of a product or recipe for each of a plurality of flavor categories;
   determining, using a microprocessor, a length of a plurality of graphical elements, each graphical element being assigned to one of the flavor categories, based on the flavor characteristic information corresponding to the respective flavor category, wherein the length of each graphical element indicates the relative value for a flavor category with respect to the other flavor categories; and
   disposing on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

8. The method according to claim 7, wherein each flavor category represents a different sensory flavor which is perceived by a user partaking of the product or recipe.

9. The method according to claim 7, wherein the length of each graphical element indicates the relative preference for a flavor category with respect to the other flavor categories such that a greater length indicates a greater relative value for the category and a shorter length indicates a lower relative value for the category.

10. The method according to claim 7, wherein the disposing further comprises disposing on the computer generated display screen the plurality of graphical elements such that each of the graphical elements is in contact with at least one other graphical element in addition to the contact point with the circle.

11. The method according to claim 7, wherein the disposing further comprises positioning the plurality of graphical elements around the circle at predetermined positions, the predetermined positions each being associated with one of the plurality of categories.

12. The method according to claim 7, wherein the disposing further comprises positioning the plurality of graphical elements around the circle at predetermined positions, the predetermined positions each being associated with a category group corresponding to at least two categories of the plurality of categories.

13. An apparatus for generating a visual representation of a flavor profile, comprising:
at least one microprocessor implementing
an obtaining unit configured to obtain preference information representing flavor preferences of a user with respect to each of a plurality of flavor categories,
a determining unit configured to determine a length of a plurality of graphical elements, each graphical element being assigned to one of the flavor categories, based on the preference information corresponding to the respective flavor category, wherein the length of each graphical element indicates the relative preference for a flavor category with respect to the other flavor categories, and
a display unit configured to dispose on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

14. The apparatus according to claim 13, wherein each flavor category represents a different sensory flavor which is perceived by the user.

15. The apparatus according to claim 13, wherein the length of each graphical element indicates the relative preference for a flavor category with respect to the other flavor categories such that a greater length indicates a greater relative preference for the category and a shorter length indicates a lower relative preference for the category.

16. The apparatus according to claim 13, wherein the display unit is further configured to dispose on the computer generated display screen the plurality of graphical elements such that each of the graphical elements is in contact with at least two other graphical elements in addition to the contact point with the circle.

17. The apparatus according to claim 13, wherein the display unit is further configured to position the plurality of graphical elements around the circle at predetermined positions, the predetermined positions each being associated with one of the plurality of categories.

18. The apparatus according to claim 13, wherein the display unit is further configured to position the plurality of graphical elements around the circle at predetermined positions, the predetermined positions each being associated with a category group corresponding to at least two categories of the plurality of categories.

19. An apparatus for generating a visual representation of a flavor profile, comprising:
at least one microprocessor implementing
an obtaining unit configured to obtain flavor characteristic information representing flavor characteristics of a product or recipe for each of a plurality of flavor categories,
a determining unit configured to determine a length of a plurality of graphical elements, each graphical element being assigned to one of the flavor categories, based on the flavor characteristic information corresponding to the respective flavor category, wherein the length of each graphical element indicates the relative value for a flavor category with respect to the other flavor categories, and
a display unit configured to dispose on a computer generated display screen the plurality of graphical elements each having a display length determined by the determining, the disposing positioning the plurality of graphical elements around a circle such that each of the graphical elements has a portion of an external boundary in contact with an external boundary of the circle at a contact point and such that each of the graphical elements protrudes from the contact point away from the circle in accordance with the determined display length.

20. The apparatus according to claim 19, wherein each flavor category represents a different sensory flavor which is perceived by a user partaking of the product or recipe.

21. The apparatus according to claim 19, wherein the length of each graphical element indicates the relative preference for a flavor category with respect to the other flavor categories such that a greater length indicates a greater relative value for the category and a shorter length indicates a lower relative value for the category.

22. The apparatus according to claim 19, wherein the display unit is further configured to dispose on the computer generated display screen the plurality of graphical elements such that each of the graphical elements is in contact with at least one other graphical element in addition to the contact point with the circle.

23. The apparatus according to claim 19, wherein the display unit is further configured to position the plurality of graphical elements around the circle at predetermined positions, the predetermined positions each being associated with one of the plurality of categories.

24. The apparatus according to claim 19, wherein the display unit is further configured to position the plurality of graphical elements around the circle at predetermined positions, the predetermined positions each being associated with a category group corresponding to at least two categories of the plurality of categories.

25. A non-transitory computer readable storage medium having stored thereon a program that when executed by a computer causes the computer to implement the method according to claim 1.

26. A non-transitory computer readable storage medium having stored thereon a program that when executed by a computer causes the computer to implement the method according to claim 7.

* * * * *